United States Patent
Karr

(10) Patent No.: US 12,248,566 B2
(45) Date of Patent: Mar. 11, 2025

(54) SNAPSHOT DELETION PATTERN-BASED DETERMINATION OF RANSOMWARE ATTACK AGAINST DATA MAINTAINED BY A STORAGE SYSTEM

(71) Applicant: Pure Storage, Inc., Mountain View, CA (US)

(72) Inventor: Ronald Karr, Palo Alto, CA (US)

(73) Assignee: Pure Storage, Inc., Santa Clara, CA (US)

( * ) Notice: Subject to any disclaimer, the term of this patent is extended or adjusted under 35 U.S.C. 154(b) by 393 days.

(21) Appl. No.: 17/846,301

(22) Filed: Jun. 22, 2022

(65) Prior Publication Data
US 2022/0327208 A1 Oct. 13, 2022

Related U.S. Application Data

(63) Continuation-in-part of application No. 16/711,060, filed on Dec. 11, 2019, now abandoned.
(Continued)

(51) Int. Cl.
G06F 21/55 (2013.01)
G06F 16/21 (2019.01)
G06F 21/62 (2013.01)

(52) U.S. Cl.
CPC .......... *G06F 21/554* (2013.01); *G06F 16/219* (2019.01); *G06F 21/6218* (2013.01); *G06F 2221/034* (2013.01)

(58) Field of Classification Search
CPC ............ G06F 21/554; G06F 21/6218; G06F 2221/034; G06F 16/219
See application file for complete search history.

(56) References Cited

U.S. PATENT DOCUMENTS

| | | | |
|---|---|---|---|
| 5,208,813 A | 5/1993 | Stallmo | |
| 5,263,350 A * | 11/1993 | Crippa | B21D 7/021 72/157 |

(Continued)

FOREIGN PATENT DOCUMENTS

| | | |
|---|---|---|
| CN | 103370685 | 10/2013 |
| CN | 103370686 | 10/2013 |

(Continued)

OTHER PUBLICATIONS

Kharaz,A. et al.,"Unveil: A Large-Scale, Automated Approach to Detecting Ransomware", 25th USENIX Security Symposium, Aug. 10-12, 2016, Austin, TX. ISBN 978-1-931971-32-4. https://www.usenix.org/conference/usenixsecurity16/technical-sessions/presentation/kharaz.

(Continued)

*Primary Examiner* — Gary S Gracia
(74) *Attorney, Agent, or Firm* — ALG Intellectual Property, LLC

(57) ABSTRACT

An exemplary method includes a data protection system detecting one or more delete requests to delete one or more recovery datasets of a storage system, determining that the one or more delete requests are inconsistent with a recovery dataset deletion pattern associated with the storage system, and determining, based on the determining that the one or more delete requests are inconsistent with the recovery dataset deletion pattern, that data stored by the storage system is possibly being targeted by a security threat.

16 Claims, 30 Drawing Sheets

Related U.S. Application Data

(60) Provisional application No. 62/939,518, filed on Nov. 22, 2019.

(56) References Cited

U.S. PATENT DOCUMENTS

| | | | |
|---|---|---|---|
| 5,403,639 A | 4/1995 | Belsan | |
| 5,412,045 A * | 5/1995 | Osman | C08F 136/06 |
| | | | 526/133 |
| 5,718,448 A * | 2/1998 | Knoll | B60R 21/16 |
| | | | 280/753 |
| 5,757,769 A * | 5/1998 | Ikawa | H04B 1/74 |
| | | | 398/5 |
| 5,940,838 A | 8/1999 | Schmuck et al. | |
| 6,263,350 B1 | 7/2001 | Wollrath et al. | |
| 6,412,045 B1 | 6/2002 | Dekoning et al. | |
| 6,595,035 B1 * | 7/2003 | Maley | G01N 29/227 |
| | | | 73/64.53 |
| 6,718,448 B1 | 4/2004 | Ofer | |
| 6,757,769 B1 | 6/2004 | Ofer | |
| 6,799,283 B1 | 9/2004 | Tamai et al. | |
| 6,834,298 B1 | 12/2004 | Singer et al. | |
| 6,850,938 B1 | 2/2005 | Sadjadi | |
| 6,915,434 B1 | 7/2005 | Kuroda | |
| 6,973,549 B1 | 12/2005 | Testardi | |
| 7,028,216 B2 | 4/2006 | Aizawa et al. | |
| 7,028,218 B2 | 4/2006 | Schwarm et al. | |
| 7,039,827 B2 | 5/2006 | Meyer et al. | |
| 7,043,759 B2 | 5/2006 | Kaashoek | |
| 7,149,858 B1 * | 12/2006 | Kiselev | H04L 67/565 |
| | | | 711/163 |
| 7,213,264 B2 | 5/2007 | Poletto | |
| 7,216,164 B1 | 5/2007 | Whitmore et al. | |
| 7,231,050 B1 * | 6/2007 | Harris | H04L 9/0866 |
| | | | 726/2 |
| 7,418,730 B2 | 8/2008 | Chu | |
| 7,467,333 B2 | 12/2008 | Keeton | |
| 7,467,400 B1 * | 12/2008 | Moss | G07C 9/38 |
| | | | 713/150 |
| 7,559,088 B2 * | 7/2009 | Cohen | H04L 9/0891 |
| | | | 726/1 |
| 7,735,136 B2 | 6/2010 | Mantripragada | |
| 7,739,211 B2 | 6/2010 | Coffman et al. | |
| 7,761,456 B1 * | 7/2010 | Cram | G06F 11/1469 |
| | | | 707/754 |
| 7,774,848 B2 | 8/2010 | D'Mello | |
| 7,783,666 B1 | 8/2010 | Zhuge | |
| 7,783,682 B1 | 8/2010 | Patterson | |
| 7,797,436 B2 | 9/2010 | Banerjee | |
| 7,797,748 B2 | 9/2010 | Zheng | |
| 7,873,619 B1 | 1/2011 | Faibish et al. | |
| 7,913,300 B1 | 3/2011 | Flank et al. | |
| 7,930,260 B2 | 4/2011 | Deo et al. | |
| 7,933,936 B2 | 4/2011 | Aggarwal et al. | |
| 7,958,159 B1 | 6/2011 | Tran | |
| 7,975,115 B2 * | 7/2011 | Wayda | G06F 3/067 |
| | | | 707/638 |
| 7,979,613 B2 | 7/2011 | Zohar et al. | |
| 7,996,547 B2 | 8/2011 | Sudhakar | |
| 8,001,601 B2 | 8/2011 | Duffield | |
| 8,010,519 B2 | 8/2011 | Hsu | |
| 8,010,667 B2 | 8/2011 | Zhang | |
| 8,086,652 B1 | 12/2011 | Bisson et al. | |
| 8,117,464 B1 | 2/2012 | Kogelnik | |
| 8,132,260 B1 * | 3/2012 | Mayer | H04L 63/1433 |
| | | | 726/25 |
| 8,137,199 B2 | 3/2012 | Douceur et al. | |
| 8,200,887 B2 | 6/2012 | Bennett | |
| 8,205,065 B2 | 6/2012 | Matze | |
| 8,260,792 B1 | 9/2012 | Hsu | |
| 8,266,267 B1 | 9/2012 | Guruswamy | |
| 8,352,540 B2 | 1/2013 | Anglin et al. | |
| 8,356,001 B2 | 1/2013 | Collazo | |
| 8,433,869 B1 | 4/2013 | Natanzon | |
| 8,468,604 B2 | 6/2013 | Claudatos et al. | |
| 8,484,163 B1 | 7/2013 | Yucel | |
| 8,495,037 B1 | 7/2013 | Westenberg | |
| 8,495,472 B1 * | 7/2013 | Magerramov | G06Q 40/02 |
| | | | 714/774 |
| 8,495,740 B1 | 7/2013 | Rouland | |
| 8,499,349 B1 | 7/2013 | Cruz et al. | |
| 8,504,797 B2 * | 8/2013 | Mimatsu | G06F 3/0665 |
| | | | 709/213 |
| 8,504,876 B2 | 8/2013 | Mork et al. | |
| 8,527,544 B1 | 9/2013 | Colgrove et al. | |
| 8,554,703 B1 | 10/2013 | Lin et al. | |
| 8,560,747 B1 | 10/2013 | Tan et al. | |
| 8,621,241 B1 | 12/2013 | Stephenson | |
| 8,635,498 B2 | 1/2014 | Kahana et al. | |
| 8,667,583 B2 | 3/2014 | Polyakov et al. | |
| 8,683,591 B2 | 3/2014 | Wittenschlaeger | |
| 8,688,620 B2 | 4/2014 | Viswanathan et al. | |
| 8,700,875 B1 | 4/2014 | Barron et al. | |
| 8,706,914 B2 * | 4/2014 | Duchesneau | H04L 41/0816 |
| | | | 709/250 |
| 8,719,936 B2 | 5/2014 | Moffie et al. | |
| 8,745,004 B1 | 6/2014 | Natanzon et al. | |
| 8,751,463 B1 | 6/2014 | Chamness | |
| 8,793,790 B2 | 7/2014 | Khurana et al. | |
| 8,806,160 B2 | 8/2014 | Colgrove et al. | |
| 8,822,155 B2 * | 9/2014 | Sukumar | C12Q 1/6886 |
| | | | 435/6.12 |
| 8,862,727 B2 | 10/2014 | Jayachandran et al. | |
| 8,862,728 B2 | 10/2014 | Jayachandran et al. | |
| 8,863,293 B2 * | 10/2014 | Christodorescu | G06F 21/552 |
| | | | 726/25 |
| 8,874,850 B1 | 10/2014 | Goodson et al. | |
| 8,904,092 B2 | 12/2014 | Tucek | |
| 8,918,478 B2 * | 12/2014 | Ozzie | G06F 11/1004 |
| | | | 714/763 |
| 8,959,305 B1 | 2/2015 | Lecrone et al. | |
| 9,015,426 B2 | 4/2015 | Stabrawa | |
| 9,032,160 B1 | 5/2015 | Natanzon | |
| 9,069,955 B2 | 6/2015 | Dolph et al. | |
| 9,081,713 B1 | 7/2015 | Bennett | |
| 9,088,601 B2 | 7/2015 | Friedrichs et al. | |
| 9,092,146 B2 | 7/2015 | Jayaraman et al. | |
| 9,111,232 B2 | 8/2015 | Chi et al. | |
| 9,112,895 B1 | 8/2015 | Lin | |
| 9,189,334 B2 | 11/2015 | Bennett | |
| 9,197,514 B2 | 11/2015 | Finkelstein | |
| 9,197,658 B2 | 11/2015 | Wittenschlaeger | |
| 9,235,481 B1 | 1/2016 | Natanzon | |
| 9,246,935 B2 | 1/2016 | Lietz | |
| 9,256,736 B2 | 2/2016 | Tao | |
| 9,256,746 B2 | 2/2016 | Toback | |
| 9,258,321 B2 | 2/2016 | Amsler et al. | |
| 9,268,797 B2 | 2/2016 | Whitehead | |
| 9,275,063 B1 * | 3/2016 | Natanzon | G06F 3/0611 |
| 9,280,678 B2 * | 3/2016 | Redberg | G06F 16/164 |
| 9,311,182 B2 | 4/2016 | Bennett | |
| 9,317,686 B1 | 4/2016 | Ye et al. | |
| 9,324,022 B2 | 4/2016 | Williams, Jr. et al. | |
| 9,338,181 B1 * | 5/2016 | Burns | H04L 63/1433 |
| 9,348,742 B1 | 5/2016 | Brezinski | |
| 9,349,103 B2 | 5/2016 | Eberhardt, III et al. | |
| 9,350,750 B1 * | 5/2016 | Aval | H04L 63/1425 |
| 9,363,286 B2 | 6/2016 | Golovanov | |
| 9,386,009 B1 * | 7/2016 | Marion | H04L 63/083 |
| 9,395,922 B2 * | 7/2016 | Nishikido | G06F 3/065 |
| 9,407,646 B2 | 8/2016 | Cruz Mota | |
| 9,423,967 B2 | 8/2016 | Colgrove et al. | |
| 9,430,156 B1 | 8/2016 | Shilane et al. | |
| 9,436,396 B2 | 9/2016 | Colgrove et al. | |
| 9,436,720 B2 | 9/2016 | Colgrove et al. | |
| 9,454,476 B2 | 9/2016 | Colgrove et al. | |
| 9,454,477 B2 | 9/2016 | Colgrove et al. | |
| 9,477,693 B1 | 10/2016 | Bachu et al. | |
| 9,479,518 B1 | 10/2016 | Fang et al. | |
| 9,483,189 B2 | 11/2016 | Brooker | |
| 9,503,469 B2 | 11/2016 | Lin | |
| 9,513,820 B1 | 12/2016 | Shalev | |
| 9,516,016 B2 | 12/2016 | Colgrove et al. | |
| 9,516,053 B1 | 12/2016 | Muddu et al. | |

(56) References Cited

U.S. PATENT DOCUMENTS

| | | | |
|---|---|---|---|
| 9,552,248 B2 | 1/2017 | Miller et al. | |
| 9,552,299 B2 * | 1/2017 | Stalzer | G06F 12/0866 |
| 9,588,847 B1 | 3/2017 | Natanzon et al. | |
| 9,591,010 B1 | 3/2017 | Muddu et al. | |
| 9,596,254 B1 | 3/2017 | Muddu et al. | |
| 9,609,009 B2 | 3/2017 | Muddu et al. | |
| 9,609,011 B2 | 3/2017 | Muddu et al. | |
| 9,628,507 B2 | 4/2017 | Haq et al. | |
| 9,632,870 B2 | 4/2017 | Bennett | |
| 9,641,544 B1 | 5/2017 | Treat et al. | |
| 9,646,262 B2 | 5/2017 | Phillipps et al. | |
| 9,665,302 B1 * | 5/2017 | Huff | G06F 3/0608 |
| 9,665,303 B1 * | 5/2017 | Huff | G06F 3/0664 |
| 9,667,641 B2 | 5/2017 | Muddu et al. | |
| 9,679,165 B2 | 6/2017 | Pittelko | |
| 9,684,472 B2 | 6/2017 | Bish | |
| 9,686,294 B2 | 6/2017 | Kantor | |
| 9,692,785 B2 | 6/2017 | Stephan et al. | |
| 9,692,789 B2 | 6/2017 | Kirti et al. | |
| 9,696,939 B1 | 7/2017 | Frank | |
| 9,699,205 B2 | 7/2017 | Muddu et al. | |
| 9,705,914 B2 | 7/2017 | Di Pietro et al. | |
| 9,705,970 B2 | 7/2017 | Pomerantz et al. | |
| 9,716,723 B2 | 7/2017 | Wittenschlaeger | |
| 9,729,572 B1 * | 8/2017 | Adams | G06F 21/52 |
| 9,736,243 B2 | 8/2017 | Chablani | |
| 9,740,403 B2 * | 8/2017 | Storer | G06F 3/067 |
| 9,798,754 B1 | 10/2017 | Shilane | |
| 9,798,891 B2 | 10/2017 | Deulgaonkar | |
| 9,813,432 B2 | 11/2017 | Dasgupta et al. | |
| 9,813,435 B2 | 11/2017 | Muddu et al. | |
| 9,813,500 B2 | 11/2017 | Mason | |
| 9,824,609 B2 | 11/2017 | Sadeh-Koniecpol et al. | |
| 9,838,409 B2 | 12/2017 | Flacher et al. | |
| 9,838,410 B2 | 12/2017 | Muddu et al. | |
| 9,838,419 B1 | 12/2017 | Fleyder | |
| 9,864,874 B1 * | 1/2018 | Shanbhag | H04L 63/10 |
| 9,866,573 B2 | 1/2018 | Kozlovsky | |
| 9,870,251 B2 | 1/2018 | Baracaldo | |
| 9,875,355 B1 | 1/2018 | Williams | |
| 9,888,032 B2 | 2/2018 | Dekel | |
| 9,900,332 B2 | 2/2018 | Muddu et al. | |
| 9,904,587 B1 | 2/2018 | Potlapally et al. | |
| 9,916,849 B1 * | 3/2018 | Mader | G11B 7/126 |
| 9,917,854 B2 | 3/2018 | Natanzon | |
| 9,923,910 B2 | 3/2018 | Di Pietro et al. | |
| 9,928,155 B2 | 3/2018 | Xu et al. | |
| 9,930,061 B2 | 3/2018 | Zandani | |
| 9,940,206 B2 | 4/2018 | Bogdanov | |
| 9,948,663 B1 | 4/2018 | Wang et al. | |
| 9,954,884 B2 | 4/2018 | Hassell et al. | |
| 9,990,511 B1 * | 6/2018 | Dreyfus | G06F 3/0619 |
| 10,003,605 B2 | 6/2018 | Muddu et al. | |
| 10,015,177 B2 | 7/2018 | Muddu et al. | |
| 10,025,583 B2 | 7/2018 | Butler et al. | |
| 10,025,673 B1 * | 7/2018 | Maccanti | G06F 11/1451 |
| 10,032,033 B2 | 7/2018 | Gu | |
| 10,037,779 B1 | 7/2018 | Mendonsa et al. | |
| 10,038,707 B2 | 7/2018 | Muddu et al. | |
| 10,042,697 B2 | 8/2018 | Ahad | |
| 10,078,473 B2 | 9/2018 | Ahmed | |
| 10,102,356 B1 | 10/2018 | Sahin et al. | |
| 10,120,887 B1 | 11/2018 | Patel | |
| 10,122,740 B1 | 11/2018 | Finkelshtein et al. | |
| 10,122,752 B1 | 11/2018 | Soman et al. | |
| 10,169,601 B2 | 1/2019 | Arasan | |
| 10,185,495 B2 * | 1/2019 | Katsuki | G06F 3/0619 |
| 10,229,269 B1 * | 3/2019 | Patton | G06F 21/554 |
| 10,324,639 B2 * | 6/2019 | Seo | G06F 3/0688 |
| 10,359,939 B2 * | 7/2019 | Wei | G06F 3/0608 |
| 10,375,086 B2 * | 8/2019 | Ovcharik | H04L 9/002 |
| 10,397,236 B1 * | 8/2019 | Chadha | G06F 11/3476 |
| 10,409,986 B1 * | 9/2019 | Natanzon | G06F 12/1408 |
| 10,423,541 B1 * | 9/2019 | Levin | G06F 12/1009 |
| 10,438,000 B1 | 10/2019 | Gu | |
| 10,466,925 B1 * | 11/2019 | Blanco | G06F 3/067 |
| 10,476,907 B2 | 11/2019 | Hittel | |
| 10,496,487 B1 | 12/2019 | Natanzon | |
| 10,503,427 B2 * | 12/2019 | Botes | G06F 11/2094 |
| 10,503,611 B1 | 12/2019 | Srivastav | |
| 10,503,897 B1 * | 12/2019 | Striem-Amit | G06F 21/552 |
| 10,503,904 B1 * | 12/2019 | Singh | G06F 21/566 |
| 10,516,688 B2 | 12/2019 | Tamir | |
| 10,530,788 B1 * | 1/2020 | Kinger | H04L 63/1416 |
| 10,530,791 B2 | 1/2020 | Astigarraga | |
| 10,536,482 B2 | 1/2020 | Gabaev | |
| 10,542,021 B1 | 1/2020 | Mehr | |
| 10,558,809 B1 | 2/2020 | Joyce | |
| 10,567,406 B2 * | 2/2020 | Astigarraga | H04L 67/1097 |
| 10,567,500 B1 | 2/2020 | Leshinsky | |
| 10,587,484 B2 | 3/2020 | Nazar | |
| 10,587,632 B1 | 3/2020 | Perumalla | |
| 10,609,066 B1 | 3/2020 | Nossik | |
| 10,614,430 B2 * | 4/2020 | Armstrong | G06Q 20/3829 |
| 10,628,585 B2 | 4/2020 | Tamir | |
| 10,628,586 B1 | 4/2020 | Jung | |
| 10,673,628 B1 | 6/2020 | Shtop et al. | |
| 10,685,293 B1 | 6/2020 | Heimann | |
| 10,725,965 B1 | 7/2020 | Rokicki | |
| 10,733,290 B2 | 8/2020 | Berler | |
| 10,735,448 B2 * | 8/2020 | Kesin | G06N 7/01 |
| 10,742,682 B2 | 8/2020 | Yu | |
| 10,778,714 B2 | 9/2020 | Shi | |
| 10,789,361 B2 * | 9/2020 | Breiman | H04L 63/145 |
| 10,789,363 B1 | 9/2020 | Gursoy | |
| 10,810,088 B1 | 10/2020 | Gu et al. | |
| 10,819,721 B1 | 10/2020 | Jenkins | |
| 10,826,918 B1 | 11/2020 | Rasovic | |
| 10,846,137 B2 * | 11/2020 | Vallala | G06F 9/455 |
| 10,853,200 B2 | 12/2020 | Chen | |
| 10,877,683 B2 * | 12/2020 | Wu | G06F 3/0679 |
| 10,884,914 B2 | 1/2021 | Ahmed et al. | |
| 10,902,929 B1 * | 1/2021 | Pawlowski | G06F 12/0246 |
| 10,965,708 B2 * | 3/2021 | Kolychev | G06N 3/044 |
| 10,992,581 B2 * | 4/2021 | Kuang | H04L 47/125 |
| 11,005,936 B1 | 5/2021 | Liu et al. | |
| 11,010,233 B1 * | 5/2021 | Golden | G06F 21/554 |
| 11,025,665 B2 | 6/2021 | Newman | |
| 11,030,314 B2 | 6/2021 | Kucherov | |
| 11,036,392 B2 * | 6/2021 | Resch | G06F 11/1092 |
| 11,038,902 B2 | 6/2021 | Zaw | |
| 11,044,263 B2 | 6/2021 | McLean | |
| 11,049,039 B2 | 6/2021 | Zimmer | |
| 11,055,411 B2 | 7/2021 | Strogov | |
| 11,055,652 B1 | 7/2021 | Kannan | |
| 11,100,232 B1 | 8/2021 | Juncker | |
| 11,106,810 B2 * | 8/2021 | Natanzon | H04L 9/0894 |
| 11,144,638 B1 * | 10/2021 | Golden | G06F 21/566 |
| 11,170,107 B2 | 11/2021 | Selvaraj et al. | |
| 11,212,681 B1 * | 12/2021 | Balaramn | H04L 63/1466 |
| 11,263,699 B1 * | 3/2022 | Walker | G06T 7/0004 |
| 11,321,464 B2 * | 5/2022 | Govardhan | G06F 21/566 |
| 11,327,676 B1 * | 5/2022 | Fernandez | G06F 12/0862 |
| 11,336,685 B1 * | 5/2022 | Rodriguez | G06F 21/566 |
| 11,368,472 B2 * | 6/2022 | Dogu | H04L 63/1425 |
| 11,615,185 B2 * | 3/2023 | Lee | G06F 21/6218 |
| | | | 726/23 |
| 2002/0035683 A1 | 3/2002 | Kaashoek | |
| 2002/0038436 A1 | 3/2002 | Suzuki | |
| 2002/0087544 A1 | 7/2002 | Selkirk et al. | |
| 2002/0178335 A1 | 11/2002 | Selkirk et al. | |
| 2002/0184362 A1 | 12/2002 | Banerjee | |
| 2003/0140209 A1 | 7/2003 | Testardi | |
| 2004/0049572 A1 | 3/2004 | Yamamoto et al. | |
| 2004/0117640 A1 | 6/2004 | Chu | |
| 2004/0139340 A1 | 7/2004 | Johnson | |
| 2005/0020945 A1 | 1/2005 | Tosaya | |
| 2005/0023239 A1 * | 2/2005 | Lin | A61J 9/00 |
| | | | 215/11.1 |
| 2005/0066095 A1 | 3/2005 | Mullick et al. | |
| 2005/0193236 A1 | 9/2005 | Stager et al. | |
| 2005/0203921 A1 | 9/2005 | Newman | |
| 2005/0216535 A1 | 9/2005 | Saika et al. | |
| 2005/0223154 A1 | 10/2005 | Uemura | |

(56) References Cited

U.S. PATENT DOCUMENTS

| | | |
|---|---|---|
| 2005/0223239 A1 | 10/2005 | Dotan |
| 2006/0005227 A1 | 1/2006 | Samuelsson et al. |
| 2006/0021029 A1 | 1/2006 | Brickell et al. |
| 2006/0074940 A1 | 4/2006 | Craft et al. |
| 2006/0136365 A1 | 6/2006 | Kedem et al. |
| 2006/0155946 A1 | 7/2006 | Ji |
| 2007/0006319 A1* | 1/2007 | Fitzgibbon ............... H04L 9/00 726/27 |
| 2007/0067585 A1 | 3/2007 | Ueda et al. |
| 2007/0105589 A1 | 5/2007 | Lu |
| 2007/0109856 A1 | 5/2007 | Pellicone et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220068 A1 | 9/2007 | Thompson |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0022378 A1 | 1/2008 | Repasi et al. |
| 2008/0047013 A1 | 2/2008 | Claudatos et al. |
| 2008/0059699 A1 | 3/2008 | Kubo et al. |
| 2008/0065852 A1 | 3/2008 | Moore et al. |
| 2008/0095182 A1 | 4/2008 | Ezur |
| 2008/0098476 A1 | 4/2008 | Syversen |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0282045 A1 | 11/2008 | Biswas et al. |
| 2008/0285083 A1 | 11/2008 | Aonuma |
| 2008/0307270 A1 | 12/2008 | Li |
| 2009/0003131 A1* | 1/2009 | Meyer ...................... G01V 1/02 702/14 |
| 2009/0006587 A1 | 1/2009 | Richter |
| 2009/0037662 A1 | 2/2009 | La Frese et al. |
| 2009/0106318 A1 | 4/2009 | Mantripragada et al. |
| 2009/0133122 A1* | 5/2009 | Koo ...................... H04L 63/1416 726/23 |
| 2009/0158432 A1 | 6/2009 | Zheng et al. |
| 2009/0204700 A1 | 8/2009 | Satya Sudhakar |
| 2009/0204858 A1 | 8/2009 | Kawaba |
| 2009/0228648 A1 | 9/2009 | Wack |
| 2009/0300084 A1 | 12/2009 | Whitehouse |
| 2010/0005173 A1* | 1/2010 | Baskaran ............... G06F 9/5066 709/226 |
| 2010/0017870 A1 | 1/2010 | Kargupta |
| 2010/0031361 A1 | 2/2010 | Shukla |
| 2010/0057673 A1 | 3/2010 | Savov |
| 2010/0058026 A1 | 3/2010 | Heil et al. |
| 2010/0058122 A1 | 3/2010 | Compton |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0153620 A1 | 6/2010 | Mckean et al. |
| 2010/0153641 A1 | 6/2010 | Jagadish et al. |
| 2010/0191897 A1 | 7/2010 | Zhang et al. |
| 2010/0250713 A1 | 9/2010 | Sudhakar |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2010/0306849 A1 | 12/2010 | Zheng |
| 2011/0035540 A1* | 2/2011 | Fitzgerald ............... G06F 3/0688 711/E12.001 |
| 2011/0072300 A1 | 3/2011 | Rousseau |
| 2011/0072515 A1 | 3/2011 | Park |
| 2011/0125716 A1 | 5/2011 | Drews et al. |
| 2011/0121231 A1 | 6/2011 | Haas et al. |
| 2011/0145497 A1 | 6/2011 | Bish |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0191537 A1* | 8/2011 | Kawaguchi ............. G06F 3/061 711/E12.002 |
| 2011/0238634 A1 | 9/2011 | Kobara |
| 2011/0258164 A1 | 10/2011 | Mandagere |
| 2011/0271146 A1 | 11/2011 | Mork et al. |
| 2011/0296237 A1 | 12/2011 | Mandagere |
| 2012/0023375 A1 | 1/2012 | Dutta et al. |
| 2012/0036309 A1 | 2/2012 | Dillow et al. |
| 2012/0096225 A1 | 4/2012 | Khawand et al. |
| 2012/0117029 A1 | 5/2012 | Gold |
| 2012/0151593 A1* | 6/2012 | Kang ..................... H04L 43/026 726/25 |
| 2012/0159629 A1* | 6/2012 | Lee ........................ G06F 21/566 726/24 |
| 2012/0191933 A1* | 7/2012 | Zbiciak ............... G06F 12/1458 711/163 |
| 2012/0198175 A1 | 8/2012 | Atkisson |
| 2012/0198192 A1* | 8/2012 | Balasubramanian ....................... G06F 12/0246 711/163 |
| 2012/0221803 A1 | 8/2012 | Stabrawa |
| 2012/0296922 A1 | 11/2012 | Hsl |
| 2012/0303868 A1 | 11/2012 | Tucek |
| 2012/0311708 A1 | 12/2012 | Agarwal |
| 2012/0324236 A1 | 12/2012 | Srivastava et al. |
| 2012/0330954 A1 | 12/2012 | Sivasubramanian et al. |
| 2013/0036465 A1 | 2/2013 | Chuan et al. |
| 2013/0042052 A1 | 2/2013 | Colgrove et al. |
| 2013/0046995 A1 | 2/2013 | Movshovitz |
| 2013/0047029 A1 | 2/2013 | Keuchi et al. |
| 2013/0061322 A1 | 3/2013 | Sethumadhavan |
| 2013/0091102 A1 | 4/2013 | Nayak |
| 2013/0117507 A1 | 5/2013 | Chiang |
| 2013/0205110 A1 | 8/2013 | Kettner |
| 2013/0227236 A1 | 8/2013 | Flynn et al. |
| 2013/0254412 A1 | 9/2013 | Menezes |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2013/0340082 A1 | 12/2013 | Shanley |
| 2014/0004829 A1* | 1/2014 | Rieger .................. H04W 12/12 455/411 |
| 2014/0006760 A1 | 1/2014 | Nemiroff et al. |
| 2014/0052946 A1 | 2/2014 | Kimmel |
| 2014/0059688 A1* | 2/2014 | Margalit ............... G06F 21/561 726/24 |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0196115 A1 | 7/2014 | Pelykh |
| 2014/0201150 A1 | 7/2014 | Kumarasamy et al. |
| 2014/0201836 A1 | 7/2014 | Amsler |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0230051 A1 | 8/2014 | Vallinayagam |
| 2014/0230062 A1 | 8/2014 | Kumaran |
| 2014/0236891 A1* | 8/2014 | Talius ................. G06F 11/2048 709/224 |
| 2014/0281155 A1 | 9/2014 | Cohen |
| 2014/0281308 A1 | 9/2014 | Lango et al. |
| 2014/0283061 A1 | 9/2014 | Quinlan et al. |
| 2014/0289853 A1* | 9/2014 | Teddy ................... G06F 21/566 726/23 |
| 2014/0325115 A1 | 10/2014 | Ramsundar et al. |
| 2015/0047045 A1 | 2/2015 | Salsamendi |
| 2015/0081950 A1 | 3/2015 | Nezu |
| 2015/0106557 A1* | 4/2015 | Yu ...................... G11C 13/0004 711/103 |
| 2015/0106562 A1 | 4/2015 | Helmer |
| 2015/0221349 A1* | 8/2015 | Jeon ................... G06F 12/0246 711/149 |

(56) References Cited

U.S. PATENT DOCUMENTS

| | | |
|---|---|---|
| 2015/0234709 A1 | 8/2015 | Koarashi |
| 2015/0242856 A1 | 8/2015 | Dhurandhar |
| 2015/0244775 A1 | 8/2015 | Vibhor et al. |
| 2015/0278534 A1 | 10/2015 | Thiyagarajan et al. |
| 2015/0355957 A1 | 12/2015 | Steiner |
| 2015/0365427 A1 | 12/2015 | Ben-Shalom |
| 2015/0381646 A1 | 12/2015 | Lin |
| 2016/0019114 A1 | 1/2016 | Han et al. |
| 2016/0028754 A1 | 1/2016 | Cruz Mota |
| 2016/0078080 A1 | 3/2016 | Chen et al. |
| 2016/0078245 A1* | 3/2016 | Amarendran ......... G06N 20/00 713/193 |
| 2016/0098191 A1 | 4/2016 | Golden et al. |
| 2016/0098199 A1 | 4/2016 | Golden et al. |
| 2016/0099963 A1* | 4/2016 | Mahaffey ............ H04L 63/166 726/25 |
| 2016/0112397 A1 | 4/2016 | Mankovskii |
| 2016/0164918 A1* | 6/2016 | Satish ................ H04L 63/1433 |
| 2016/0170823 A1 | 6/2016 | Miller et al. |
| 2016/0173599 A1 | 6/2016 | Chablani |
| 2016/0277423 A1 | 9/2016 | Apostolescu et al. |
| 2016/0323105 A1* | 11/2016 | Lee ..................... H04L 9/0863 |
| 2016/0352518 A1* | 12/2016 | Ford ................... G06F 21/6218 |
| 2016/0352766 A1 | 12/2016 | Flacher et al. |
| 2016/0357483 A1 | 12/2016 | Okita et al. |
| 2016/0366156 A1 | 12/2016 | Kantor |
| 2016/0371152 A1 | 12/2016 | Parshin et al. |
| 2016/0378352 A1* | 12/2016 | Khan ..................... G06F 3/064 711/103 |
| 2017/0034189 A1 | 2/2017 | Powell |
| 2017/0054686 A1* | 2/2017 | Malkov .................. G06F 21/53 |
| 2017/0061322 A1 | 3/2017 | Chari et al. |
| 2017/0063534 A1* | 3/2017 | Brown ................ H04L 9/0662 |
| 2017/0063887 A1 | 3/2017 | Muddu et al. |
| 2017/0063888 A1 | 3/2017 | Muddu et al. |
| 2017/0063907 A1 | 3/2017 | Muddu et al. |
| 2017/0063908 A1 | 3/2017 | Muddu et al. |
| 2017/0063909 A1 | 3/2017 | Muddu et al. |
| 2017/0063910 A1 | 3/2017 | Muddu et al. |
| 2017/0063911 A1 | 3/2017 | Muddu et al. |
| 2017/0063912 A1 | 3/2017 | Muddu et al. |
| 2017/0104773 A1 | 4/2017 | Flacher et al. |
| 2017/0109057 A1* | 4/2017 | Karaca ................ G06F 3/0608 |
| 2017/0118240 A1 | 4/2017 | Devi Reddy |
| 2017/0131934 A1 | 5/2017 | Kaczmarczyk et al. |
| 2017/0134403 A1 | 5/2017 | Hearn |
| 2017/0134410 A1 | 5/2017 | Muddu et al. |
| 2017/0134415 A1 | 5/2017 | Muddu et al. |
| 2017/0140156 A1 | 5/2017 | Gu |
| 2017/0142140 A1 | 5/2017 | Muddu et al. |
| 2017/0147457 A1 | 5/2017 | Abhijeet |
| 2017/0149730 A1 | 5/2017 | Baughman |
| 2017/0155652 A1 | 6/2017 | Most et al. |
| 2017/0177867 A1 | 6/2017 | Crofton et al. |
| 2017/0180394 A1* | 6/2017 | Crofton ................ G06F 21/64 |
| 2017/0185296 A1 | 6/2017 | Dong et al. |
| 2017/0185301 A1 | 6/2017 | McGiverin |
| 2017/0192940 A1* | 7/2017 | Ghatage ............... G06F 40/123 |
| 2017/0206353 A1 | 7/2017 | Jai et al. |
| 2017/0213128 A1 | 7/2017 | Hammond et al. |
| 2017/0213154 A1 | 7/2017 | Hammond et al. |
| 2017/0213155 A1 | 7/2017 | Hammond et al. |
| 2017/0213156 A1 | 7/2017 | Hammond et al. |
| 2017/0223031 A1* | 8/2017 | Gu ...................... G06F 11/1448 |
| 2017/0235497 A1 | 8/2017 | Shih |
| 2017/0235507 A1 | 8/2017 | Sinha |
| 2017/0235561 A1* | 8/2017 | Butler .................. G06F 8/654 717/168 |
| 2017/0235758 A1 | 8/2017 | Gopalapura Venkatesh |
| 2017/0242788 A1 | 8/2017 | Ahmed et al. |
| 2017/0255652 A1 | 9/2017 | Kong et al. |
| 2017/0256325 A1 | 9/2017 | Pappu et al. |
| 2017/0277596 A1 | 9/2017 | Kyathanahalli et al. |
| 2017/0279836 A1 | 9/2017 | Vasseur et al. |
| 2017/0300422 A1* | 10/2017 | Szubbocsev ......... G06F 12/1009 |
| 2017/0301220 A1* | 10/2017 | Jarrell .................. H04W 4/70 |
| 2017/0316210 A1* | 11/2017 | Patil ..................... G06F 21/56 |
| 2017/0324755 A1* | 11/2017 | Dekel ................... G06F 21/60 |
| 2017/0329966 A1 | 11/2017 | Koganti |
| 2017/0331892 A1* | 11/2017 | Crofton ................ H04L 67/06 |
| 2017/0346839 A1 | 11/2017 | Peppe |
| 2017/0364681 A1* | 12/2017 | Roguine ............... G06F 21/554 |
| 2017/0374083 A1* | 12/2017 | Cohen .................. H04L 63/1416 |
| 2018/0004659 A1 | 1/2018 | Greenspan |
| 2018/0007069 A1 | 1/2018 | Hunt et al. |
| 2018/0024893 A1* | 1/2018 | Sella .................... G06F 11/1458 707/648 |
| 2018/0032758 A1* | 2/2018 | Wang ................... H04L 63/0421 |
| 2018/0032759 A1* | 2/2018 | Radocchia ........... G06F 21/6254 |
| 2018/0048658 A1 | 2/2018 | Hittel et al. |
| 2018/0052999 A1* | 2/2018 | Mitola, III ............ G06F 21/71 |
| 2018/0054452 A1 | 2/2018 | Muddu et al. |
| 2018/0054454 A1 | 2/2018 | Astigarraga |
| 2018/0063179 A1* | 3/2018 | Salajegheh .......... H04L 63/1408 |
| 2018/0069888 A1 | 3/2018 | Muddu et al. |
| 2018/0082075 A1 | 3/2018 | Copeland |
| 2018/0103106 A1* | 4/2018 | Cocagne ............... H04L 67/535 |
| 2018/0107824 A1* | 4/2018 | Gibbons, Jr. ......... G06F 21/565 |
| 2018/0113638 A1 | 4/2018 | Petersen |
| 2018/0114234 A1 | 4/2018 | Fighel |
| 2018/0115577 A1 | 4/2018 | Shukla et al. |
| 2018/0124073 A1 | 5/2018 | Scherman et al. |
| 2018/0124086 A1 | 5/2018 | Flacher et al. |
| 2018/0129579 A1 | 5/2018 | Debnath et al. |
| 2018/0139053 A1* | 5/2018 | Kadam ................ G06F 3/0622 |
| 2018/0157834 A1* | 6/2018 | Continella ........... G06F 21/568 |
| 2018/0189000 A1* | 7/2018 | Li ......................... G06F 3/0608 |
| 2018/0189508 A1* | 7/2018 | Li ......................... G06F 21/6218 |
| 2018/0191763 A1 | 7/2018 | Hillard et al. |
| 2018/0198765 A1* | 7/2018 | Maybee ................ G06F 11/07 |
| 2018/0198812 A1 | 7/2018 | Christodorescu et al. |
| 2018/0204000 A1 | 7/2018 | Charters et al. |
| 2018/0211038 A1* | 7/2018 | Breiman .............. G06F 11/1451 |
| 2018/0211039 A1 | 7/2018 | Tamir |
| 2018/0212987 A1 | 7/2018 | Tamir |
| 2018/0217996 A1 | 8/2018 | Joshi et al. |
| 2018/0219894 A1* | 8/2018 | Crabtree ............... H04L 63/20 |
| 2018/0225461 A1 | 8/2018 | Kotler et al. |
| 2018/0239920 A1 | 8/2018 | Gupta |
| 2018/0246649 A1* | 8/2018 | Datar .................... G06F 3/067 |
| 2018/0248896 A1* | 8/2018 | Challita ............... G06F 21/554 |
| 2018/0275902 A1* | 9/2018 | Monday ................ G06F 3/0632 |
| 2018/0278647 A1* | 9/2018 | Gabaev ................. H04L 63/1425 |
| 2018/0284758 A1 | 10/2018 | Cella |
| 2018/0285382 A1* | 10/2018 | Mehta ................... G06F 16/951 |
| 2018/0285567 A1 | 10/2018 | Raman |
| 2018/0293374 A1 | 10/2018 | Chen |
| 2018/0295149 A1* | 10/2018 | Gazit ................... H04L 63/1408 |
| 2018/0307839 A1* | 10/2018 | Bhave .................. G06F 21/552 |
| 2018/0316727 A1* | 11/2018 | Tsironis ................ H04L 63/0263 |
| 2018/0351969 A1 | 12/2018 | MacLeod |
| 2018/0373877 A1 | 12/2018 | Bruso |
| 2018/0375826 A1* | 12/2018 | Chang .................. G06F 3/065 |
| 2019/0007284 A1 | 1/2019 | Doshi |
| 2019/0012382 A1* | 1/2019 | Minkovicz ............ G10L 15/07 |
| 2019/0018784 A1* | 1/2019 | Ishii ...................... G06F 12/10 |
| 2019/0034647 A1 | 1/2019 | Avrahami |
| 2019/0036958 A1 | 1/2019 | Shi |
| 2019/0041842 A1* | 2/2019 | Cella .................... B62D 15/0215 |
| 2019/0042744 A1* | 2/2019 | Rajasekharan ....... G06F 21/565 |
| 2019/0044951 A1* | 2/2019 | Zivkovic .............. H04L 67/535 |
| 2019/0081876 A1 | 3/2019 | Ghare |
| 2019/0081981 A1* | 3/2019 | Bansal ................. H04W 12/122 |
| 2019/0087256 A1* | 3/2019 | Horrell ................. G01M 99/005 |
| 2019/0087572 A1 | 3/2019 | Ellam |
| 2019/0098040 A1 | 3/2019 | Newman |
| 2019/0102262 A1* | 4/2019 | Sukhomlinov ....... G06F 11/1469 |
| 2019/0108099 A1 | 4/2019 | Mazumdar |
| 2019/0108119 A1* | 4/2019 | Gholamipour ........ G06F 3/0616 |
| 2019/0108340 A1 | 4/2019 | Bedhapudi et al. |
| 2019/0108341 A1 | 4/2019 | Bedhapudi |
| 2019/0108889 A1* | 4/2019 | Gholamipour ....... G06F 12/0623 |
| 2019/0109870 A1* | 4/2019 | Bedhapudi ........... H04L 63/0428 |
| 2019/0121576 A1 | 4/2019 | Jean |

(56) References Cited

U.S. PATENT DOCUMENTS

| | | | |
|---|---|---|---|
| 2019/0121972 A1 | 4/2019 | Norvill | |
| 2019/0121978 A1* | 4/2019 | Kraemer | G06F 21/565 |
| 2019/0130097 A1 | 5/2019 | Berler et al. | |
| 2019/0138727 A1 | 5/2019 | Dontov et al. | |
| 2019/0156861 A1* | 5/2019 | Burton | H03M 13/2906 |
| 2019/0158512 A1 | 5/2019 | Zhang | |
| 2019/0188065 A1 | 6/2019 | Anghel | |
| 2019/0188385 A1* | 6/2019 | Selvaraj | G06F 21/568 |
| 2019/0196731 A1 | 6/2019 | Sapuntzakis et al. | |
| 2019/0197239 A1 | 6/2019 | Govardhan | |
| 2019/0207960 A1 | 7/2019 | Chu | |
| 2019/0207969 A1* | 7/2019 | Brown | G06F 21/552 |
| 2019/0209022 A1 | 7/2019 | Sobol | |
| 2019/0213137 A1 | 7/2019 | Lin et al. | |
| 2019/0213586 A1* | 7/2019 | Baratam | G06Q 20/0655 |
| 2019/0236272 A1* | 8/2019 | Piatt | G06F 21/566 |
| 2019/0258426 A1 | 8/2019 | Roh | |
| 2019/0266335 A1* | 8/2019 | Robinson | H04L 9/08 |
| 2019/0288840 A1 | 9/2019 | Gallancy et al. | |
| 2019/0294507 A1* | 9/2019 | Linnen | G06F 17/18 |
| 2019/0303571 A1 | 10/2019 | Chelarescu et al. | |
| 2019/0303572 A1 | 10/2019 | Chelarescu et al. | |
| 2019/0303573 A1 | 10/2019 | Chelarescu et al. | |
| 2019/0303575 A1 | 10/2019 | Chelarescu et al. | |
| 2019/0319980 A1* | 10/2019 | Levy | G06N 5/048 |
| 2019/0319987 A1* | 10/2019 | Levy | G06F 16/93 |
| 2019/0324644 A1* | 10/2019 | Jin | G06F 3/064 |
| 2019/0347418 A1 | 11/2019 | Strogov | |
| 2019/0354443 A1* | 11/2019 | Haustein | G06F 11/1451 |
| 2019/0369918 A1* | 12/2019 | Cho | G06F 3/0608 |
| 2019/0392417 A1* | 12/2019 | Li | G06Q 20/3221 |
| 2020/0019470 A1 | 1/2020 | Wolfson et al. | |
| 2020/0036736 A1 | 1/2020 | Novikov | |
| 2020/0042707 A1 | 2/2020 | Kucherov | |
| 2020/0065483 A1 | 2/2020 | Mu et al. | |
| 2020/0076831 A1* | 3/2020 | Baughman | H04L 63/20 |
| 2020/0104475 A1* | 4/2020 | Guionneau | H04L 9/0643 |
| 2020/0128027 A1 | 4/2020 | Hittel | |
| 2020/0128028 A1 | 4/2020 | Hittel | |
| 2020/0134049 A1* | 4/2020 | Bassov | G06F 16/1752 |
| 2020/0159674 A1* | 5/2020 | Morgan | G06F 12/0238 |
| 2020/0186602 A1 | 6/2020 | Leshinsky | |
| 2020/0201777 A1 | 6/2020 | Kalamatianos et al. | |
| 2020/0204589 A1 | 6/2020 | Strogov et al. | |
| 2020/0233959 A1* | 7/2020 | Spurlock | G06F 11/3006 |
| 2020/0236085 A1* | 7/2020 | Spurlock | G06F 11/3409 |
| 2020/0236121 A1 | 7/2020 | Spurlock | |
| 2020/0250051 A1 | 8/2020 | Chen | |
| 2020/0250522 A1* | 8/2020 | Meiri | G06N 3/08 |
| 2020/0257798 A1* | 8/2020 | Rao | G01R 31/3170 |
| 2020/0257820 A1* | 8/2020 | Li | H04L 67/1097 |
| 2020/0274887 A1 | 8/2020 | Zaw | |
| 2020/0285737 A1* | 9/2020 | Kraus | G06F 21/552 |
| 2020/0293696 A1* | 9/2020 | Motwani | H04L 9/0631 |
| 2020/0319979 A1 | 10/2020 | Kulaga | |
| 2020/0341685 A1 | 10/2020 | Sharon et al. | |
| 2020/0344254 A1 | 10/2020 | Kokko | |
| 2020/0356686 A1* | 11/2020 | Vijayvargiya | G06F 21/568 |
| 2020/0358780 A1* | 11/2020 | Anbalagan | H04L 63/10 |
| 2020/0364128 A1* | 11/2020 | Vittal | G06F 9/45558 |
| 2020/0364429 A1* | 11/2020 | Yang | G06K 7/1473 |
| 2020/0389469 A1* | 12/2020 | Litichever | H04W 4/40 |
| 2021/0006575 A1 | 1/2021 | McLean | |
| 2021/0011654 A1* | 1/2021 | Lee | G06F 12/02 |
| 2021/0026961 A1 | 1/2021 | Underwood | |
| 2021/0056203 A1* | 2/2021 | Qiao | G06F 16/27 |
| 2021/0096957 A1* | 4/2021 | Rahman | G06F 11/1471 |
| 2021/0103490 A1* | 4/2021 | LeCrone | G06F 11/0772 |
| 2021/0111881 A1* | 4/2021 | Migault | H04L 9/0841 |
| 2021/0117377 A1* | 4/2021 | Savir | G06F 16/178 |
| 2021/0152520 A1 | 5/2021 | Rigor | |
| 2021/0152592 A1 | 5/2021 | Martynenko | |
| 2021/0157523 A1* | 5/2021 | Matsushita | G06F 3/0608 |
| 2021/0182397 A1 | 6/2021 | Karnik | |
| 2021/0216408 A1* | 7/2021 | Huskisson | G06F 3/0653 |
| 2021/0216478 A1* | 7/2021 | Miller | G06F 21/79 |
| 2021/0216625 A1 | 7/2021 | Miller et al. | |
| 2021/0216627 A1* | 7/2021 | Grunwald | G06F 12/0246 |
| 2021/0216630 A1* | 7/2021 | Karr | H04L 63/1416 |
| 2021/0216633 A1* | 7/2021 | Lee | G06F 21/6218 |
| 2021/0216646 A1 | 7/2021 | Miller et al. | |
| 2021/0216648 A1* | 7/2021 | Child | G06F 21/604 |
| 2021/0216666 A1* | 7/2021 | Miller | G06F 12/1408 |
| 2021/0224379 A1* | 7/2021 | Pientka | G06F 11/1464 |
| 2021/0240608 A1* | 8/2021 | Jean | G06F 12/0292 |
| 2021/0255938 A1* | 8/2021 | Baker | G06F 11/1469 |
| 2021/0271757 A1* | 9/2021 | Horspool | G06F 21/554 |
| 2021/0314341 A1* | 10/2021 | Moskovich | H04L 63/1416 |
| 2021/0319103 A1* | 10/2021 | Constantinescu | G06F 16/182 |
| 2021/0374096 A1* | 12/2021 | Von Hein | G06F 16/128 |
| 2021/0397711 A1* | 12/2021 | Karr | G06F 21/78 |
| 2022/0150241 A1* | 5/2022 | Nadiminti | H04L 63/0853 |
| 2022/0229909 A1* | 7/2022 | Shachar | G06F 21/572 |
| 2022/0239690 A1* | 7/2022 | Arnon | H04L 69/22 |

FOREIGN PATENT DOCUMENTS

| | | |
|---|---|---|
| CN | 103370686 B | 8/2016 |
| CN | 104025010 | 11/2016 |
| EP | 3066610 | 9/2016 |
| EP | 3082047 | 10/2016 |
| EP | 3120235 | 1/2017 |
| JP | 2007087036 | 4/2007 |
| JP | 2007094472 | 4/2007 |
| JP | 2008250667 | 10/2008 |
| JP | 2010211681 | 9/2010 |
| WO | 1995002349 | 1/1995 |
| WO | 1999013403 | 3/1999 |
| WO | 2008102347 | 8/2008 |
| WO | 2010071655 | 6/2010 |

OTHER PUBLICATIONS

Mehnaz,S. et al.,"RWGuard: A Real-Time Detection System Against Cryptographic Ransomware", Springer Nature Switzerland AG 2018. RAID LNCS 11050, pp. 114-136, 2018. https://doi.org/10/1007/978-3-030-00470-5_6.

Microsoft Corporation, et al., "Fundamentals of Garbage Collection", Retrieved Aug. 30, 2013 via the WayBack Machine, 11 pages.

Microsoft Corporation, et al.,"GCSettings.IsServerGC Property", Retrieved Oct. 27, 2013 via the WayBack Machine, 3 pages.

Scaife,N. et al.,"CryptoLock (and Drop It): Stopping Ransomware Attacks on User Data", 2016 IEEE 36th International Conference on Distributed Computing Systems.

Strunk,J.D. et al.,"Self-Securing Storage: Protecting Data in Compromised Systems", Carnegie Mellon University. Operating Systems Design and Implementation (San Diego, CA, Oct. 23-25, 2000), pp. 165-180. USENIX Association, 2000.

"International Search Report and Written Opinion received in International Application No. PCT/US2022/047039 dated Jan. 30, 2023".

Hwang K., et al., "RAID-x: A New Distributed Disk Array for I/O-Centric Cluster Computing," Proceedings of The Ninth International Symposium On High-performance Distributed Computing, IEEE Computer Society, Los Alamitos, CA, Aug. 2000, pp. 279-286.

International Search Report and Written Opinion for International Application No. PCT/US2023/023859, mailed Sep. 20, 2023, 13 pages.

Stalzer M.A., "FlashBlades: System Architecture and Applications," Proceedings of the 2nd Workshop on Architectures and Systems for Big Data, Association for Computing Machinery, New York, NY, 2012, pp. 10-14.

Storer M.W., et al., "Pergamum: Replacing Tape with Energy Efficient, Reliable, Disk-Based Archival Storage," 6TH USENIX Conference on File And Storage Technologies (FAST'08), San Jose,

(56) References Cited

OTHER PUBLICATIONS

CA, USA, Feb. 26-29, 2008, 16 Pages, ISBN 978-1-931971-56-0, XP002665467.

* cited by examiner

SNAPSHOT DELETION PATTERN-BASED DETERMINATION OF RANSOMWARE ATTACK AGAINST DATA MAINTAINED BY A STORAGE SYSTEM

RELATED APPLICATIONS

The present application is a continuation-in-part of U.S. patent application Ser. No. 16/711,060, filed on Dec. 11, 2019, which claims priority under 35 U.S.C. § 119(e) to U.S. Provisional Patent Application No. 62/939,518, filed Nov. 22, 2019, each of which is incorporated herein by reference in its entirety.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DESCRIPTION OF EMBODIMENTS

Figure 1A:
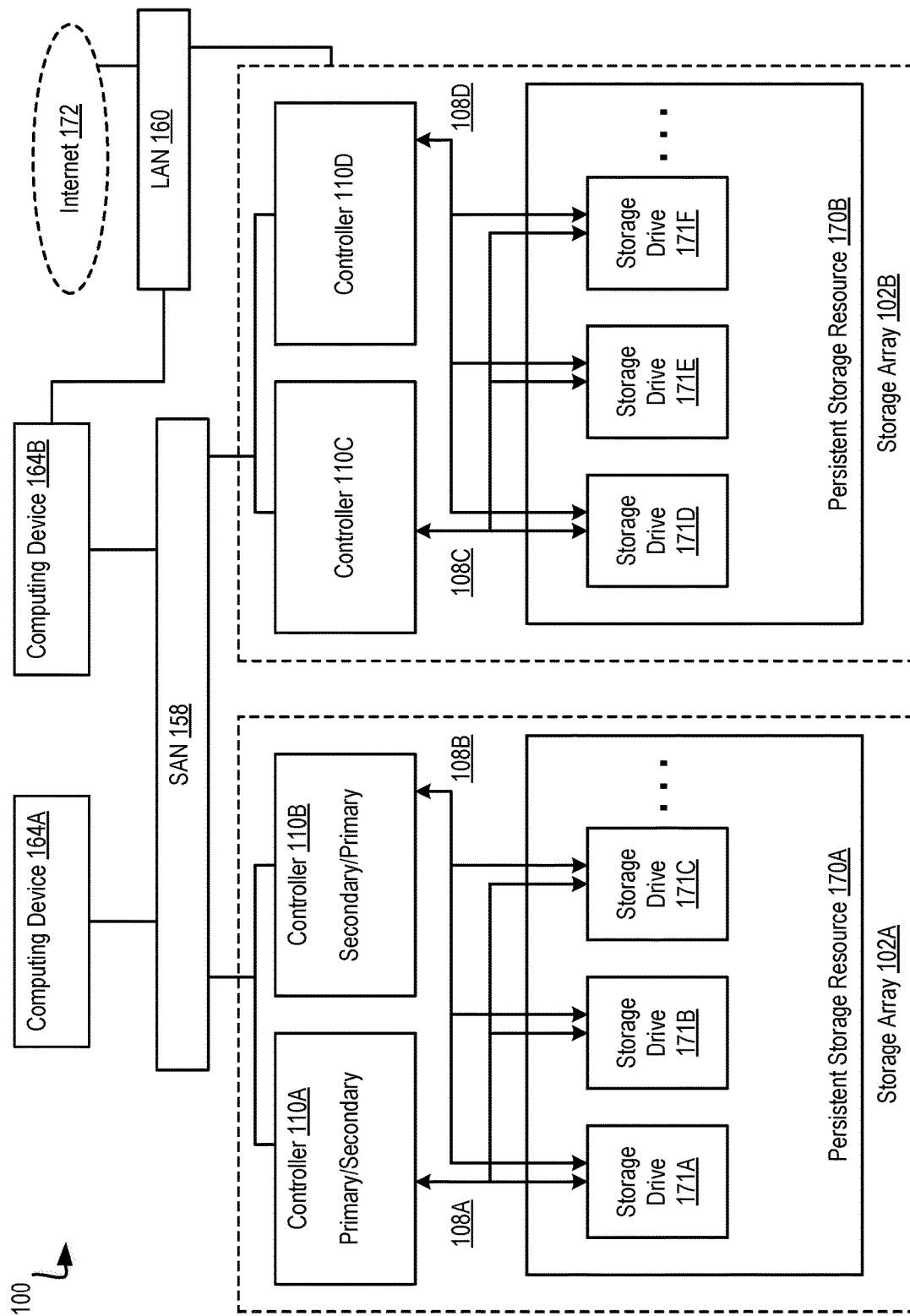
FIG. 1A illustrates a first example system for data storage in accordance with some implementations.

Example methods, apparatus, and products for mitigation of operations with respect to storage structures in accordance with embodiments of the present disclosure are described with reference to the accompanying drawings, beginning with FIG. 1A. FIG. 1A illustrates an example system for data storage, in accordance with some implementations. System 100 (also referred to as "storage system" herein) includes numerous elements for purposes of illustration rather than limitation. It may be noted that system 100 may include the same, more, or fewer elements configured in the same or different manner in other implementations.

System 100 includes a number of computing devices 164A-B. Computing devices (also referred to as "client devices" herein) may be embodied, for example, a server in a data center, a workstation, a personal computer, a notebook, or the like. Computing devices 164A-B may be coupled for data communications to one or more storage arrays 102A-B through a storage area network ('SAN') 158 or a local area network ('LAN') 160.

The SAN 158 may be implemented with a variety of data communications fabrics, devices, and protocols. For example, the fabrics for SAN 158 may include Fibre Channel, Ethernet, Infiniband, Serial Attached Small Computer System Interface ('SAS'), or the like. Data communications protocols for use with SAN 158 may include Advanced Technology Attachment ('ATA'), Fibre Channel Protocol, Small Computer System Interface ('SCSI'), Internet Small Computer System Interface ('iSCSI'), HyperSCSI, Non-Volatile Memory Express ('NVMe') over Fabrics, or the like. It may be noted that SAN 158 is provided for illustration, rather than limitation. Other data communication couplings may be implemented between computing devices 164A-B and storage arrays 102A-B.

The LAN 160 may also be implemented with a variety of fabrics, devices, and protocols. For example, the fabrics for LAN 160 may include Ethernet (802.3), wireless (802.11), or the like. Data communication protocols for use in LAN 160 may include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP'), or the like.

Storage arrays 102A-B may provide persistent data storage for the computing devices 164A-B. Storage array 102A may be contained in a chassis (not shown), and storage array 102B may be contained in another chassis (not shown), in implementations. Storage array 102A and 102B may include one or more storage array controllers 110A-D (also referred to as "controller" herein). A storage array controller 110A-D may be embodied as a module of automated computing machinery comprising computer hardware, computer software, or a combination of computer hardware and software. In some implementations, the storage array controllers 110A-D may be configured to carry out various storage tasks. Storage tasks may include writing data received from the computing devices 164A-B to storage array 102A-B, erasing data from storage array 102A-B, retrieving data from storage array 102A-B and providing data to computing devices 164A-B, monitoring and reporting of disk utilization and performance, performing redundancy operations, such as Redundant Array of Independent Drives ('RAID') or RAID-like data redundancy operations, compressing data, encrypting data, and so forth.

Storage array controller 110A-D may be implemented in a variety of ways, including as a Field Programmable Gate Array ('FPGA'), a Programmable Logic Chip ('PLC'), an Application Specific Integrated Circuit ('ASIC'), System-on-Chip ('SOC'), or any computing device that includes discrete components such as a processing device, central processing unit, computer memory, or various adapters. Storage array controller 110A-D may include, for example, a data communications adapter configured to support communications via the SAN 158 or LAN 160. In some implementations, storage array controller 110A-D may be independently coupled to the LAN 160. In implementations, storage array controller 110A-D may include an I/O controller or the like that couples the storage array controller 110A-D for data communications, through a midplane (not shown), to a persistent storage resource 170A-B (also referred to as a "storage resource" herein). The persistent storage resource 170A-B main include any number of storage drives 171A-F (also referred to as "storage devices" herein) and any number of non-volatile Random Access Memory ('NVRAM') devices (not shown).

In some implementations, the NVRAM devices of a persistent storage resource 170A-B may be configured to receive, from the storage array controller 110A-D, data to be stored in the storage drives 171A-F. In some examples, the data may originate from computing devices 164A-B. In some examples, writing data to the NVRAM device may be carried out more quickly than directly writing data to the storage drive 171A-F. In implementations, the storage array controller 110A-D may be configured to utilize the NVRAM devices as a quickly accessible buffer for data destined to be written to the storage drives 171A-F. Latency for write requests using NVRAM devices as a buffer may be improved relative to a system in which a storage array controller 110A-D writes data directly to the storage drives 171A-F. In some implementations, the NVRAM devices may be implemented with computer memory in the form of high bandwidth, low latency RAM. The NVRAM device is referred to as "non-volatile" because the NVRAM device may receive or include a unique power source that maintains the state of the RAM after main power loss to the NVRAM device. Such a power source may be a battery, one or more capacitors, or the like. In response to a power loss, the NVRAM device may be configured to write the contents of the RAM to a persistent storage, such as the storage drives 171A-F.

In implementations, storage drive 171A-F may refer to any device configured to record data persistently, where "persistently" or "persistent" refers as to a device's ability to maintain recorded data after loss of power. In some implementations, storage drive 171A-F may correspond to non-disk storage media. For example, the storage drive 171A-F may be one or more solid-state drives ('SSDs'), flash memory based storage, any type of solid-state non-volatile memory, or any other type of non-mechanical storage device. In other implementations, storage drive 171A-F may include mechanical or spinning hard disk, such as hard-disk drives ('HDD').

In some implementations, the storage array controllers 110A-D may be configured for offloading device management responsibilities from storage drive 171A-F in storage array 102A-B. For example, storage array controllers 110A-D may manage control information that may describe the state of one or more memory blocks in the storage drives 171A-F. The control information may indicate, for example, that a particular memory block has failed and should no longer be written to, that a particular memory block contains boot code for a storage array controller 110A-D, the number of program-erase ('P/E') cycles that have been performed on a particular memory block, the age of data stored in a particular memory block, the type of data that is stored in a particular memory block, and so forth. In some implementations, the control information may be stored with an associated memory block as metadata. In other implementations, the control information for the storage drives 171A-F may be stored in one or more particular memory blocks of the storage drives 171A-F that are selected by the storage array controller 110A-D. The selected memory blocks may be tagged with an identifier indicating that the selected memory block contains control information. The identifier may be utilized by the storage array controllers 110A-D in conjunction with storage drives 171A-F to quickly identify the memory blocks that contain control information. For example, the storage controllers 110A-D may issue a command to locate memory blocks that contain control information. It may be noted that control information may be so large that parts of the control information may be stored in multiple locations, that the control information may be stored in multiple locations for purposes of redundancy, for example, or that the control information may otherwise be distributed across multiple memory blocks in the storage drive 171A-F.

In implementations, storage array controllers 110A-D may offload device management responsibilities from storage drives 171A-F of storage array 102A-B by retrieving, from the storage drives 171A-F, control information describing the state of one or more memory blocks in the storage drives 171A-F. Retrieving the control information from the storage drives 171A-F may be carried out, for example, by the storage array controller 110A-D querying the storage drives 171A-F for the location of control information for a particular storage drive 171A-F. The storage drives 171A-F may be configured to execute instructions that enable the storage drive 171A-F to identify the location of the control information. The instructions may be executed by a controller (not shown) associated with or otherwise located on the storage drive 171A-F and may cause the storage drive 171A-F to scan a portion of each memory block to identify the memory blocks that store control information for the storage drives 171A-F. The storage drives 171A-F may respond by sending a response message to the storage array controller 110A-D that includes the location of control information for the storage drive 171A-F. Responsive to receiving the response message, storage array controllers 110A-D may issue a request to read data stored at the address associated with the location of control information for the storage drives 171A-F.

In other implementations, the storage array controllers 110A-D may further offload device management responsibilities from storage drives 171A-F by performing, in response to receiving the control information, a storage drive management operation. A storage drive management operation may include, for example, an operation that is typically performed by the storage drive 171A-F (e.g., the controller (not shown) associated with a particular storage drive 171A-F). A storage drive management operation may include, for example, ensuring that data is not written to failed memory blocks within the storage drive 171A-F, ensuring that data is written to memory blocks within the storage drive 171A-F in such a way that adequate wear leveling is achieved, and so forth.

In implementations, storage array 102A-B may implement two or more storage array controllers 110A-D. For example, storage array 102A may include storage array controllers 110A and storage array controllers 110B. At a given instance, a single storage array controller 110A-D (e.g., storage array controller 110A) of a storage system 100 may be designated with primary status (also referred to as "primary controller" herein), and other storage array controllers 110A-D (e.g., storage array controller 110A) may be designated with secondary status (also referred to as "secondary controller" herein). The primary controller may have particular rights, such as permission to alter data in persistent storage resource 170A-B (e.g., writing data to persistent storage resource 170A-B). At least some of the rights of the primary controller may supersede the rights of the secondary controller. For instance, the secondary controller may not have permission to alter data in persistent storage resource 170A-B when the primary controller has the right. The status of storage array controllers 110A-D may change. For example, storage array controller 110A may be designated with secondary status, and storage array controller 110B may be designated with primary status.

In some implementations, a primary controller, such as storage array controller 110A, may serve as the primary controller for one or more storage arrays 102A-B, and a second controller, such as storage array controller 110B, may serve as the secondary controller for the one or more storage arrays 102A-B. For example, storage array controller 110A may be the primary controller for storage array 102A and storage array 102B, and storage array controller 110B may be the secondary controller for storage array 102A and 102B. In some implementations, storage array controllers 110C and 110D (also referred to as "storage processing modules") may neither have primary or secondary status. Storage array controllers 110C and 110D, implemented as storage processing modules, may act as a communication interface between the primary and secondary controllers (e.g., storage array controllers 110A and 110B, respectively) and storage array 102B. For example, storage array controller 110A of storage array 102A may send a write request, via SAN 158, to storage array 102B. The write request may be received by both storage array controllers 110C and 110D of storage array 102B. Storage array controllers 110C and 110D facilitate the communication, e.g., send the write request to the appropriate storage drive 171A-F. It may be noted that in some implementations storage processing modules may be used to increase the number of storage drives controlled by the primary and secondary controllers.

In implementations, storage array controllers 110A-D are communicatively coupled, via a midplane (not shown), to one or more storage drives 171A-F and to one or more NVRAM devices (not shown) that are included as part of a storage array 102A-B. The storage array controllers 110A-D may be coupled to the midplane via one or more data communication links and the midplane may be coupled to the storage drives 171A-F and the NVRAM devices via one or more data communications links. The data communications links described herein are collectively illustrated by data communications links 108A-D and may include a Peripheral Component Interconnect Express ('PCIe') bus, for example.

Figure 1B:
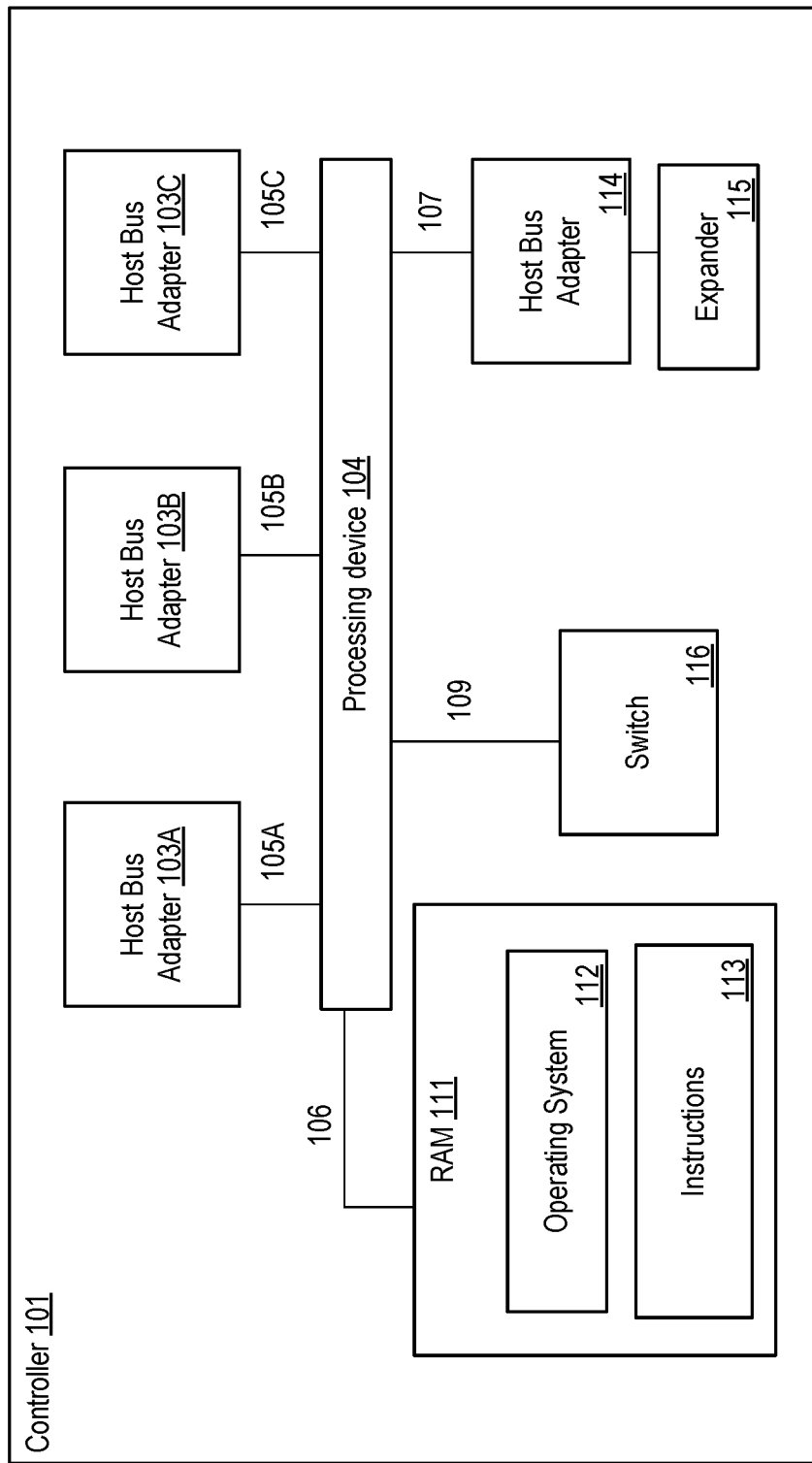
FIG. 1B illustrates a second example system for data storage in accordance with some implementations.

FIG. 1B illustrates an example system for data storage, in accordance with some implementations. Storage array controller 101 illustrated in FIG. 1B may similar to the storage array controllers 110A-D described with respect to FIG. 1A. In one example, storage array controller 101 may be similar to storage array controller 110A or storage array controller 110B. Storage array controller 101 includes numerous elements for purposes of illustration rather than limitation. It may be noted that storage array controller 101 may include the same, more, or fewer elements configured in the same or different manner in other implementations. It may be noted that elements of FIG. 1A may be included below to help illustrate features of storage array controller 101.

Storage array controller 101 may include one or more processing devices 104 and random access memory ('RAM') 111. Processing device 104 (or controller 101) represents one or more general-purpose processing devices such as a microprocessor, central processing unit, or the like. More particularly, the processing device 104 (or controller 101) may be a complex instruction set computing ('CISC') microprocessor, reduced instruction set computing ('RISC') microprocessor, very long instruction word ('VLIW') microprocessor, or a processor implementing other instruction sets or processors implementing a combination of instruction sets. The processing device 104 (or controller 101) may also be one or more special-purpose processing devices such as an ASIC, an FPGA, a digital signal processor ('DSP'), network processor, or the like.

The processing device 104 may be connected to the RAM 111 via a data communications link 106, which may be embodied as a high speed memory bus such as a Double-Data Rate 4 ('DDR4') bus. Stored in RAM 111 is an operating system 112. In some implementations, instructions 113 are stored in RAM 111. Instructions 113 may include computer program instructions for performing operations in in a direct-mapped flash storage system. In one embodiment, a direct-mapped flash storage system is one that that addresses data blocks within flash drives directly and without an address translation performed by the storage controllers of the flash drives.

In implementations, storage array controller 101 includes one or more host bus adapters 103A-C that are coupled to the processing device 104 via a data communications link 105A-C. In implementations, host bus adapters 103A-C may be computer hardware that connects a host system (e.g., the storage array controller) to other network and storage arrays. In some examples, host bus adapters 103A-C may be a Fibre Channel adapter that enables the storage array controller 101 to connect to a SAN, an Ethernet adapter that enables the storage array controller 101 to connect to a LAN, or the like. Host bus adapters 103A-C may be coupled to the processing device 104 via a data communications link 105A-C such as, for example, a PCIe bus.

In implementations, storage array controller 101 may include a host bus adapter 114 that is coupled to an expander 115. The expander 115 may be used to attach a host system to a larger number of storage drives. The expander 115 may, for example, be a SAS expander utilized to enable the host bus adapter 114 to attach to storage drives in an implementation where the host bus adapter 114 is embodied as a SAS controller.

In implementations, storage array controller 101 may include a switch 116 coupled to the processing device 104 via a data communications link 109. The switch 116 may be a computer hardware device that can create multiple endpoints out of a single endpoint, thereby enabling multiple devices to share a single endpoint. The switch 116 may, for example, be a PCIe switch that is coupled to a PCIe bus (e.g., data communications link 109) and presents multiple PCIe connection points to the midplane.

In implementations, storage array controller 101 includes a data communications link 107 for coupling the storage array controller 101 to other storage array controllers. In some examples, data communications link 107 may be a QuickPath Interconnect (QPI) interconnect.

A traditional storage system that uses traditional flash drives may implement a process across the flash drives that are part of the traditional storage system. For example, a higher level process of the storage system may initiate and control a process across the flash drives. However, a flash drive of the traditional storage system may include its own storage controller that also performs the process. Thus, for the traditional storage system, a higher level process (e.g., initiated by the storage system) and a lower level process (e.g., initiated by a storage controller of the storage system) may both be performed.

To resolve various deficiencies of a traditional storage system, operations may be performed by higher level processes and not by the lower level processes. For example, the flash storage system may include flash drives that do not include storage controllers that provide the process. Thus, the operating system of the flash storage system itself may initiate and control the process. This may be accomplished by a direct-mapped flash storage system that addresses data blocks within the flash drives directly and without an address translation performed by the storage controllers of the flash drives.

The operating system of the flash storage system may identify and maintain a list of allocation units across multiple flash drives of the flash storage system. The allocation units may be entire erase blocks or multiple erase blocks. The operating system may maintain a map or address range that directly maps addresses to erase blocks of the flash drives of the flash storage system.

Direct mapping to the erase blocks of the flash drives may be used to rewrite data and erase data. For example, the operations may be performed on one or more allocation units that include a first data and a second data where the first data is to be retained and the second data is no longer being used by the flash storage system. The operating system may initiate the process to write the first data to new locations within other allocation units and erasing the second data and marking the allocation units as being available for use for subsequent data. Thus, the process may only be performed by the higher level operating system of the flash storage system without an additional lower level process being performed by controllers of the flash drives.

Advantages of the process being performed only by the operating system of the flash storage system include increased reliability of the flash drives of the flash storage system as unnecessary or redundant write operations are not being performed during the process. One possible point of novelty here is the concept of initiating and controlling the process at the operating system of the flash storage system. In addition, the process can be controlled by the operating system across multiple flash drives. This is contrast to the process being performed by a storage controller of a flash drive.

A storage system can consist of two storage array controllers that share a set of drives for failover purposes, or it could consist of a single storage array controller that provides a storage service that utilizes multiple drives, or it could consist of a distributed network of storage array controllers each with some number of drives or some amount of Flash storage where the storage array controllers in the network collaborate to provide a complete storage service and collaborate on various aspects of a storage service including storage allocation and garbage collection.

Figure 1C:
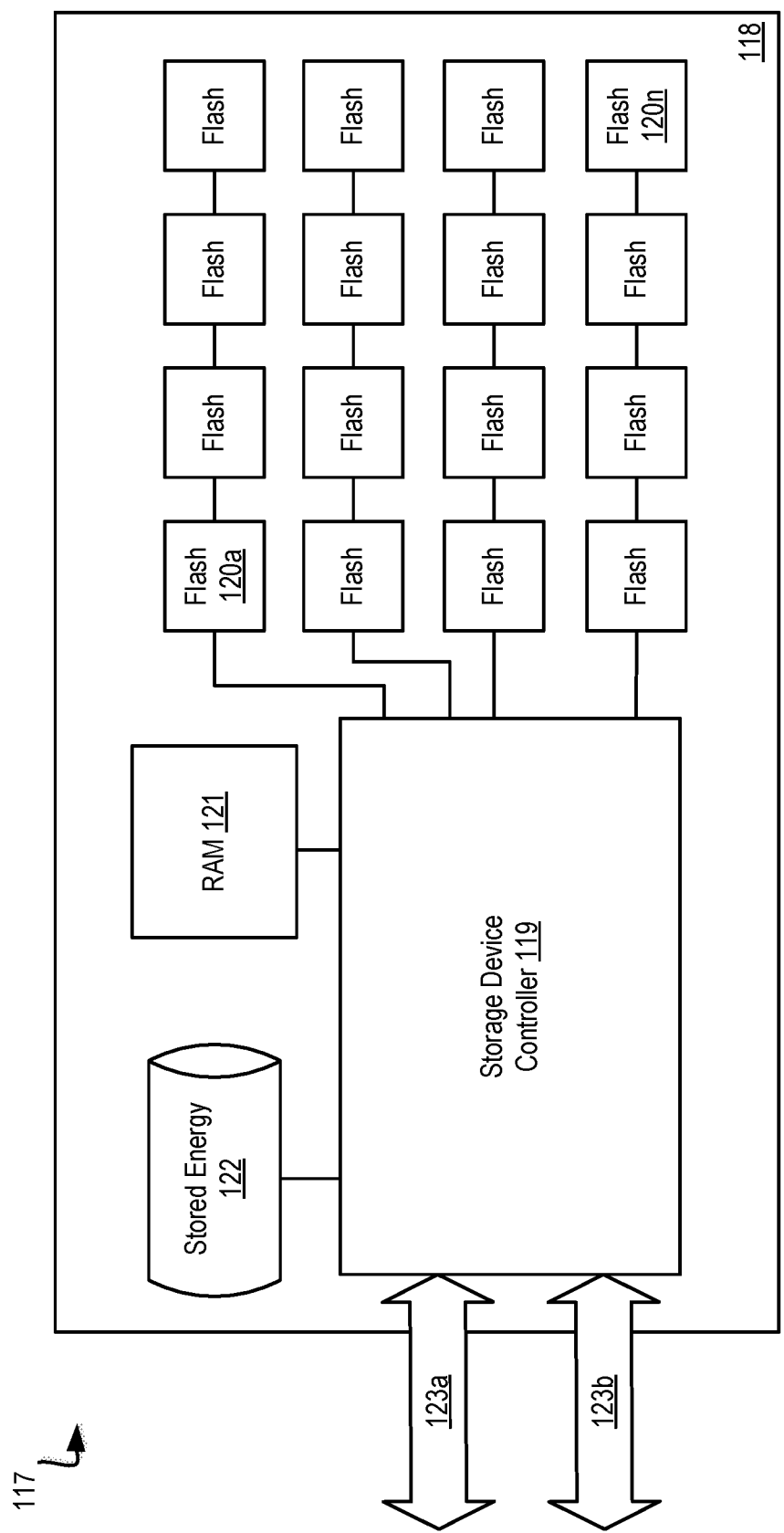
FIG. 1C illustrates a third example system for data storage in accordance with some implementations.

FIG. 1C illustrates a third example system 117 for data storage in accordance with some implementations. System 117 (also referred to as "storage system" herein) includes numerous elements for purposes of illustration rather than limitation. It may be noted that system 117 may include the same, more, or fewer elements configured in the same or different manner in other implementations.

In one embodiment, system 117 includes a dual Peripheral Component Interconnect ('PCI') flash storage device 118 with separately addressable fast write storage. System 117 may include a storage controller 119. In one embodiment, storage controller 119A-D may be a CPU, ASIC, FPGA, or any other circuitry that may implement control structures necessary according to the present disclosure. In one embodiment, system 117 includes flash memory devices (e.g., including flash memory devices 120a-n), operatively coupled to various channels of the storage device controller 119. Flash memory devices 120a-n, may be presented to the controller 119A-D as an addressable collection of Flash pages, erase blocks, and/or control elements sufficient to allow the storage device controller 119A-D to program and retrieve various aspects of the Flash. In one embodiment, storage device controller 119A-D may perform operations on flash memory devices 120a-n including storing and retrieving data content of pages, arranging and erasing any blocks, tracking statistics related to the use and reuse of Flash memory pages, erase blocks, and cells, tracking and predicting error codes and faults within the Flash memory, controlling voltage levels associated with programming and retrieving contents of Flash cells, etc.

In one embodiment, system 117 may include RAM 121 to store separately addressable fast-write data. In one embodiment, RAM 121 may be one or more separate discrete devices. In another embodiment, RAM 121 may be integrated into storage device controller 119A-D or multiple storage device controllers. The RAM 121 may be utilized for other purposes as well, such as temporary program memory for a processing device (e.g., a CPU) in the storage device controller 119.

In one embodiment, system 117 may include a stored energy device 122, such as a rechargeable battery or a capacitor. Stored energy device 122 may store energy sufficient to power the storage device controller 119, some amount of the RAM (e.g., RAM 121), and some amount of Flash memory (e.g., Flash memory 120a-120n) for sufficient time to write the contents of RAM to Flash memory. In one embodiment, storage device controller 119A-D may write the contents of RAM to Flash Memory if the storage device controller detects loss of external power.

In one embodiment, system 117 includes two data communications links 123a, 123b. In one embodiment, data communications links 123a, 123b may be PCI interfaces. In another embodiment, data communications links 123a, 123b may be based on other communications standards (e.g., HyperTransport, InfiniBand, etc.). Data communications links 123a, 123b may be based on non-volatile memory express ('NVMe') or NVMe over fabrics ('NVMf') specifications that allow external connection to the storage device controller 119A-D from other components in the storage system 117. It should be noted that data communications links may be interchangeably referred to herein as PCI buses for convenience.

System 117 may also include an external power source (not shown), which may be provided over one or both data communications links 123a, 123b, or which may be provided separately. An alternative embodiment includes a separate Flash memory (not shown) dedicated for use in storing the content of RAM 121. The storage device controller 119A-D may present a logical device over a PCI bus which may include an addressable fast-write logical device, or a distinct part of the logical address space of the storage device 118, which may be presented as PCI memory or as persistent storage. In one embodiment, operations to store into the device are directed into the RAM 121. On power failure, the storage device controller 119A-D may write stored content associated with the addressable fast-write logical storage to Flash memory (e.g., Flash memory 120a-n) for long-term persistent storage.

In one embodiment, the logical device may include some presentation of some or all of the content of the Flash memory devices 120a-n, where that presentation allows a storage system including a storage device 118 (e.g., storage system 117) to directly address Flash memory pages and directly reprogram erase blocks from storage system components that are external to the storage device through the PCI bus. The presentation may also allow one or more of the external components to control and retrieve other aspects of the Flash memory including some or all of: tracking statistics related to use and reuse of Flash memory pages, erase blocks, and cells across all the Flash memory devices; tracking and predicting error codes and faults within and across the Flash memory devices; controlling voltage levels associated with programming and retrieving contents of Flash cells; etc.

In one embodiment, the stored energy device 122 may be sufficient to ensure completion of in-progress operations to the Flash memory devices 120a-120n stored energy device 122 may power storage device controller 119A-D and associated Flash memory devices (e.g., 120a-n) for those operations, as well as for the storing of fast-write RAM to Flash memory. Stored energy device 122 may be used to store accumulated statistics and other parameters kept and tracked by the Flash memory devices 120a-n and/or the storage device controller 119. Separate capacitors or stored energy devices (such as smaller capacitors near or embedded within the Flash memory devices themselves) may be used for some or all of the operations described herein.

Various schemes may be used to track and optimize the life span of the stored energy component, such as adjusting voltage levels over time, partially discharging the storage energy device 122 to measure corresponding discharge characteristics, etc. If the available energy decreases over time, the effective available capacity of the addressable fast-write storage may be decreased to ensure that it can be written safely based on the currently available stored energy.

Figure 1D:
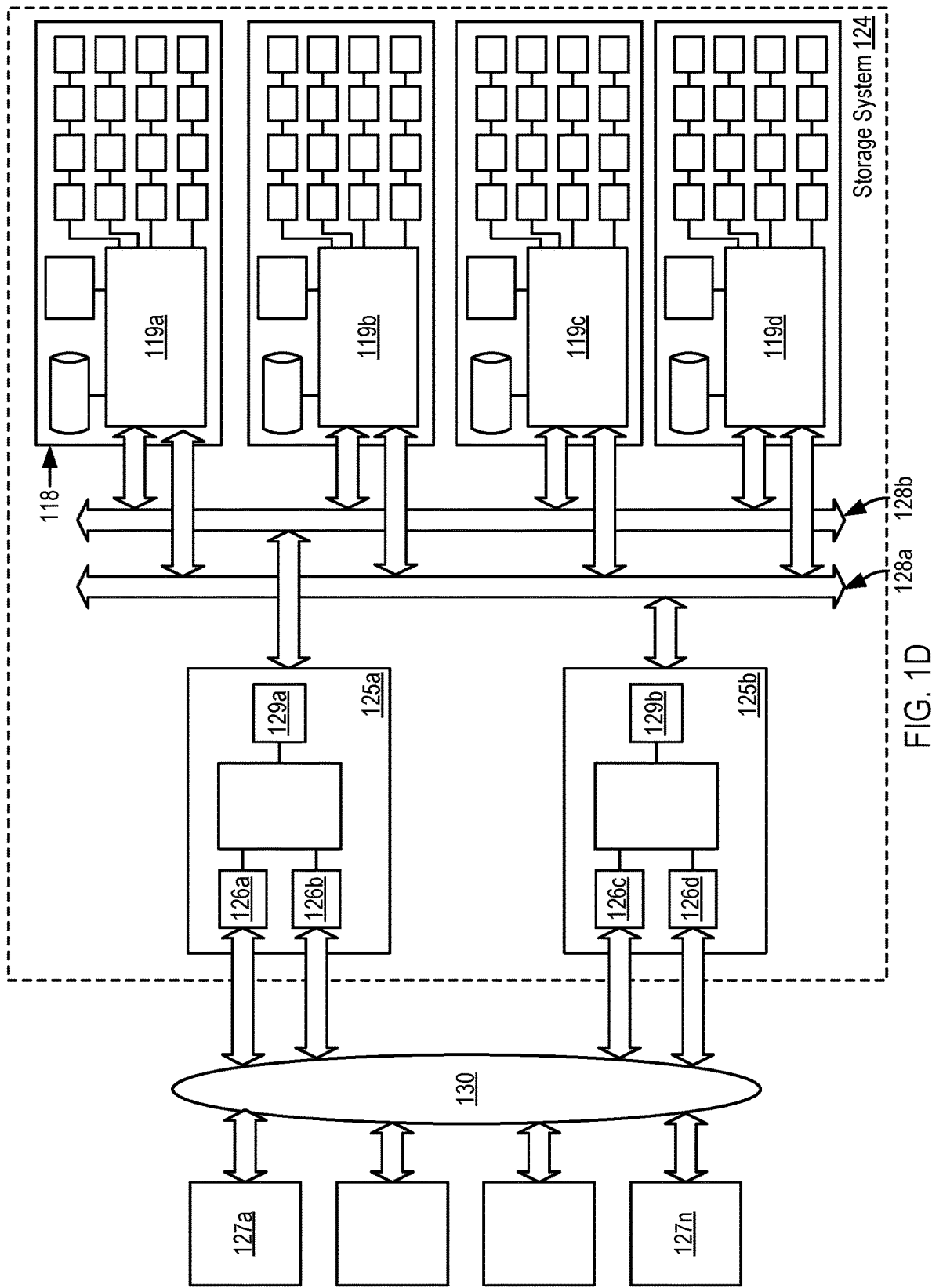
FIG. 1D illustrates a fourth example system for data storage in accordance with some implementations.

FIG. 1D illustrates a third example system 124 for data storage in accordance with some implementations. In one embodiment, system 124 includes storage controllers 125a, 125b. In one embodiment, storage controllers 125a, 125b are operatively coupled to Dual PCI storage devices 119a, 119b and 119c, 119d, respectively. Storage controllers 125a, 125b may be operatively coupled (e.g., via a storage network 130) to some number of host computers 127a-n.

In one embodiment, two storage controllers (e.g., 125a and 125b) provide storage services, such as a SCS) block storage array, a file server, an object server, a database or data analytics service, etc. The storage controllers 125a, 125b may provide services through some number of network interfaces (e.g., 126a-d) to host computers 127a-n outside of the storage system 124. Storage controllers 125a, 125b may provide integrated services or an application entirely within the storage system 124, forming a converged storage and compute system. The storage controllers 125a, 125b may utilize the fast write memory within or across storage devices 119a-d to journal in progress operations to ensure the operations are not lost on a power failure, storage controller removal, storage controller or storage system shutdown, or some fault of one or more software or hardware components within the storage system 124.

In one embodiment, controllers 125a, 125b operate as PCI masters to one or the other PCI buses 128a, 128b. In another embodiment, 128a and 128b may be based on other communications standards (e.g., HyperTransport, InfiniBand, etc.). Other storage system embodiments may operate storage controllers 125a, 125b as multi-masters for both PCI buses 128a, 128b. Alternately, a PCI/NVMe/NVMf switching infrastructure or fabric may connect multiple storage controllers. Some storage system embodiments may allow storage devices to communicate with each other directly rather than communicating only with storage controllers. In one embodiment, a storage device controller 119a may be operable under direction from a storage controller 125a to synthesize and transfer data to be stored into Flash memory devices from data that has been stored in RAM (e.g., RAM 121 of FIG. 1C). For example, a recalculated version of RAM content may be transferred after a storage controller has determined that an operation has fully committed across the storage system, or when fast-write memory on the device has reached a certain used capacity, or after a certain amount of time, to ensure improve safety of the data or to release addressable fast-write capacity for reuse. This mechanism may be used, for example, to avoid a second transfer over a bus (e.g., 128a, 128b) from the storage controllers 125a, 125b. In one embodiment, a recalculation may include compressing data, attaching indexing or other metadata, combining multiple data segments together, performing erasure code calculations, etc.

In one embodiment, under direction from a storage controller 125a, 125b, a storage device controller 119a, 119b may be operable to calculate and transfer data to other storage devices from data stored in RAM (e.g., RAM 121 of FIG. 1C) without involvement of the storage controllers 125a, 125b. This operation may be used to mirror data stored in one controller 125a to another controller 125b, or it could be used to offload compression, data aggregation, and/or erasure coding calculations and transfers to storage devices to reduce load on storage controllers or the storage controller interface 129a, 129b to the PCI bus 128a, 128b.

A storage device controller 119A-D may include mechanisms for implementing high availability primitives for use by other parts of a storage system external to the Dual PCI storage device 118. For example, reservation or exclusion primitives may be provided so that, in a storage system with two storage controllers providing a highly available storage service, one storage controller may prevent the other storage controller from accessing or continuing to access the storage device. This could be used, for example, in cases where one controller detects that the other controller is not functioning properly or where the interconnect between the two storage controllers may itself not be functioning properly.

In one embodiment, a storage system for use with Dual PCI direct mapped storage devices with separately addressable fast write storage includes systems that manage erase blocks or groups of erase blocks as allocation units for storing data on behalf of the storage service, or for storing metadata (e.g., indexes, logs, etc.) associated with the storage service, or for proper management of the storage system itself. Flash pages, which may be a few kilobytes in size, may be written as data arrives or as the storage system is to persist data for long intervals of time (e.g., above a defined threshold of time). To commit data more quickly, or to reduce the number of writes to the Flash memory devices, the storage controllers may first write data into the separately addressable fast write storage on one more storage devices.

In one embodiment, the storage controllers 125a, 125b may initiate the use of erase blocks within and across storage devices (e.g., 118) in accordance with an age and expected remaining lifespan of the storage devices, or based on other statistics. The storage controllers 125a, 125b may initiate garbage collection and data migration data between storage devices in accordance with pages that are no longer needed as well as to manage Flash page and erase block lifespans and to manage overall system performance.

In one embodiment, the storage system 124 may utilize mirroring and/or erasure coding schemes as part of storing data into addressable fast write storage and/or as part of writing data into allocation units associated with erase blocks. Erasure codes may be used across storage devices, as well as within erase blocks or allocation units, or within and across Flash memory devices on a single storage device, to provide redundancy against single or multiple storage device failures or to protect against internal corruptions of Flash memory pages resulting from Flash memory operations or from degradation of Flash memory cells. Mirroring and erasure coding at various levels may be used to recover from multiple types of failures that occur separately or in combination.

The embodiments depicted with reference to FIGS. 2A-G illustrate a storage cluster that stores user data, such as user data originating from one or more user or client systems or other sources external to the storage cluster. The storage cluster distributes user data across storage nodes housed within a chassis, or across multiple chassis, using erasure coding and redundant copies of metadata. Erasure coding refers to a method of data protection or reconstruction in which data is stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster may be contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as PCIe, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system ('NFS'), common internet file system ('CIFS'), small computer system interface ('SCSI') or hypertext transfer protocol ('HTTP'). Translation from the client protocol may occur at the switch, chassis external communication bus or within each storage node. In some embodiments, multiple chassis may be coupled or connected to each other through an aggregator switch. A portion and/or all of the coupled or connected chassis may be designated as a storage cluster. As discussed above, each chassis can have multiple blades, each blade has a media access control ('MAC') address, but the storage cluster is presented to an external network as having a single cluster IP address and a single MAC address in some embodiments.

Each storage node may be one or more storage servers and each storage server is connected to one or more non-volatile solid state memory units, which may be referred to as storage units or storage devices. One embodiment includes a single storage server in each storage node and between one to eight non-volatile solid state memory units, however this one example is not meant to be limiting. The storage server may include a processor, DRAM and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded CPU, solid state storage controller, and a quantity of solid state mass storage, e.g., between 2-32 terabytes ('TB') in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory ('MRAM') that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

Figure 2A:
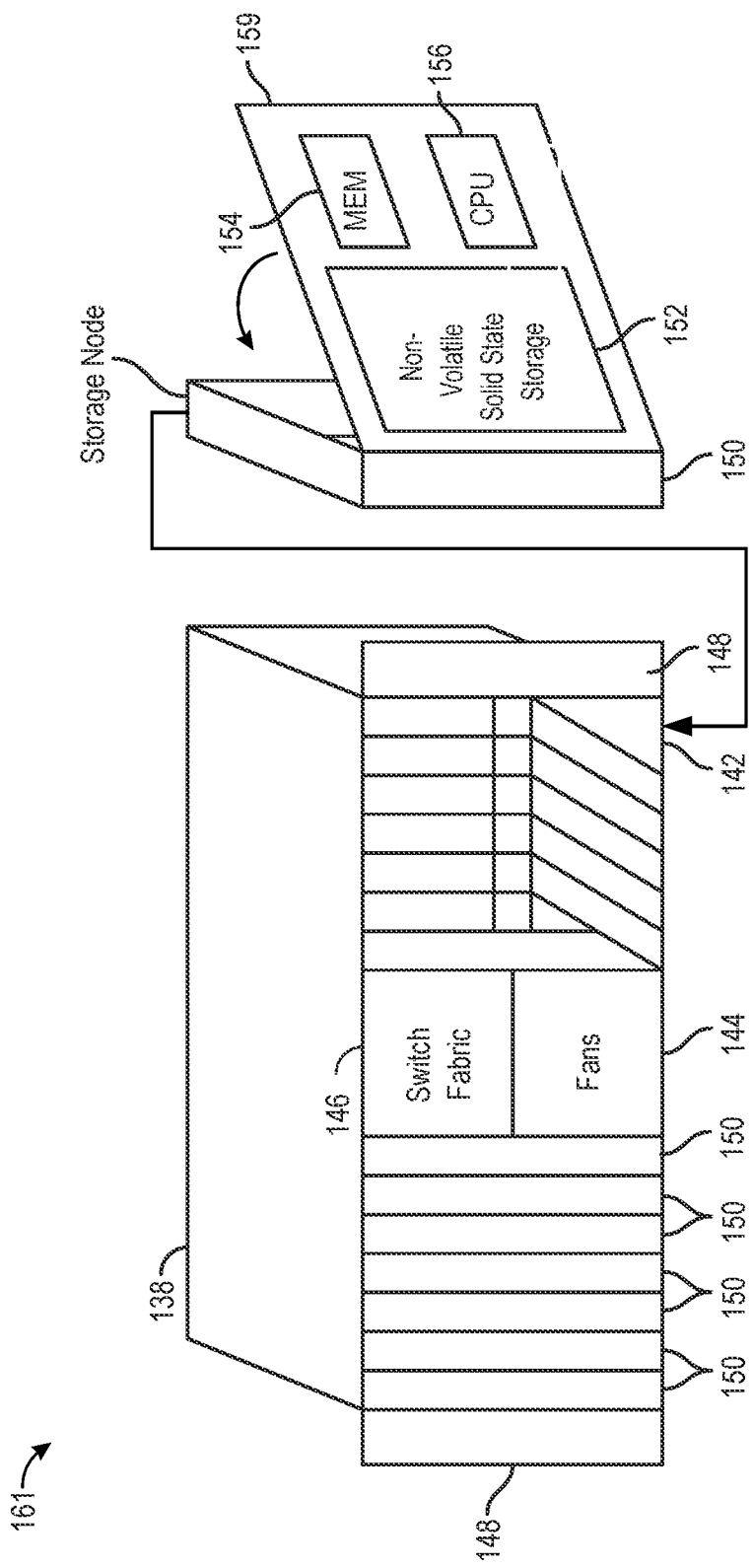
FIG. 2A is a perspective view of a storage cluster with multiple storage nodes and internal storage coupled to each storage node to provide network attached storage, in accordance with some embodiments.

FIG. 2A is a perspective view of a storage cluster 161, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 161, each having one or more storage nodes 150, in a flexible and reconfigurable arrangement of both the physical components and the amount of storage memory provided thereby. The storage cluster 161 is designed to fit in a rack, and one or more racks can be set up and populated as desired for the storage memory. The storage cluster 161 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in herein, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 159 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Referring to FIG. 2A, storage cluster 161 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

Figure 2B:
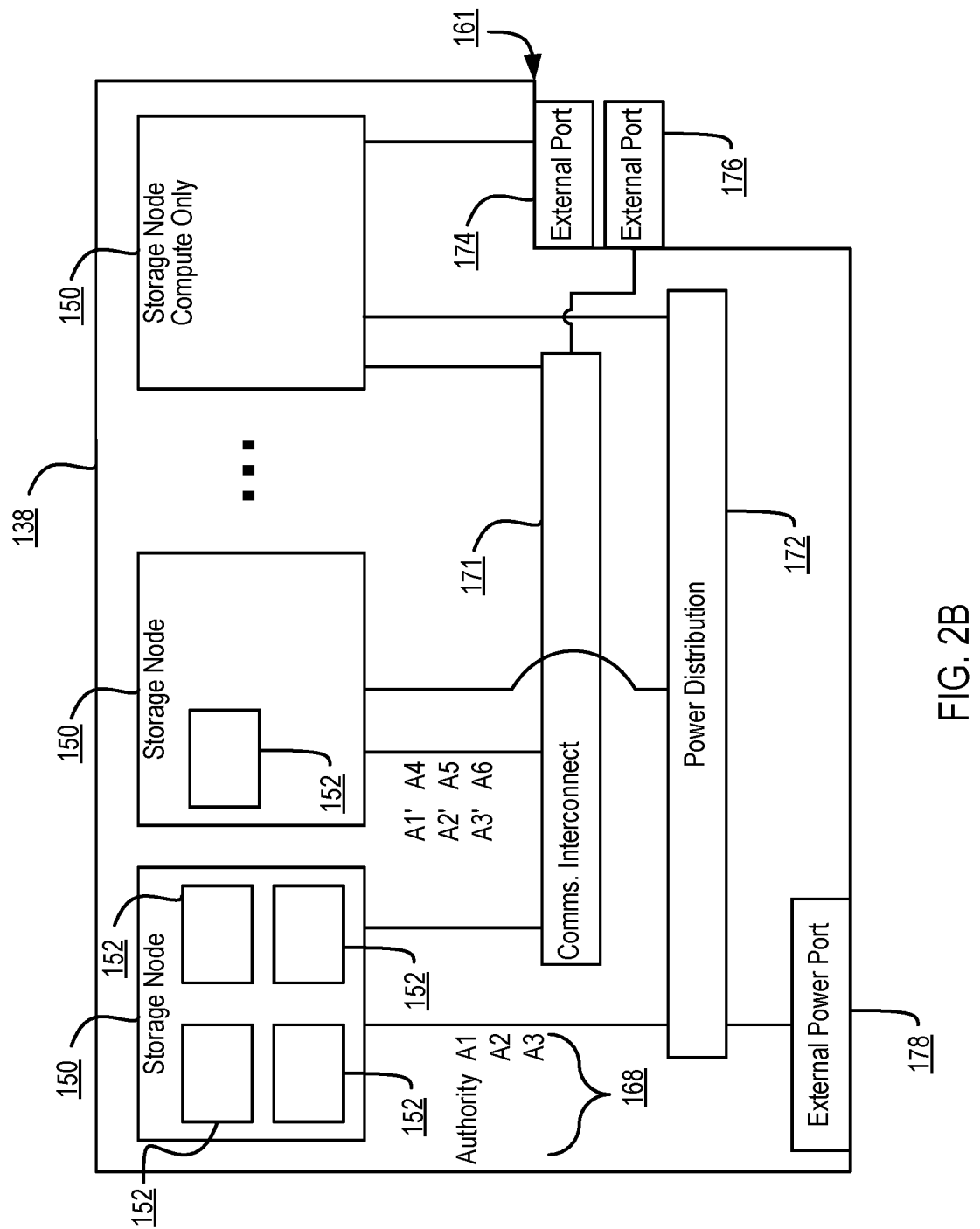
FIG. 2B is a block diagram showing an interconnect switch coupling multiple storage nodes in accordance with some embodiments.

FIG. 2B is a block diagram showing a communications interconnect 173 and power distribution bus 172 coupling multiple storage nodes 150. Referring back to FIG. 2A, the communications interconnect 173 can be included in or implemented with the switch fabric 146 in some embodiments. Where multiple storage clusters 161 occupy a rack, the communications interconnect 173 can be included in or implemented with a top of rack switch, in some embodiments. As illustrated in FIG. 2B, storage cluster 161 is enclosed within a single chassis 138. External port 176 is coupled to storage nodes 150 through communications interconnect 173, while external port 174 is coupled directly to a storage node. External power port 178 is coupled to power distribution bus 172. Storage nodes 150 may include varying amounts and differing capacities of non-volatile solid state storage 152 as described with reference to FIG. 2A. In addition, one or more storage nodes 150 may be a compute only storage node as illustrated in FIG. 2B. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an inode number or a data segment number. The output of this operation points to a non-volatile solid state storage 152 having the authority 168 for that particular piece of data. In some embodiments there are two stages to this operation. The first stage maps an entity identifier (ID), e.g., a segment number, inode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 2A and 2B, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain meta-data, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIGS. 2E and 2G) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top are the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage unit 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check ('LDPC') code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo randomly assigning entities to authorities, by splitting entities into ranges based upon an externally produced key, or by placing a single entity into each authority. Examples of pseudorandom schemes are linear hashing and the Replication Under Scalable Hashing ('RUSH') family of hashes, including Controlled Replication Under Scalable Hashing ('CRUSH'). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being transmitted. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing, i.e., the system supports non-disruptive upgrades.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Figure 2C:
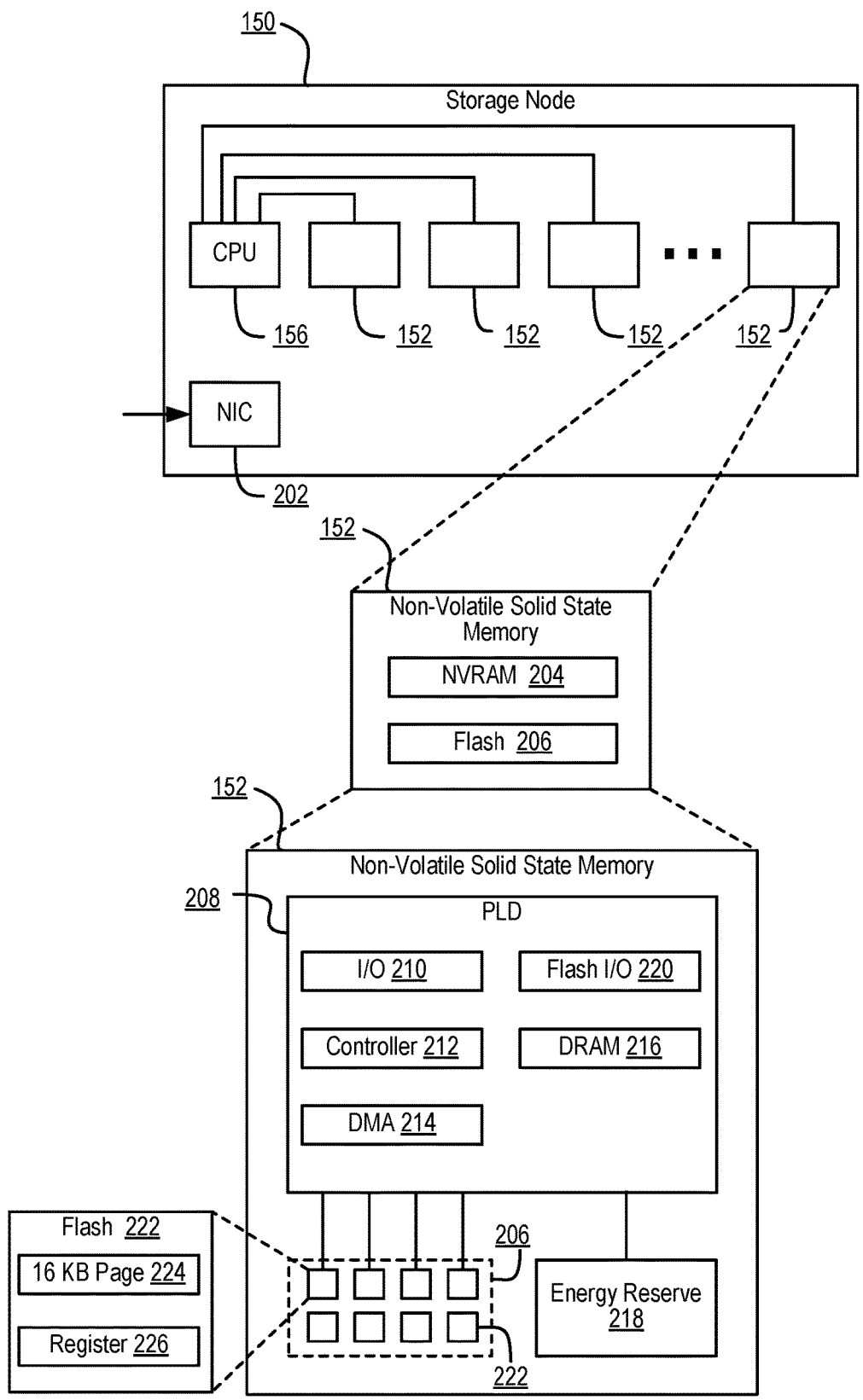
FIG. 2C is a multiple level block diagram, showing contents of a storage node and contents of one of the non-volatile solid state storage units in accordance with some embodiments.

FIG. 2C is a multiple level block diagram, showing contents of a storage node 150 and contents of a non-volatile solid state storage 152 of the storage node 150. Data is communicated to and from the storage node 150 by a network interface controller ('NIC') 202 in some embodiments. Each storage node 150 has a CPU 156, and one or more non-volatile solid state storage 152, as discussed above. Moving down one level in FIG. 2C, each non-volatile solid state storage 152 has a relatively fast non-volatile solid state memory, such as nonvolatile random access memory ('NVRAM') 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 2C, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device ('PLD') 208, e.g., an FPGA. In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Storage clusters 161, in various embodiments as disclosed herein, can be contrasted with storage arrays in general. The storage nodes 150 are part of a collection that creates the storage cluster 161. Each storage node 150 owns a slice of data and computing required to provide the data. Multiple storage nodes 150 cooperate to store and retrieve the data. Storage memory or storage devices, as used in storage arrays in general, are less involved with processing and manipulating the data. Storage memory or storage devices in a storage array receive commands to read, write, or erase data. The storage memory or storage devices in a storage array are not aware of a larger system in which they are embedded, or what the data means. Storage memory or storage devices in storage arrays can include various types of storage memory, such as RAM, solid state drives, hard disk drives, etc. The storage units 152 described herein have multiple interfaces active simultaneously and serving multiple purposes. In some embodiments, some of the functionality of a storage node 150 is shifted into a storage unit 152, transforming the storage unit 152 into a combination of storage unit 152 and storage node 150. Placing computing (relative to storage data) into the storage unit 152 places this computing closer to the data itself. The various system embodiments have a hierarchy of storage node layers with different capabilities. By contrast, in a storage array, a controller owns and knows everything about all of the data that the controller manages in a shelf or storage devices. In a storage cluster 161, as described herein, multiple controllers in multiple storage units 152 and/or storage nodes 150 cooperate in various ways (e.g., for erasure coding, data sharding, metadata communication and redundancy, storage capacity expansion or contraction, data recovery, and so on).

Figure 2D:
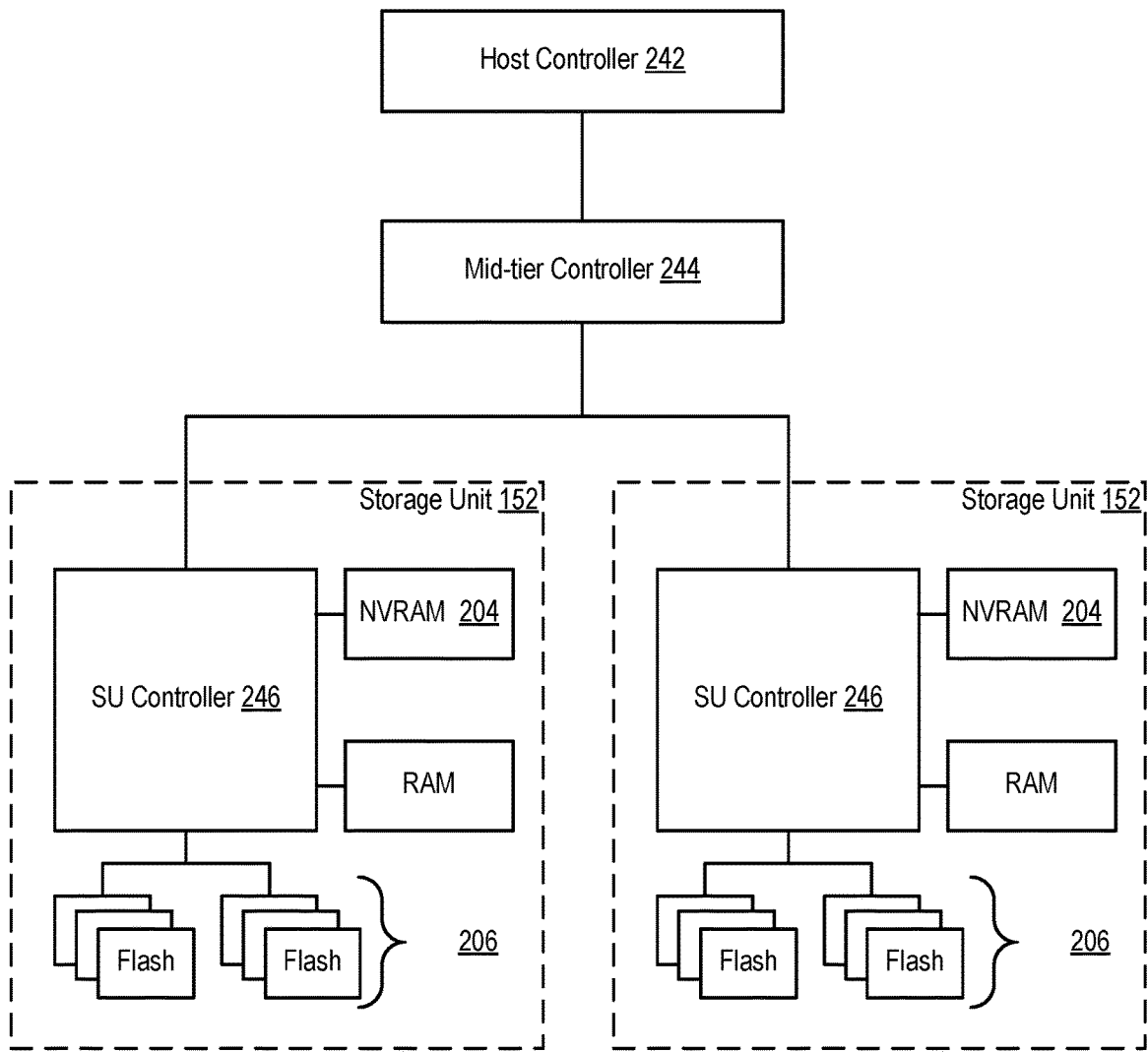
FIG. 2D shows a storage server environment, which uses embodiments of the storage nodes and storage units of some previous Figs. in accordance with some embodiments.

FIG. 2D shows a storage server environment, which uses embodiments of the storage nodes 150 and storage units 152 of FIGS. 2A-C. In this version, each storage unit 152 has a processor such as controller 212 (see FIG. 2C), an FPGA, flash memory 206, and NVRAM 204 (which is super-capacitor backed DRAM 216, see FIGS. 2B and 2C) on a PCIe (peripheral component interconnect express) board in a chassis 138 (see FIG. 2A). The storage unit 152 may be implemented as a single board containing storage, and may be the largest tolerable failure domain inside the chassis. In some embodiments, up to two storage units 152 may fail and the device will continue with no data loss.

The physical storage is divided into named regions based on application usage in some embodiments. The NVRAM 204 is a contiguous block of reserved memory in the storage unit 152 DRAM 216, and is backed by NAND flash. NVRAM 204 is logically divided into multiple memory regions written for two as spool (e.g., spool_region). Space within the NVRAM 204 spools is managed by each authority 168 independently. Each device provides an amount of storage space to each authority 168. That authority 168 further manages lifetimes and allocations within that space. Examples of a spool include distributed transactions or notions. When the primary power to a storage unit 152 fails, onboard super-capacitors provide a short duration of power hold up. During this holdup interval, the contents of the NVRAM 204 are flushed to flash memory 206. On the next power-on, the contents of the NVRAM 204 are recovered from the flash memory 206.

As for the storage unit controller, the responsibility of the logical "controller" is distributed across each of the blades containing authorities 168. This distribution of logical control is shown in FIG. 2D as a host controller 242, mid-tier controller 244 and storage unit controller(s) 246. Management of the control plane and the storage plane are treated independently, although parts may be physically co-located on the same blade. Each authority 168 effectively serves as an independent controller. Each authority 168 provides its own data and metadata structures, its own background workers, and maintains its own lifecycle.

Figure 2E:
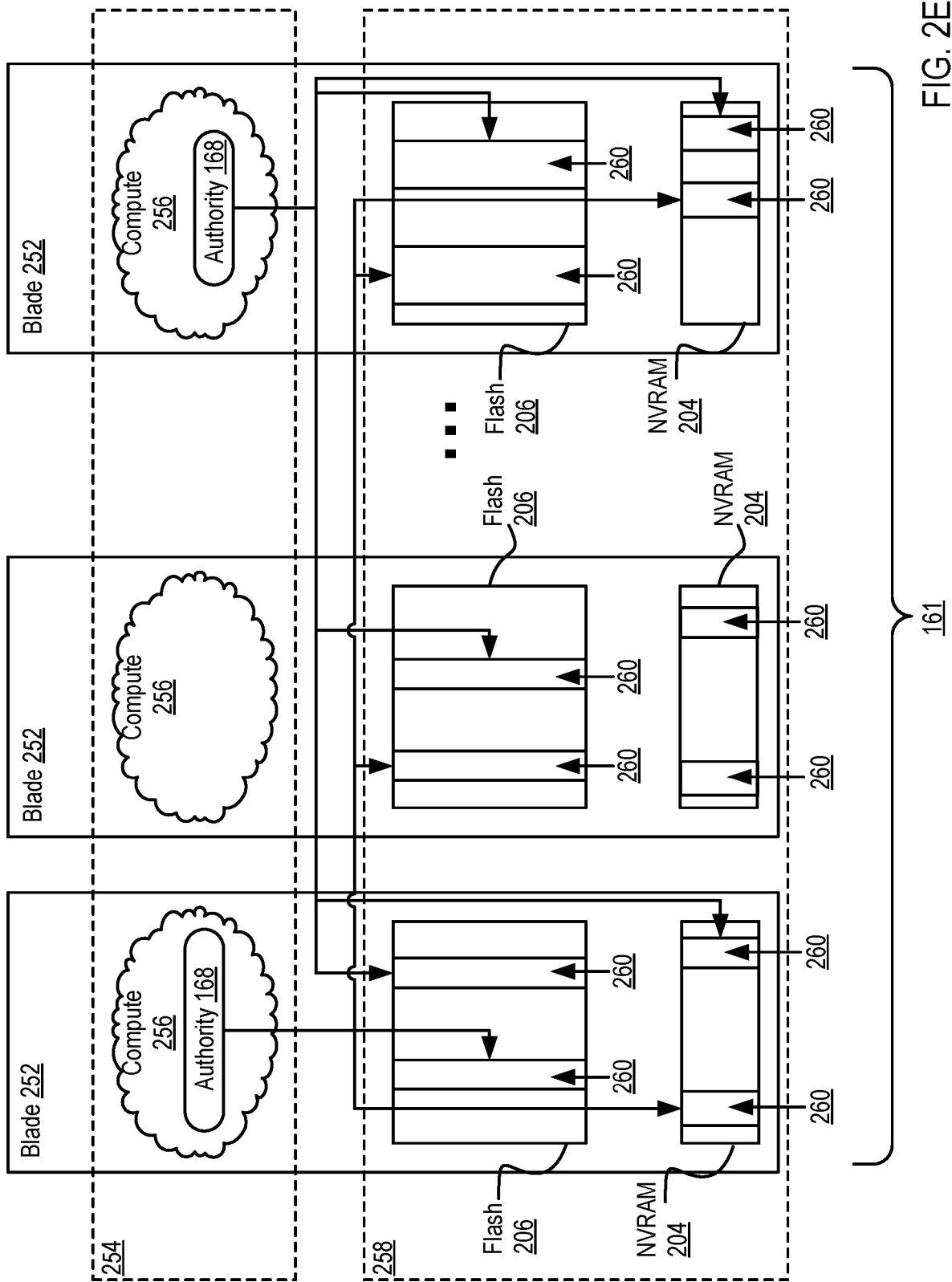
FIG. 2E is a blade hardware block diagram, showing a control plane, compute and storage planes, and authorities interacting with underlying physical resources, in accordance with some embodiments.

FIG. 2E is a blade 252 hardware block diagram, showing a control plane 254, compute and storage planes 256, 258, and authorities 168 interacting with underlying physical resources, using embodiments of the storage nodes 150 and storage units 152 of FIGS. 2A-C in the storage server environment of FIG. 2D. The control plane 254 is partitioned into a number of authorities 168 which can use the compute resources in the compute plane 256 to run on any of the blades 252. The storage plane 258 is partitioned into a set of devices, each of which provides access to flash 206 and NVRAM 204 resources. In one embodiment, the compute plane 256 may perform the operations of a storage array controller, as described herein, on one or more devices of the storage plane 258 (e.g., a storage array).

In the compute and storage planes 256, 258 of FIG. 2E, the authorities 168 interact with the underlying physical resources (i.e., devices). From the point of view of an authority 168, its resources are striped over all of the physical devices. From the point of view of a device, it provides resources to all authorities 168, irrespective of where the authorities happen to run. Each authority 168 has allocated or has been allocated one or more partitions 260 of storage memory in the storage units 152, e.g. partitions 260 in flash memory 206 and NVRAM 204. Each authority 168 uses those allocated partitions 260 that belong to it, for writing or reading user data. Authorities can be associated with differing amounts of physical storage of the system. For example, one authority 168 could have a larger number of partitions 260 or larger sized partitions 260 in one or more storage units 152 than one or more other authorities 168.

Figure 2F:
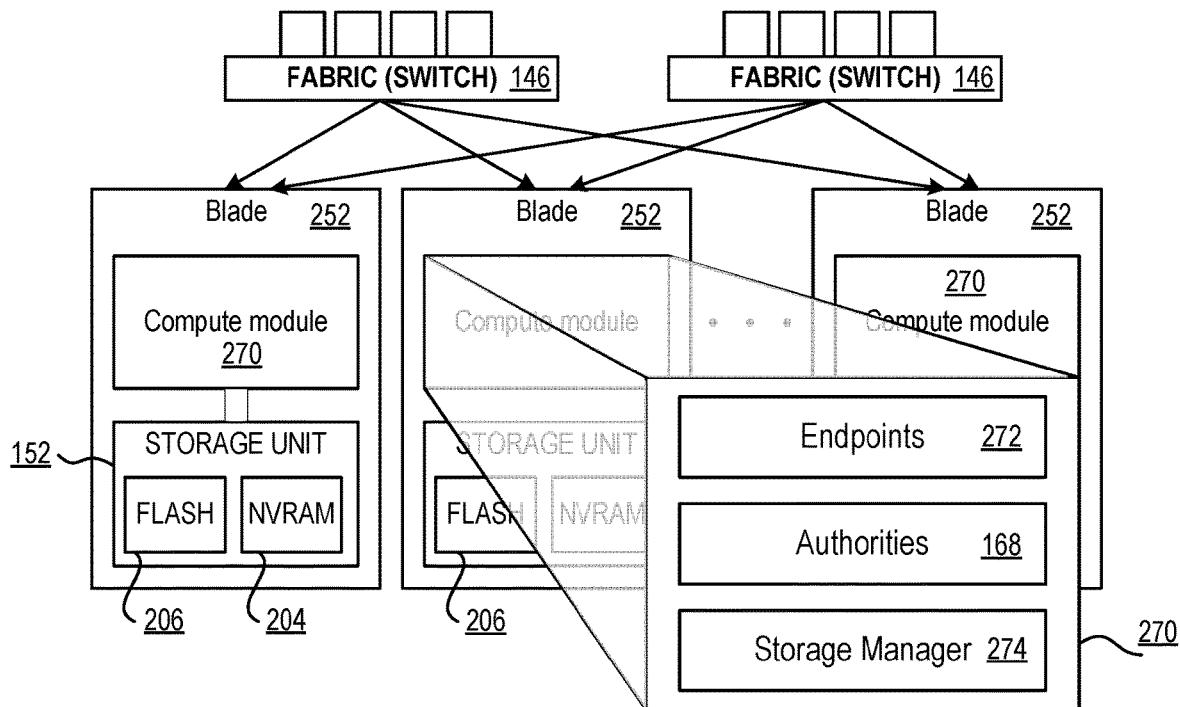
FIG. 2F depicts elasticity software layers in blades of a storage cluster, in accordance with some embodiments.

FIG. 2F depicts elasticity software layers in blades 252 of a storage cluster, in accordance with some embodiments. In the elasticity structure, elasticity software is symmetric, i.e., each blade's compute module 270 runs the three identical layers of processes depicted in FIG. 2F. Storage managers 274 execute read and write requests from other blades 252 for data and metadata stored in local storage unit 152 NVRAM 204 and flash 206. Authorities 168 fulfill client requests by issuing the necessary reads and writes to the blades 252 on whose storage units 152 the corresponding data or metadata resides. Endpoints 272 parse client connection requests received from switch fabric 146 supervisory software, relay the client connection requests to the authorities 168 responsible for fulfillment, and relay the authorities' 168 responses to clients. The symmetric three-layer structure enables the storage system's high degree of concurrency. Elasticity scales out efficiently and reliably in these embodiments. In addition, elasticity implements a unique scale-out technique that balances work evenly across all resources regardless of client access pattern, and maximizes concurrency by eliminating much of the need for inter-blade coordination that typically occurs with conventional distributed locking.

Still referring to FIG. 2F, authorities 168 running in the compute modules 270 of a blade 252 perform the internal operations required to fulfill client requests. One feature of elasticity is that authorities 168 are stateless, i.e., they cache active data and metadata in their own blades' 252 DRAMs for fast access, but the authorities store every update in their NVRAM 204 partitions on three separate blades 252 until the update has been written to flash 206. All the storage system writes to NVRAM 204 are in triplicate to partitions on three separate blades 252 in some embodiments. With triple-mirrored NVRAM 204 and persistent storage protected by parity and Reed-Solomon RAID checksums, the storage system can survive concurrent failure of two blades 252 with no loss of data, metadata, or access to either.

Because authorities 168 are stateless, they can migrate between blades 252. Each authority 168 has a unique identifier. NVRAM 204 and flash 206 partitions are associated with authorities' 168 identifiers, not with the blades 252 on which they are running in some. Thus, when an authority 168 migrates, the authority 168 continues to manage the same storage partitions from its new location. When a new blade 252 is installed in an embodiment of the storage cluster, the system automatically rebalances load by: partitioning the new blade's 252 storage for use by the system's authorities 168, migrating selected authorities 168 to the new blade 252, starting endpoints 272 on the new blade 252 and including them in the switch fabric's 146 client connection distribution algorithm.

From their new locations, migrated authorities 168 persist the contents of their NVRAM 204 partitions on flash 206, process read and write requests from other authorities 168, and fulfill the client requests that endpoints 272 direct to them. Similarly, if a blade 252 fails or is removed, the system redistributes its authorities 168 among the system's remaining blades 252. The redistributed authorities 168 continue to perform their original functions from their new locations.

Figure 2G:
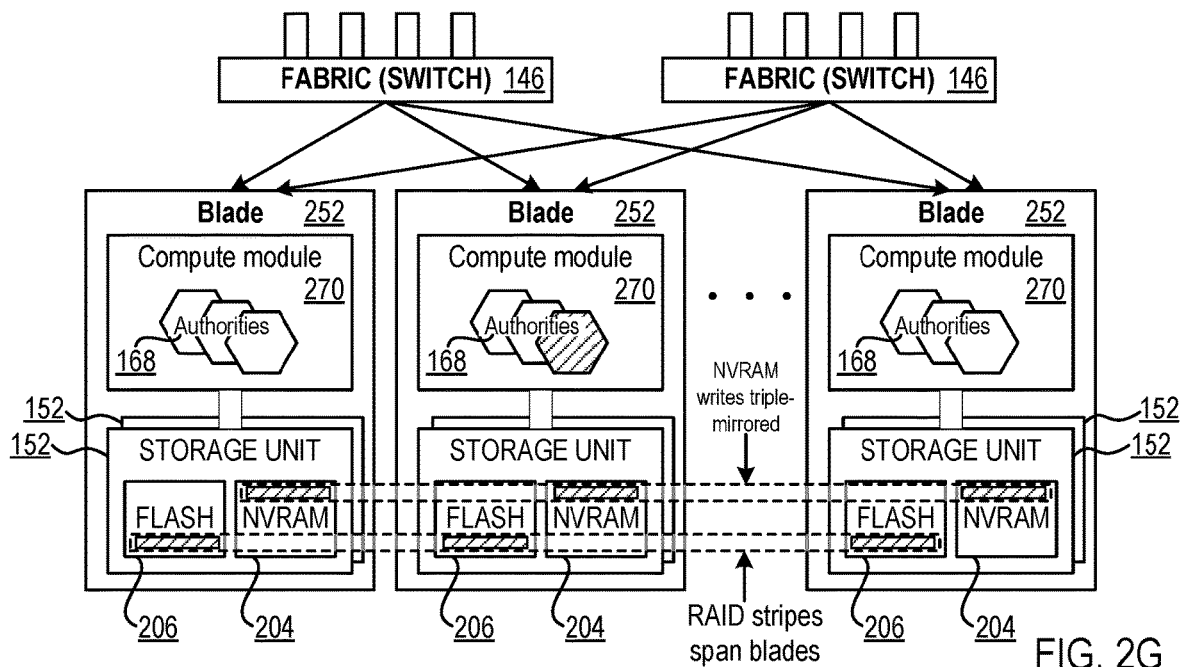
FIG. 2G depicts authorities and storage resources in blades of a storage cluster, in accordance with some embodiments.

FIG. 2G depicts authorities 168 and storage resources in blades 252 of a storage cluster, in accordance with some embodiments. Each authority 168 is exclusively responsible for a partition of the flash 206 and NVRAM 204 on each blade 252. The authority 168 manages the content and integrity of its partitions independently of other authorities 168. Authorities 168 compress incoming data and preserve it temporarily in their NVRAM 204 partitions, and then consolidate, RAID-protect, and persist the data in segments of the storage in their flash 206 partitions. As the authorities 168 write data to flash 206, storage managers 274 perform the necessary flash translation to optimize write performance and maximize media longevity. In the background, authorities 168 "garbage collect," or reclaim space occupied by data that clients have made obsolete by overwriting the data. It should be appreciated that since authorities' 168 partitions are disjoint, there is no need for distributed locking to execute client and writes or to perform background functions.

The embodiments described herein may utilize various software, communication and/or networking protocols. In addition, the configuration of the hardware and/or software may be adjusted to accommodate various protocols. For example, the embodiments may utilize Active Directory, which is a database based system that provides authentication, directory, policy, and other services in a WINDOWS™ environment. In these embodiments, LDAP (Lightweight Directory Access Protocol) is one example application protocol for querying and modifying items in directory service providers such as Active Directory. In some embodiments, a network lock manager ('NLM') is utilized as a facility that works in cooperation with the Network File System ('NFS') to provide a System V style of advisory file and record locking over a network. The Server Message Block ('SMB') protocol, one version of which is also known as Common Internet File System ('CIFS'), may be integrated with the storage systems discussed herein. SMP operates as an application-layer network protocol typically used for providing shared access to files, printers, and serial ports and miscellaneous communications between nodes on a network. SMB also provides an authenticated inter-process communication mechanism. AMAZON™ S3 (Simple Storage Service) is a web service offered by Amazon Web Services, and the systems described herein may interface with Amazon S3 through web services interfaces (REST (representational state transfer), SOAP (simple object access protocol), and BitTorrent). A RESTful API (application programming interface) breaks down a transaction to create a series of small modules. Each module addresses a particular underlying part of the transaction. The control or permissions provided with these embodiments, especially for object data, may include utilization of an access control list ('ACL'). The ACL is a list of permissions attached to an object and the ACL specifies which users or system processes are granted access to objects, as well as what operations are allowed on given objects. The systems may utilize Internet Protocol version 6 ('IPv6'), as well as IPv4, for the communications protocol that provides an identification and location system for computers on networks and routes traffic across the Internet. The routing of packets between networked systems may include Equal-cost multi-path routing ('ECMP'), which is a routing strategy where next-hop packet forwarding to a single destination can occur over multiple "best paths" which tie for top place in routing metric calculations. Multi-path routing can be used in conjunction with most routing protocols, because it is a per-hop decision limited to a single router. The software may support Multi-tenancy, which is an architecture in which a single instance of a software application serves multiple customers. Each customer may be referred to as a tenant. Tenants may be given the ability to customize some parts of the application, but may not customize the application's code, in some embodiments. The embodiments may maintain audit logs. An audit log is a document that records an event in a computing system. In addition to documenting what resources were accessed, audit log entries typically include destination and source addresses, a timestamp, and user login information for compliance with various regulations. The embodiments may support various key management policies, such as encryption key rotation. In addition, the system may support dynamic root passwords or some variation dynamically changing passwords.

Figure 3A:
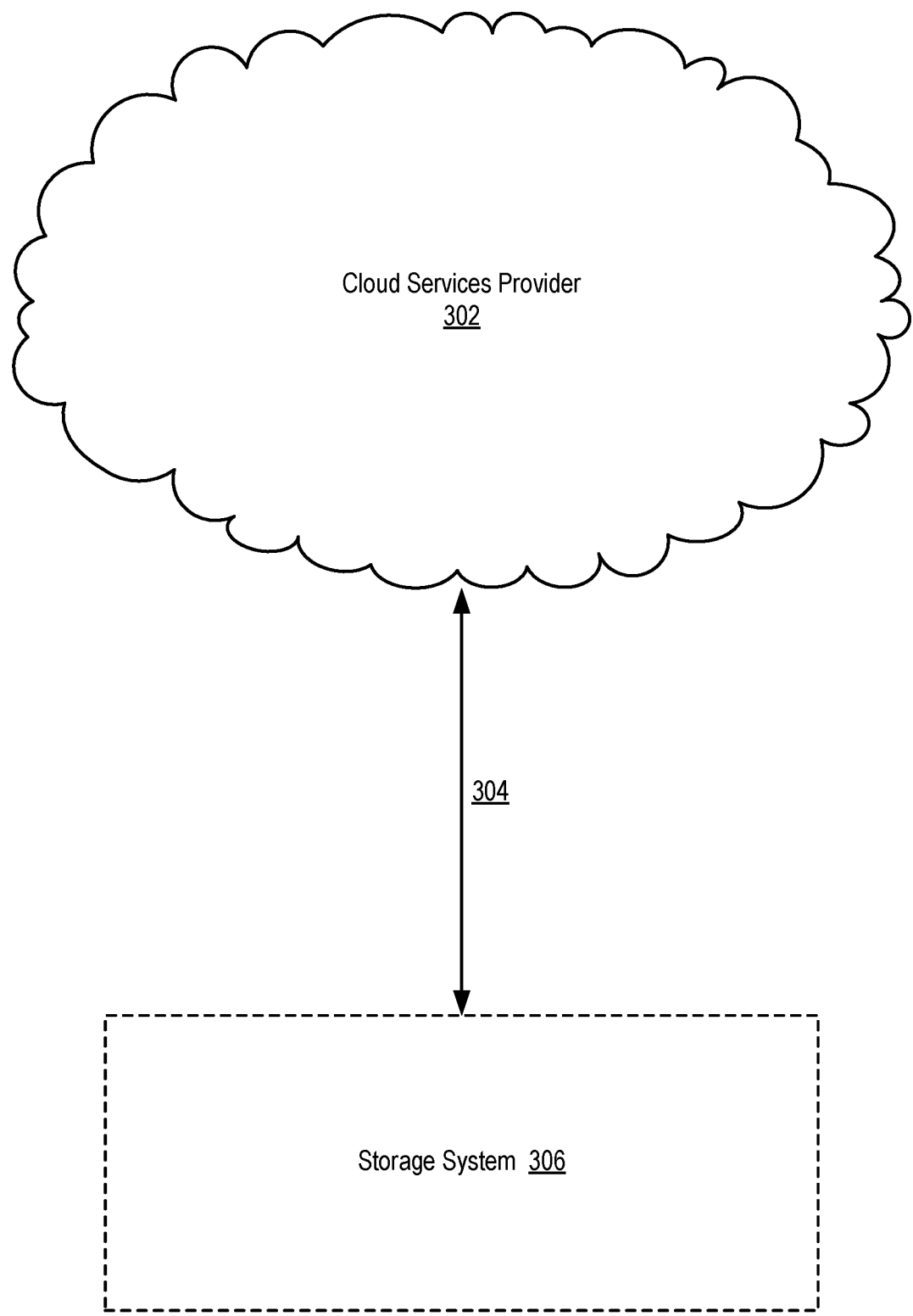
FIG. 3A sets forth a diagram of a storage system that is coupled for data communications with a cloud services provider in accordance with some embodiments of the present disclosure.

FIG. 3A sets forth a diagram of a storage system 306 that is coupled for data communications with a cloud services provider 302 in accordance with some embodiments of the present disclosure. Although depicted in less detail, the storage system 306 depicted in FIG. 3A may be similar to the storage systems described above with reference to FIGS. 1A-1D and FIGS. 2A-2G. In some embodiments, the storage system 306 depicted in FIG. 3A may be embodied as a storage system that includes imbalanced active/active controllers, as a storage system that includes balanced active/active controllers, as a storage system that includes active/active controllers where less than all of each controller's resources are utilized such that each controller has reserve resources that may be used to support failover, as a storage system that includes fully active/active controllers, as a storage system that includes dataset-segregated controllers, as a storage system that includes dual-layer architectures with front-end controllers and back-end integrated storage controllers, as a storage system that includes scale-out clusters of dual-controller arrays, as well as combinations of such embodiments.

In the example depicted in FIG. 3A, the storage system 306 is coupled to the cloud services provider 302 via a data communications link 304. The data communications link 304 may be embodied as a dedicated data communications link, as a data communications pathway that is provided through the use of one or data communications networks such as a wide area network ('WAN') or LAN, or as some other mechanism capable of transporting digital information between the storage system 306 and the cloud services provider 302. Such a data communications link 304 may be fully wired, fully wireless, or some aggregation of wired and wireless data communications pathways. In such an example, digital information may be exchanged between the storage system 306 and the cloud services provider 302 via the data communications link 304 using one or more data communications protocols. For example, digital information may be exchanged between the storage system 306 and the cloud services provider 302 via the data communications link 304 using the handheld device transfer protocol ('HDTP'), hypertext transfer protocol ('HTTP'), internet protocol ('IP'), real-time transfer protocol ('RTP'), transmission control protocol ('TCP'), user datagram protocol ('UDP'), wireless application protocol ('WAP'), or other protocol.

The cloud services provider 302 depicted in FIG. 3A may be embodied, for example, as a system and computing environment that provides a vast array of services to users of the cloud services provider 302 through the sharing of computing resources via the data communications link 304. The cloud services provider 302 may provide on-demand access to a shared pool of configurable computing resources such as computer networks, servers, storage, applications and services, and so on. The shared pool of configurable resources may be rapidly provisioned and released to a user of the cloud services provider 302 with minimal management effort. Generally, the user of the cloud services provider 302 is unaware of the exact computing resources utilized by the cloud services provider 302 to provide the services. Although in many cases such a cloud services provider 302 may be accessible via the Internet, readers of skill in the art will recognize that any system that abstracts the use of shared resources to provide services to a user through any data communications link may be considered a cloud services provider 302.

In the example depicted in FIG. 3A, the cloud services provider 302 may be configured to provide a variety of services to the storage system 306 and users of the storage system 306 through the implementation of various service models. For example, the cloud services provider 302 may be configured to provide services through the implementation of an infrastructure as a service ('IaaS') service model, through the implementation of a platform as a service ('PaaS') service model, through the implementation of a software as a service ('SaaS') service model, through the implementation of an authentication as a service ('AaaS') service model, through the implementation of a storage as a service model where the cloud services provider 302 offers access to its storage infrastructure for use by the storage system 306 and users of the storage system 306, and so on. Readers will appreciate that the cloud services provider 302 may be configured to provide additional services to the storage system 306 and users of the storage system 306 through the implementation of additional service models, as the service models described above are included only for explanatory purposes and in no way represent a limitation of the services that may be offered by the cloud services provider 302 or a limitation as to the service models that may be implemented by the cloud services provider 302.

In the example depicted in FIG. 3A, the cloud services provider 302 may be embodied, for example, as a private cloud, as a public cloud, or as a combination of a private cloud and public cloud. In an embodiment in which the cloud services provider 302 is embodied as a private cloud, the cloud services provider 302 may be dedicated to providing services to a single organization rather than providing services to multiple organizations. In an embodiment where the cloud services provider 302 is embodied as a public cloud, the cloud services provider 302 may provide services to multiple organizations. In still alternative embodiments, the cloud services provider 302 may be embodied as a mix of a private and public cloud services with a hybrid cloud deployment.

Although not explicitly depicted in FIG. 3A, readers will appreciate that a vast amount of additional hardware components and additional software components may be necessary to facilitate the delivery of cloud services to the storage system 306 and users of the storage system 306. For example, the storage system 306 may be coupled to (or even include) a cloud storage gateway. Such a cloud storage gateway may be embodied, for example, as hardware-based or software-based appliance that is located on premise with the storage system 306. Such a cloud storage gateway may operate as a bridge between local applications that are executing on the storage array 306 and remote, cloud-based storage that is utilized by the storage array 306. Through the use of a cloud storage gateway, organizations may move primary iSCSI or NAS to the cloud services provider 302, thereby enabling the organization to save space on their on-premises storage systems. Such a cloud storage gateway may be configured to emulate a disk array, a block-based device, a file server, or other storage system that can translate the SCSI commands, file server commands, or other appropriate command into REST-space protocols that facilitate communications with the cloud services provider 302.

In order to enable the storage system 306 and users of the storage system 306 to make use of the services provided by the cloud services provider 302, a cloud migration process may take place during which data, applications, or other elements from an organization's local systems (or even from another cloud environment) are moved to the cloud services provider 302. In order to successfully migrate data, applications, or other elements to the cloud services provider's 302 environment, middleware such as a cloud migration tool may be utilized to bridge gaps between the cloud services provider's 302 environment and an organization's environment. Such cloud migration tools may also be configured to address potentially high network costs and long transfer times associated with migrating large volumes of data to the cloud services provider 302, as well as addressing security concerns associated with sensitive data to the cloud services provider 302 over data communications networks. In order to further enable the storage system 306 and users of the storage system 306 to make use of the services provided by the cloud services provider 302, a cloud orchestrator may also be used to arrange and coordinate automated tasks in pursuit of creating a consolidated process or workflow. Such a cloud orchestrator may perform tasks such as configuring various components, whether those components are cloud components or on-premises components, as well as managing the interconnections between such components. The cloud orchestrator can simplify the inter-component communication and connections to ensure that links are correctly configured and maintained.

In the example depicted in FIG. 3A, and as described briefly above, the cloud services provider 302 may be configured to provide services to the storage system 306 and users of the storage system 306 through the usage of a SaaS service model, eliminating the need to install and run the application on local computers, which may simplify maintenance and support of the application. Such applications may take many forms in accordance with various embodiments of the present disclosure. For example, the cloud services provider 302 may be configured to provide access to data analytics applications to the storage system 306 and users of the storage system 306. Such data analytics applications may be configured, for example, to receive vast amounts of telemetry data phoned home by the storage system 306. Such telemetry data may describe various operating characteristics of the storage system 306 and may be analyzed for a vast array of purposes including, for example, to determine the health of the storage system 306, to identify workloads that are executing on the storage system 306, to predict when the storage system 306 will run out of various resources, to recommend configuration changes, hardware or software upgrades, workflow migrations, or other actions that may improve the operation of the storage system 306.

The cloud services provider 302 may also be configured to provide access to virtualized computing environments to the storage system 306 and users of the storage system 306. Such virtualized computing environments may be embodied, for example, as a virtual machine or other virtualized computer hardware platforms, virtual storage devices, virtualized computer network resources, and so on. Examples of such virtualized environments can include virtual machines that are created to emulate an actual computer, virtualized desktop environments that separate a logical desktop from a physical machine, virtualized file systems that allow uniform access to different types of concrete file systems, and many others.

Figure 3B:
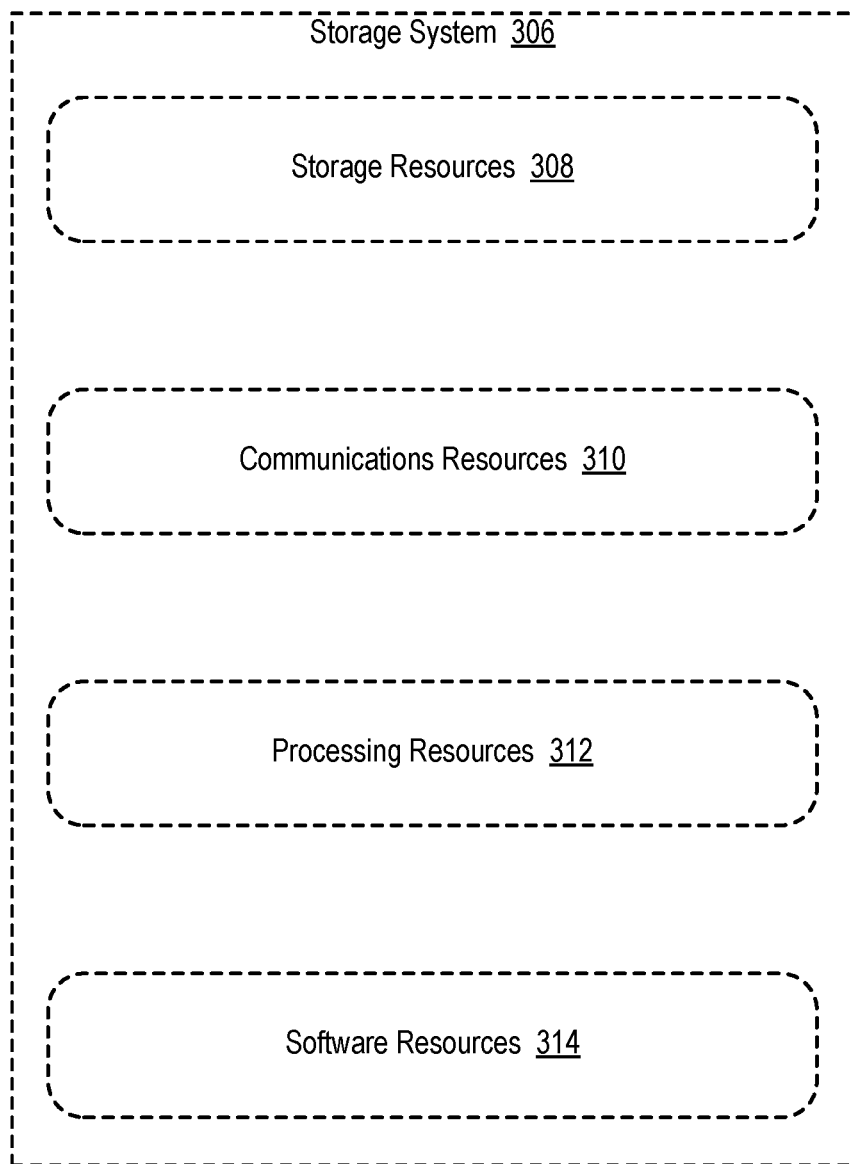
FIG. 3B sets forth a diagram of a storage system in accordance with some embodiments of the present disclosure.

For further explanation, FIG. 3B sets forth a diagram of a storage system 306 in accordance with some embodiments of the present disclosure. Although depicted in less detail, the storage system 306 depicted in FIG. 3B may be similar to the storage systems described above with reference to FIGS. 1A-1D and FIGS. 2A-2G as the storage system may include many of the components described above.

The storage system 306 depicted in FIG. 3B may include a vast amount of storage resources 308, which may be embodied in many forms. For example, the storage resources 308 can include nano-RAM or another form of nonvolatile random access memory that utilizes carbon nanotubes deposited on a substrate, 3D crosspoint non-volatile memory, flash memory including single-level cell ('SLC') NAND flash, multi-level cell ('MLC') NAND flash, triple-level cell ('TLC') NAND flash, quad-level cell ('QLC') NAND flash, or others. Likewise, the storage resources 308 may include non-volatile magnetoresistive random-access memory ('MRAM'), including spin transfer torque ('STT') MRAM. The example storage resources 308 may alternatively include non-volatile phase-change memory ('PCM'), quantum memory that allows for the storage and retrieval of photonic quantum information, resistive random-access memory ('ReRAM'), storage class memory ('SCM'), or other form of storage resources, including any combination of resources described herein. Readers will appreciate that other forms of computer memories and storage devices may be utilized by the storage systems described above, including DRAM, SRAM, EEPROM, universal memory, and many others. The storage resources 308 depicted in FIG. 3A may be embodied in a variety of form factors, including but not limited to, dual in-line memory modules ('DIMMs'), non-volatile dual in-line memory modules ('NVDIMMs'), M.2, U.2, and others.

The storage resources 308 depicted in FIG. 3A may include various forms of SCM. SCM may effectively treat fast, non-volatile memory (e.g., NAND flash) as an extension of DRAM such that an entire dataset may be treated as an in-memory dataset that resides entirely in DRAM. SCM may include non-volatile media such as, for example, NAND flash. Such NAND flash may be accessed utilizing NVMe that can use the PCIe bus as its transport, providing for relatively low access latencies compared to older protocols. In fact, the network protocols used for SSDs in all-flash arrays can include NVMe using Ethernet (ROCE, NVME TCP), Fibre Channel (NVMe FC), InfiniBand (iWARP), and others that make it possible to treat fast, non-volatile memory as an extension of DRAM. In view of the fact that DRAM is often byte-addressable and fast, non-volatile memory such as NAND flash is block-addressable, a controller software/hardware stack may be needed to convert the block data to the bytes that are stored in the media. Examples of media and software that may be used as SCM can include, for example, 3D XPoint, Intel Memory Drive Technology, Samsung's Z-SSD, and others.

The example storage system 306 depicted in FIG. 3B may implement a variety of storage architectures. For example, storage systems in accordance with some embodiments of the present disclosure may utilize block storage where data is stored in blocks, and each block essentially acts as an individual hard drive. Storage systems in accordance with some embodiments of the present disclosure may utilize object storage, where data is managed as objects. Each object may include the data itself, a variable amount of metadata, and a globally unique identifier, where object storage can be implemented at multiple levels (e.g., device level, system level, interface level). Storage systems in accordance with some embodiments of the present disclosure utilize file storage in which data is stored in a hierarchical structure. Such data may be saved in files and folders, and presented to both the system storing it and the system retrieving it in the same format.

The example storage system 306 depicted in FIG. 3B may be embodied as a storage system in which additional storage resources can be added through the use of a scale-up model, additional storage resources can be added through the use of a scale-out model, or through some combination thereof. In a scale-up model, additional storage may be added by adding additional storage devices. In a scale-out model, however, additional storage nodes may be added to a cluster of storage nodes, where such storage nodes can include additional processing resources, additional networking resources, and so on.

The storage system 306 depicted in FIG. 3B also includes communications resources 310 that may be useful in facilitating data communications between components within the storage system 306, as well as data communications between the storage system 306 and computing devices that are outside of the storage system 306, including embodiments where those resources are separated by a relatively vast expanse. The communications resources 310 may be configured to utilize a variety of different protocols and data communication fabrics to facilitate data communications between components within the storage systems as well as computing devices that are outside of the storage system. For example, the communications resources 310 can include fibre channel ('FC') technologies such as FC fabrics and FC protocols that can transport SCSI commands over FC network, FC over ethernet ('FCoE') technologies through which FC frames are encapsulated and transmitted over Ethernet networks, InfiniBand ('IB') technologies in which a switched fabric topology is utilized to facilitate transmissions between channel adapters, NVM Express ('NVMe') technologies and NVMe over fabrics ('NVMeoF') technologies through which non-volatile storage media attached via a PCI express ('PCIe') bus may be accessed, and others. In fact, the storage systems described above may, directly or indirectly, make use of neutrino communication technologies and devices through which information (including binary information) is transmitted using a beam of neutrinos.

The communications resources 310 can also include mechanisms for accessing storage resources 308 within the storage system 306 utilizing serial attached SCSI ('SAS'), serial ATA ('SATA') bus interfaces for connecting storage resources 308 within the storage system 306 to host bus adapters within the storage system 306, internet small computer systems interface ('iSCSI') technologies to provide block-level access to storage resources 308 within the storage system 306, and other communications resources that that may be useful in facilitating data communications between components within the storage system 306, as well as data communications between the storage system 306 and computing devices that are outside of the storage system 306.

The storage system 306 depicted in FIG. 3B also includes processing resources 312 that may be useful in useful in executing computer program instructions and performing other computational tasks within the storage system 306. The processing resources 312 may include one or more ASICs that are customized for some particular purpose as well as one or more CPUs. The processing resources 312 may also include one or more DSPs, one or more FPGAs, one or more systems on a chip ('SoCs'), or other form of processing resources 312. The storage system 306 may utilize the storage resources 312 to perform a variety of tasks including, but not limited to, supporting the execution of software resources 314 that will be described in greater detail below.

The storage system 306 depicted in FIG. 3B also includes software resources 314 that, when executed by processing resources 312 within the storage system 306, may perform a vast array of tasks. The software resources 314 may include, for example, one or more modules of computer program instructions that when executed by processing resources 312 within the storage system 306 are useful in carrying out various data protection techniques to preserve the integrity of data that is stored within the storage systems. Readers will appreciate that such data protection techniques may be carried out, for example, by system software executing on computer hardware within the storage system, by a cloud services provider, or in other ways. Such data protection techniques can include, for example, data archiving techniques that cause data that is no longer actively used to be moved to a separate storage device or separate storage system for long-term retention, data backup techniques through which data stored in the storage system may be copied and stored in a distinct location to avoid data loss in the event of equipment failure or some other form of catastrophe with the storage system, data replication techniques through which data stored in the storage system is replicated to another storage system such that the data may be accessible via multiple storage systems, data snapshotting techniques through which the state of data within the storage system is captured at various points in time, data and database cloning techniques through which duplicate copies of data and databases may be created, and other data protection techniques.

The software resources 314 may also include software that is useful in implementing software-defined storage ('SDS'). In such an example, the software resources 314 may include one or more modules of computer program instructions that, when executed, are useful in policy-based provisioning and management of data storage that is independent of the underlying hardware. Such software resources 314 may be useful in implementing storage virtualization to separate the storage hardware from the software that manages the storage hardware.

The software resources 314 may also include software that is useful in facilitating and optimizing I/O operations that are directed to the storage resources 308 in the storage system 306. For example, the software resources 314 may include software modules that perform carry out various data reduction techniques such as, for example, data compression, data deduplication, and others. The software resources 314 may include software modules that intelligently group together I/O operations to facilitate better usage of the underlying storage resource 308, software modules that perform data migration operations to migrate from within a storage system, as well as software modules that perform other functions. Such software resources 314 may be embodied as one or more software containers or in many other ways.

Figure 3C:
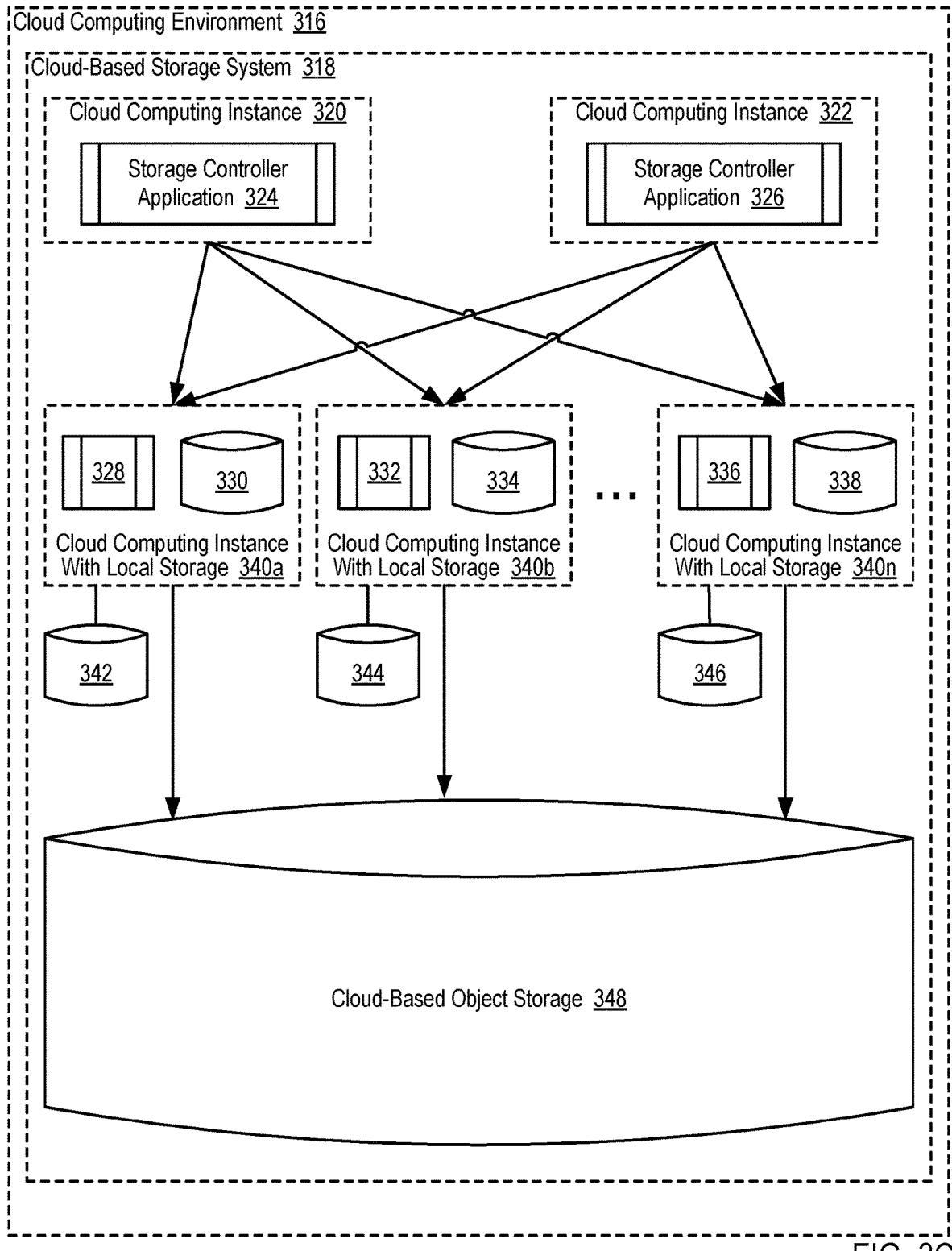
FIG. 3C sets forth an example of a cloud-based storage system in accordance with some embodiments of the present disclosure.

For further explanation, FIG. 3C sets forth an example of a cloud-based storage system 318 in accordance with some embodiments of the present disclosure. In the example depicted in FIG. 3C, the cloud-based storage system 318 is created entirely in a cloud computing environment 316 such as, for example, Amazon Web Services ('AWS'), Microsoft Azure, Google Cloud Platform, IBM Cloud, Oracle Cloud, and others. The cloud-based storage system 318 may be used to provide services similar to the services that may be provided by the storage systems described above. For example, the cloud-based storage system 318 may be used to provide block storage services to users of the cloud-based storage system 318, the cloud-based storage system 318 may be used to provide storage services to users of the cloud-based storage system 318 through the use of solid-state storage, and so on.

The cloud-based storage system 318 depicted in FIG. 3C includes two cloud computing instances 320, 322 that each are used to support the execution of a storage controller application 324, 326. The cloud computing instances 320, 322 may be embodied, for example, as instances of cloud computing resources (e.g., virtual machines) that may be provided by the cloud computing environment 316 to support the execution of software applications such as the storage controller application 324, 326. In one embodiment, the cloud computing instances 320, 322 may be embodied as Amazon Elastic Compute Cloud ('EC2') instances. In such an example, an Amazon Machine Image ('AMI') that includes the storage controller application 324, 326 may be booted to create and configure a virtual machine that may execute the storage controller application 324, 326.

In the example method depicted in FIG. 3C, the storage controller application 324, 326 may be embodied as a module of computer program instructions that, when executed, carries out various storage tasks. For example, the storage controller application 324, 326 may be embodied as a module of computer program instructions that, when executed, carries out the same tasks as the controllers 110A, 110B in FIG. 1A described above such as writing data received from the users of the cloud-based storage system 318 to the cloud-based storage system 318, erasing data from the cloud-based storage system 318, retrieving data from the cloud-based storage system 318 and providing such data to users of the cloud-based storage system 318, monitoring and reporting of disk utilization and performance, performing redundancy operations, such as RAID or RAID-like data redundancy operations, compressing data, encrypting data, deduplicating data, and so forth. Readers will appreciate that because there are two cloud computing instances 320, 322 that each include the storage controller application 324, 326, in some embodiments one cloud computing instance 320 may operate as the primary controller as described above while the other cloud computing instance 322 may operate as the secondary controller as described above. Readers will appreciate that the storage controller application 324, 326 depicted in FIG. 3C may include identical source code that is executed within different cloud computing instances 320, 322.

Consider an example in which the cloud computing environment 316 is embodied as AWS and the cloud computing instances are embodied as EC2 instances. In such an example, the cloud computing instance 320 that operates as the primary controller may be deployed on one of the instance types that has a relatively large amount of memory and processing power while the cloud computing instance 322 that operates as the secondary controller may be deployed on one of the instance types that has a relatively small amount of memory and processing power. In such an example, upon the occurrence of a failover event where the roles of primary and secondary are switched, a double failover may actually be carried out such that: 1) a first failover event where the cloud computing instance 322 that formerly operated as the secondary controller begins to operate as the primary controller, and 2) a third cloud computing instance (not shown) that is of an instance type that has a relatively large amount of memory and processing power is spun up with a copy of the storage controller application, where the third cloud computing instance begins operating as the primary controller while the cloud computing instance 322 that originally operated as the secondary controller begins operating as the secondary controller again. In such an example, the cloud computing instance 320 that formerly operated as the primary controller may be terminated. Readers will appreciate that in alternative embodiments, the cloud computing instance 320 that is operating as the secondary controller after the failover event may continue to operate as the secondary controller and the cloud computing instance 322 that operated as the primary controller after the occurrence of the failover event may be terminated once the primary role has been assumed by the third cloud computing instance (not shown).

Readers will appreciate that while the embodiments described above relate to embodiments where one cloud computing instance 320 operates as the primary controller and the second cloud computing instance 322 operates as the secondary controller, other embodiments are within the scope of the present disclosure. For example, each cloud computing instance 320, 322 may operate as a primary controller for some portion of the address space supported by the cloud-based storage system 318, each cloud computing instance 320, 322 may operate as a primary controller where the servicing of I/O operations directed to the cloud-based storage system 318 are divided in some other way, and so on. In fact, in other embodiments where costs savings may be prioritized over performance demands, only a single cloud computing instance may exist that contains the storage controller application.

The cloud-based storage system 318 depicted in FIG. 3C includes cloud computing instances 340a, 340b, 340n with local storage 330, 334, 338. The cloud computing instances 340a, 340b, 340n depicted in FIG. 3C may be embodied, for example, as instances of cloud computing resources that may be provided by the cloud computing environment 316 to support the execution of software applications. The cloud computing instances 340a, 340b, 340n of FIG. 3C may differ from the cloud computing instances 320, 322 described above as the cloud computing instances 340a, 340b, 340n of FIG. 3C have local storage 330, 334, 338 resources whereas the cloud computing instances 320, 322 that support the execution of the storage controller application 324, 326 need not have local storage resources. The cloud computing instances 340a, 340b, 340n with local storage 330, 334, 338 may be embodied, for example, as EC2 M5 instances that include one or more SSDs, as EC2 R5 instances that include one or more SSDs, as EC2 13 instances that include one or more SSDs, and so on. In some embodiments, the local storage 330, 334, 338 must be embodied as solid-state storage (e.g., SSDs) rather than storage that makes use of hard disk drives.

In the example depicted in FIG. 3C, each of the cloud computing instances 340a, 340b, 340n with local storage 330, 334, 338 can include a software daemon 328, 332, 336 that, when executed by a cloud computing instance 340a, 340b, 340n can present itself to the storage controller applications 324, 326 as if the cloud computing instance 340a, 340b, 340n were a physical storage device (e.g., one or more SSDs). In such an example, the software daemon 328, 332, 336 may include computer program instructions similar to those that would normally be contained on a storage device such that the storage controller applications 324, 326 can send and receive the same commands that a storage controller would send to storage devices. In such a way, the storage controller applications 324, 326 may include code that is identical to (or substantially identical to) the code that would be executed by the controllers in the storage systems described above. In these and similar embodiments, communications between the storage controller applications 324, 326 and the cloud computing instances 340a, 340b, 340n with local storage 330, 334, 338 may utilize iSCSI, NVMe over TCP, messaging, a custom protocol, or in some other mechanism.

In the example depicted in FIG. 3C, each of the cloud computing instances 340a, 340b, 340n with local storage 330, 334, 338 may also be coupled to block-storage 342, 344, 346 that is offered by the cloud computing environment 316. The block-storage 342, 344, 346 that is offered by the cloud computing environment 316 may be embodied, for example, as Amazon Elastic Block Store ('EBS') volumes. For example, a first EBS volume may be coupled to a first cloud computing instance 340a, a second EBS volume may be coupled to a second cloud computing instance 340b, and a third EBS volume may be coupled to a third cloud computing instance 340n. In such an example, the block-storage 342, 344, 346 that is offered by the cloud computing environment 316 may be utilized in a manner that is similar to how the NVRAM devices described above are utilized, as the software daemon 328, 332, 336 (or some other module) that is executing within a particular cloud comping instance 340a, 340b, 340n may, upon receiving a request to write data, initiate a write of the data to its attached EBS volume as well as a write of the data to its local storage 330, 334, 338 resources. In some alternative embodiments, data may only be written to the local storage 330, 334, 338 resources within a particular cloud comping instance 340a, 340b, 340n. In an alternative embodiment, rather than using the block-storage 342, 344, 346 that is offered by the cloud computing environment 316 as NVRAM, actual RAM on each of the cloud computing instances 340a, 340b, 340n with local storage 330, 334, 338 may be used as NVRAM, thereby decreasing network utilization costs that would be associated with using an EBS volume as the NVRAM.

In the example depicted in FIG. 3C, the cloud computing instances 340a, 340b, 340n with local storage 330, 334, 338 may be utilized, by cloud computing instances 320, 322 that support the execution of the storage controller application 324, 326 to service I/O operations that are directed to the cloud-based storage system 318. Consider an example in which a first cloud computing instance 320 that is executing the storage controller application 324 is operating as the primary controller. In such an example, the first cloud computing instance 320 that is executing the storage controller application 324 may receive (directly or indirectly via the secondary controller) requests to write data to the cloud-based storage system 318 from users of the cloud-based storage system 318. In such an example, the first cloud computing instance 320 that is executing the storage controller application 324 may perform various tasks such as, for example, deduplicating the data contained in the request, compressing the data contained in the request, determining where to the write the data contained in the request, and so on, before ultimately sending a request to write a deduplicated, encrypted, or otherwise possibly updated version of the data to one or more of the cloud computing instances 340a, 340b, 340n with local storage 330, 334, 338. Either cloud computing instance 320, 322, in some embodiments, may receive a request to read data from the cloud-based storage system 318 and may ultimately send a request to read data to one or more of the cloud computing instances 340a, 340b, 340n with local storage 330, 334, 338.

Readers will appreciate that when a request to write data is received by a particular cloud computing instance 340a, 340*b*, 340*n* with local storage 330, 334, 338, the software daemon 328, 332, 336 or some other module of computer program instructions that is executing on the particular cloud computing instance 340*a*, 340*b*, 340*n* may be configured to not only write the data to its own local storage 330, 334, 338 resources and any appropriate block-storage 342, 344, 346 that are offered by the cloud computing environment 316, but the software daemon 328, 332, 336 or some other module of computer program instructions that is executing on the particular cloud computing instance 340*a*, 340*b*, 340*n* may also be configured to write the data to cloud-based object storage 348 that is attached to the particular cloud computing instance 340*a*, 340*b*, 340*n*. The cloud-based object storage 348 that is attached to the particular cloud computing instance 340*a*, 340*b*, 340*n* may be embodied, for example, as Amazon Simple Storage Service ('S3') storage that is accessible by the particular cloud computing instance 340*a*, 340*b*, 340*n*. In other embodiments, the cloud computing instances 320, 322 that each include the storage controller application 324, 326 may initiate the storage of the data in the local storage 330, 334, 338 of the cloud computing instances 340*a*, 340*b*, 340*n* and the cloud-based object storage 348.

Readers will appreciate that, as described above, the cloud-based storage system 318 may be used to provide block storage services to users of the cloud-based storage system 318. While the local storage 330, 334, 338 resources and the block-storage 342, 344, 346 resources that are utilized by the cloud computing instances 340*a*, 340*b*, 340*n* may support block-level access, the cloud-based object storage 348 that is attached to the particular cloud computing instance 340*a*, 340*b*, 340*n* supports only object-based access. In order to address this, the software daemon 328, 332, 336 or some other module of computer program instructions that is executing on the particular cloud computing instance 340*a*, 340*b*, 340*n* may be configured to take blocks of data, package those blocks into objects, and write the objects to the cloud-based object storage 348 that is attached to the particular cloud computing instance 340*a*, 340*b*, 340*n*.

Consider an example in which data is written to the local storage 330, 334, 338 resources and the block-storage 342, 344, 346 resources that are utilized by the cloud computing instances 340*a*, 340*b*, 340*n* in 1 MB blocks. In such an example, assume that a user of the cloud-based storage system 318 issues a request to write data that, after being compressed and deduplicated by the storage controller application 324, 326 results in the need to write 5 MB of data. In such an example, writing the data to the local storage 330, 334, 338 resources and the block-storage 342, 344, 346 resources that are utilized by the cloud computing instances 340*a*, 340*b*, 340*n* is relatively straightforward as 5 blocks that are 1 MB in size are written to the local storage 330, 334, 338 resources and the block-storage 342, 344, 346 resources that are utilized by the cloud computing instances 340*a*, 340*b*, 340*n*. In such an example, the software daemon 328, 332, 336 or some other module of computer program instructions that is executing on the particular cloud computing instance 340*a*, 340*b*, 340*n* may be configured to: 1) create a first object that includes the first 1 MB of data and write the first object to the cloud-based object storage 348, 2) create a second object that includes the second 1 MB of data and write the second object to the cloud-based object storage 348, 3) create a third object that includes the third 1 MB of data and write the third object to the cloud-based object storage 348, and so on. As such, in some embodiments, each object that is written to the cloud-based object storage 348 may be identical (or nearly identical) in size. Readers will appreciate that in such an example, metadata that is associated with the data itself may be included in each object (e.g., the first 1 MB of the object is data and the remaining portion is metadata associated with the data).

Readers will appreciate that the cloud-based object storage 348 may be incorporated into the cloud-based storage system 318 to increase the durability of the cloud-based storage system 318. Continuing with the example described above where the cloud computing instances 340*a*, 340*b*, 340*n* are EC2 instances, readers will understand that EC2 instances are only guaranteed to have a monthly uptime of 99.9% and data stored in the local instance store only persists during the lifetime of the EC2 instance. As such, relying on the cloud computing instances 340*a*, 340*b*, 340*n* with local storage 330, 334, 338 as the only source of persistent data storage in the cloud-based storage system 318 may result in a relatively unreliable storage system. Likewise, EBS volumes are designed for 99.999% availability. As such, even relying on EBS as the persistent data store in the cloud-based storage system 318 may result in a storage system that is not sufficiently durable. Amazon S3, however, is designed to provide 99.999999999% durability, meaning that a cloud-based storage system 318 that can incorporate S3 into its pool of storage is substantially more durable than various other options.

Readers will appreciate that while a cloud-based storage system 318 that can incorporate S3 into its pool of storage is substantially more durable than various other options, utilizing S3 as the primary pool of storage may result in storage system that has relatively slow response times and relatively long I/O latencies. As such, the cloud-based storage system 318 depicted in FIG. 3C not only stores data in S3 but the cloud-based storage system 318 also stores data in local storage 330, 334, 338 resources and block-storage 342, 344, 346 resources that are utilized by the cloud computing instances 340*a*, 340*b*, 340*n*, such that read operations can be serviced from local storage 330, 334, 338 resources and the block-storage 342, 344, 346 resources that are utilized by the cloud computing instances 340*a*, 340*b*, 340*n*, thereby reducing read latency when users of the cloud-based storage system 318 attempt to read data from the cloud-based storage system 318.

In some embodiments, all data that is stored by the cloud-based storage system 318 may be stored in both: 1) the cloud-based object storage 348, and 2) at least one of the local storage 330, 334, 338 resources or block-storage 342, 344, 346 resources that are utilized by the cloud computing instances 340*a*, 340*b*, 340*n*. In such embodiments, the local storage 330, 334, 338 resources and block-storage 342, 344, 346 resources that are utilized by the cloud computing instances 340*a*, 340*b*, 340*n* may effectively operate as cache that generally includes all data that is also stored in S3, such that all reads of data may be serviced by the cloud computing instances 340*a*, 340*b*, 340*n* without requiring the cloud computing instances 340*a*, 340*b*, 340*n* to access the cloud-based object storage 348. Readers will appreciate that in other embodiments, however, all data that is stored by the cloud-based storage system 318 may be stored in the cloud-based object storage 348, but less than all data that is stored by the cloud-based storage system 318 may be stored in at least one of the local storage 330, 334, 338 resources or block-storage 342, 344, 346 resources that are utilized by the cloud computing instances 340*a*, 340*b*, 340*n*. In such an example, various policies may be utilized to determine which subset of the data that is stored by the cloud-based storage system 318 should reside in both: 1) the cloud-based object storage 348, and 2) at least one of the local storage 330, 334, 338 resources or block-storage 342, 344, 346 resources that are utilized by the cloud computing instances 340a, 340b, 340n.

As described above, when the cloud computing instances 340a, 340b, 340n with local storage 330, 334, 338 are embodied as EC2 instances, the cloud computing instances 340a, 340b, 340n with local storage 330, 334, 338 are only guaranteed to have a monthly uptime of 99.9% and data stored in the local instance store only persists during the lifetime of each cloud computing instance 340a, 340b, 340n with local storage 330, 334, 338. As such, one or more modules of computer program instructions that are executing within the cloud-based storage system 318 (e.g., a monitoring module that is executing on its own EC2 instance) may be designed to handle the failure of one or more of the cloud computing instances 340a, 340b, 340n with local storage 330, 334, 338. In such an example, the monitoring module may handle the failure of one or more of the cloud computing instances 340a, 340b, 340n with local storage 330, 334, 338 by creating one or more new cloud computing instances with local storage, retrieving data that was stored on the failed cloud computing instances 340a, 340b, 340n from the cloud-based object storage 348, and storing the data retrieved from the cloud-based object storage 348 in local storage on the newly created cloud computing instances. Readers will appreciate that many variants of this process may be implemented.

Consider an example in which all cloud computing instances 340a, 340b, 340n with local storage 330, 334, 338 failed. In such an example, the monitoring module may create new cloud computing instances with local storage, where high-bandwidth instances types are selected that allow for the maximum data transfer rates between the newly created high-bandwidth cloud computing instances with local storage and the cloud-based object storage 348. Readers will appreciate that instances types are selected that allow for the maximum data transfer rates between the new cloud computing instances and the cloud-based object storage 348 such that the new high-bandwidth cloud computing instances can be rehydrated with data from the cloud-based object storage 348 as quickly as possible. Once the new high-bandwidth cloud computing instances are rehydrated with data from the cloud-based object storage 348, less expensive lower-bandwidth cloud computing instances may be created, data may be migrated to the less expensive lower-bandwidth cloud computing instances, and the high-bandwidth cloud computing instances may be terminated.

Readers will appreciate that in some embodiments, the number of new cloud computing instances that are created may substantially exceed the number of cloud computing instances that are needed to locally store all of the data stored by the cloud-based storage system 318. The number of new cloud computing instances that are created may substantially exceed the number of cloud computing instances that are needed to locally store all of the data stored by the cloud-based storage system 318 in order to more rapidly pull data from the cloud-based object storage 348 and into the new cloud computing instances, as each new cloud computing instance can (in parallel) retrieve some portion of the data stored by the cloud-based storage system 318. In such embodiments, once the data stored by the cloud-based storage system 318 has been pulled into the newly created cloud computing instances, the data may be consolidated within a subset of the newly created cloud computing instances and those newly created cloud computing instances that are excessive may be terminated.

Consider an example in which 1000 cloud computing instances are needed in order to locally store all valid data that users of the cloud-based storage system 318 have written to the cloud-based storage system 318. In such an example, assume that all 1,000 cloud computing instances fail. In such an example, the monitoring module may cause 100,000 cloud computing instances to be created, where each cloud computing instance is responsible for retrieving, from the cloud-based object storage 348, distinct 1/100,000th chunks of the valid data that users of the cloud-based storage system 318 have written to the cloud-based storage system 318 and locally storing the distinct chunk of the dataset that it retrieved. In such an example, because each of the 100,000 cloud computing instances can retrieve data from the cloud-based object storage 348 in parallel, the caching layer may be restored 100 times faster as compared to an embodiment where the monitoring module only create 1000 replacement cloud computing instances. In such an example, over time the data that is stored locally in the 100,000 could be consolidated into 1,000 cloud computing instances and the remaining 99,000 cloud computing instances could be terminated.

Readers will appreciate that various performance aspects of the cloud-based storage system 318 may be monitored (e.g., by a monitoring module that is executing in an EC2 instance) such that the cloud-based storage system 318 can be scaled-up or scaled-out as needed. Consider an example in which the monitoring module monitors the performance of the could-based storage system 318 via communications with one or more of the cloud computing instances 320, 322 that each are used to support the execution of a storage controller application 324, 326, via monitoring communications between cloud computing instances 320, 322, 340a, 340b, 340n, via monitoring communications between cloud computing instances 320, 322, 340a, 340b, 340n and the cloud-based object storage 348, or in some other way. In such an example, assume that the monitoring module determines that the cloud computing instances 320, 322 that are used to support the execution of a storage controller application 324, 326 are undersized and not sufficiently servicing the I/O requests that are issued by users of the cloud-based storage system 318. In such an example, the monitoring module may create a new, more powerful cloud computing instance (e.g., a cloud computing instance of a type that includes more processing power, more memory, etc. . . . ) that includes the storage controller application such that the new, more powerful cloud computing instance can begin operating as the primary controller. Likewise, if the monitoring module determines that the cloud computing instances 320, 322 that are used to support the execution of a storage controller application 324, 326 are oversized and that cost savings could be gained by switching to a smaller, less powerful cloud computing instance, the monitoring module may create a new, less powerful (and less expensive) cloud computing instance that includes the storage controller application such that the new, less powerful cloud computing instance can begin operating as the primary controller.

Consider, as an additional example of dynamically sizing the cloud-based storage system 318, an example in which the monitoring module determines that the utilization of the local storage that is collectively provided by the cloud computing instances 340a, 340b, 340n has reached a predetermined utilization threshold (e.g., 95%). In such an example, the monitoring module may create additional cloud computing instances with local storage to expand the pool of local storage that is offered by the cloud computing instances. Alternatively, the monitoring module may create one or more new cloud computing instances that have larger amounts of local storage than the already existing cloud computing instances 340a, 340b, 340n, such that data stored in an already existing cloud computing instance 340a, 340b, 340n can be migrated to the one or more new cloud computing instances and the already existing cloud computing instance 340a, 340b, 340n can be terminated, thereby expanding the pool of local storage that is offered by the cloud computing instances. Likewise, if the pool of local storage that is offered by the cloud computing instances is unnecessarily large, data can be consolidated and some cloud computing instances can be terminated.

Readers will appreciate that the cloud-based storage system 318 may be sized up and down automatically by a monitoring module applying a predetermined set of rules that may be relatively simple of relatively complicated. In fact, the monitoring module may not only take into account the current state of the cloud-based storage system 318, but the monitoring module may also apply predictive policies that are based on, for example, observed behavior (e.g., every night from 10 PM until 6 AM usage of the storage system is relatively light), predetermined fingerprints (e.g., every time a virtual desktop infrastructure adds 100 virtual desktops, the number of IOPS directed to the storage system increase by X), and so on. In such an example, the dynamic scaling of the cloud-based storage system 318 may be based on current performance metrics, predicted workloads, and many other factors, including combinations thereof.

Readers will further appreciate that because the cloud-based storage system 318 may be dynamically scaled, the cloud-based storage system 318 may even operate in a way that is more dynamic. Consider the example of garbage collection. In a traditional storage system, the amount of storage is fixed. As such, at some point the storage system may be forced to perform garbage collection as the amount of available storage has become so constrained that the storage system is on the verge of running out of storage. In contrast, the cloud-based storage system 318 described here can always 'add' additional storage (e.g., by adding more cloud computing instances with local storage). Because the cloud-based storage system 318 described here can always 'add' additional storage, the cloud-based storage system 318 can make more intelligent decisions regarding when to perform garbage collection. For example, the cloud-based storage system 318 may implement a policy that garbage collection only be performed when the number of TOPS being serviced by the cloud-based storage system 318 falls below a certain level. In some embodiments, other system-level functions (e.g., deduplication, compression) may also be turned off and on in response to system load, given that the size of the cloud-based storage system 318 is not constrained in the same way that traditional storage systems are constrained.

Readers will appreciate that embodiments of the present disclosure resolve an issue with block-storage services offered by some cloud computing environments as some cloud computing environments only allow for one cloud computing instance to connect to a block-storage volume at a single time. For example, in Amazon AWS, only a single EC2 instance may be connected to an EBS volume. Through the use of EC2 instances with local storage, embodiments of the present disclosure can offer multi-connect capabilities where multiple EC2 instances can connect to another EC2 instance with local storage ('a drive instance'). In such embodiments, the drive instances may include software executing within the drive instance that allows the drive instance to support I/O directed to a particular volume from each connected EC2 instance. As such, some embodiments of the present disclosure may be embodied as multi-connect block storage services that may not include all of the components depicted in FIG. 3C.

In some embodiments, especially in embodiments where the cloud-based object storage 348 resources are embodied as Amazon S3, the cloud-based storage system 318 may include one or more modules (e.g., a module of computer program instructions executing on an EC2 instance) that are configured to ensure that when the local storage of a particular cloud computing instance is rehydrated with data from S3, the appropriate data is actually in S3. This issue arises largely because S3 implements an eventual consistency model where, when overwriting an existing object, reads of the object will eventually (but not necessarily immediately) become consistent and will eventually (but not necessarily immediately) return the overwritten version of the object. To address this issue, in some embodiments of the present disclosure, objects in S3 are never overwritten. Instead, a traditional 'overwrite' would result in the creation of the new object (that includes the updated version of the data) and the eventual deletion of the old object (that includes the previous version of the data).

In some embodiments of the present disclosure, as part of an attempt to never (or almost never) overwrite an object, when data is written to S3 the resultant object may be tagged with a sequence number. In some embodiments, these sequence numbers may be persisted elsewhere (e.g., in a database) such that at any point in time, the sequence number associated with the most up-to-date version of some piece of data can be known. In such a way, a determination can be made as to whether S3 has the most recent version of some piece of data by merely reading the sequence number associated with an object—and without actually reading the data from S3. The ability to make this determination may be particularly important when a cloud computing instance with local storage crashes, as it would be undesirable to rehydrate the local storage of a replacement cloud computing instance with out-of-date data. In fact, because the cloud-based storage system 318 does not need to access the data to verify its validity, the data can stay encrypted and access charges can be avoided.

The storage systems described above may carry out intelligent data backup techniques through which data stored in the storage system may be copied and stored in a distinct location to avoid data loss in the event of equipment failure or some other form of catastrophe. For example, the storage systems described above may be configured to examine each backup to avoid restoring the storage system to an undesirable state. Consider an example in which malware infects the storage system. In such an example, the storage system may include software resources 314 that can scan each backup to identify backups that were captured before the malware infected the storage system and those backups that were captured after the malware infected the storage system. In such an example, the storage system may restore itself from a backup that does not include the malware—or at least not restore the portions of a backup that contained the malware. In such an example, the storage system may include software resources 314 that can scan each backup to identify the presences of malware (or a virus, or some other undesirable), for example, by identifying write operations that were serviced by the storage system and originated from a network subnet that is suspected to have delivered the malware, by identifying write operations that were serviced by the storage system and originated from a user that is suspected to have delivered the malware, by identifying write operations that were serviced by the storage system and examining the content of the write operation against fingerprints of the malware, and in many other ways.

Readers will further appreciate that the backups (often in the form of one or more snapshots) may also be utilized to perform rapid recovery of the storage system. Consider an example in which the storage system is infected with ransomware that locks users out of the storage system. In such an example, software resources 314 within the storage system may be configured to detect the presence of ransomware and may be further configured to restore the storage system to a point-in-time, using the retained backups, prior to the point-in-time at which the ransomware infected the storage system. In such an example, the presence of ransomware may be explicitly detected through the use of software tools utilized by the system, through the use of a key (e.g., a USB drive) that is inserted into the storage system, or in a similar way. Likewise, the presence of ransomware may be inferred in response to system activity meeting a predetermined fingerprint such as, for example, no reads or writes coming into the system for a predetermined period of time.

Readers will appreciate that the various components described above may be grouped into one or more optimized computing packages as converged infrastructures. Such converged infrastructures may include pools of computers, storage and networking resources that can be shared by multiple applications and managed in a collective manner using policy-driven processes. Such converged infrastructures may be implemented with a converged infrastructure reference architecture, with standalone appliances, with a software driven hyper-converged approach (e.g., hyper-converged infrastructures), or in other ways.

Readers will appreciate that the storage systems described above may be useful for supporting various types of software applications. For example, the storage system 306 may be useful in supporting artificial intelligence ('AI') applications, database applications, DevOps projects, electronic design automation tools, event-driven software applications, high performance computing applications, simulation applications, high-speed data capture and analysis applications, machine learning applications, media production applications, media serving applications, picture archiving and communication systems ('PACS') applications, software development applications, virtual reality applications, augmented reality applications, and many other types of applications by providing storage resources to such applications.

The storage systems described above may operate to support a wide variety of applications. In view of the fact that the storage systems include compute resources, storage resources, and a wide variety of other resources, the storage systems may be well suited to support applications that are resource intensive such as, for example, AI applications. AI applications may be deployed in a variety of fields, including: predictive maintenance in manufacturing and related fields, healthcare applications such as patient data & risk analytics, retail and marketing deployments (e.g., search advertising, social media advertising), supply chains solutions, fintech solutions such as business analytics & reporting tools, operational deployments such as real-time analytics tools, application performance management tools, IT infrastructure management tools, and many others.

Such AI applications may enable devices to perceive their environment and take actions that maximize their chance of success at some goal. Examples of such AI applications can include IBM Watson, Microsoft Oxford, Google DeepMind, Baidu Minwa, and others. The storage systems described above may also be well suited to support other types of applications that are resource intensive such as, for example, machine learning applications. Machine learning applications may perform various types of data analysis to automate analytical model building. Using algorithms that iteratively learn from data, machine learning applications can enable computers to learn without being explicitly programmed. One particular area of machine learning is referred to as reinforcement learning, which involves taking suitable actions to maximize reward in a particular situation. Reinforcement learning may be employed to find the best possible behavior or path that a particular software application or machine should take in a specific situation. Reinforcement learning differs from other areas of machine learning (e.g., supervised learning, unsupervised learning) in that correct input/output pairs need not be presented for reinforcement learning and sub-optimal actions need not be explicitly corrected.

In addition to the resources already described, the storage systems described above may also include graphics processing units ('GPUs'), occasionally referred to as visual processing unit ('VPUs'). Such GPUs may be embodied as specialized electronic circuits that rapidly manipulate and alter memory to accelerate the creation of images in a frame buffer intended for output to a display device. Such GPUs may be included within any of the computing devices that are part of the storage systems described above, including as one of many individually scalable components of a storage system, where other examples of individually scalable components of such storage system can include storage components, memory components, compute components (e.g., CPUs, FPGAs, ASICs), networking components, software components, and others. In addition to GPUs, the storage systems described above may also include neural network processors ('NNPs') for use in various aspects of neural network processing. Such NNPs may be used in place of (or in addition to) GPUs and may be also be independently scalable.

As described above, the storage systems described herein may be configured to support artificial intelligence applications, machine learning applications, big data analytics applications, and many other types of applications. The rapid growth in these sort of applications is being driven by three technologies: deep learning (DL), GPU processors, and Big Data. Deep learning is a computing model that makes use of massively parallel neural networks inspired by the human brain. Instead of experts handcrafting software, a deep learning model writes its own software by learning from lots of examples. Such GPUs may include thousands of cores that are well-suited to run algorithms that loosely represent the parallel nature of the human brain.

Advances in deep neural networks have ignited a new wave of algorithms and tools for data scientists to tap into their data with artificial intelligence (AI). With improved algorithms, larger data sets, and various frameworks (including open-source software libraries for machine learning across a range of tasks), data scientists are tackling new use cases like autonomous driving vehicles, natural language processing and understanding, computer vision, machine reasoning, strong AI, and many others. Applications of such techniques may include: machine and vehicular object detection, identification and avoidance; visual recognition, classification and tagging; algorithmic financial trading strategy performance management; simultaneous localization and mapping; predictive maintenance of high-value machinery; prevention against cyber security threats, expertise automation; image recognition and classification; question answering; robotics; text analytics (extraction, classification) and text generation and translation; and many others. Applications of AI techniques has materialized in a wide array of products include, for example, Amazon Echo's speech recognition technology that allows users to talk to their machines, Google Translate™ which allows for machine-based language translation, Spotify's Discover Weekly that provides recommendations on new songs and artists that a user may like based on the user's usage and traffic analysis, Quill's text generation offering that takes structured data and turns it into narrative stories, Chatbots that provide real-time, contextually specific answers to questions in a dialog format, and many others.

Data is the heart of modern AI and deep learning algorithms. Before training can begin, one problem that must be addressed revolves around collecting the labeled data that is crucial for training an accurate AI model. A full scale AI deployment may be required to continuously collect, clean, transform, label, and store large amounts of data. Adding additional high quality data points directly translates to more accurate models and better insights. Data samples may undergo a series of processing steps including, but not limited to: 1) ingesting the data from an external source into the training system and storing the data in raw form, 2) cleaning and transforming the data in a format convenient for training, including linking data samples to the appropriate label, 3) exploring parameters and models, quickly testing with a smaller dataset, and iterating to converge on the most promising models to push into the production cluster, 4) executing training phases to select random batches of input data, including both new and older samples, and feeding those into production GPU servers for computation to update model parameters, and 5) evaluating including using a holdback portion of the data not used in training in order to evaluate model accuracy on the holdout data. This lifecycle may apply for any type of parallelized machine learning, not just neural networks or deep learning. For example, standard machine learning frameworks may rely on CPUs instead of GPUs but the data ingest and training workflows may be the same. Readers will appreciate that a single shared storage data hub creates a coordination point throughout the lifecycle without the need for extra data copies among the ingest, preprocessing, and training stages. Rarely is the ingested data used for only one purpose, and shared storage gives the flexibility to train multiple different models or apply traditional analytics to the data.

Readers will appreciate that each stage in the AI data pipeline may have varying requirements from the data hub (e.g., the storage system or collection of storage systems). Scale-out storage systems must deliver uncompromising performance for all manner of access types and patterns—from small, metadata-heavy to large files, from random to sequential access patterns, and from low to high concurrency. The storage systems described above may serve as an ideal AI data hub as the systems may service unstructured workloads. In the first stage, data is ideally ingested and stored on to the same data hub that following stages will use, in order to avoid excess data copying. The next two steps can be done on a standard compute server that optionally includes a GPU, and then in the fourth and last stage, full training production jobs are run on powerful GPU-accelerated servers. Often, there is a production pipeline alongside an experimental pipeline operating on the same dataset. Further, the GPU-accelerated servers can be used independently for different models or joined together to train on one larger model, even spanning multiple systems for distributed training. If the shared storage tier is slow, then data must be copied to local storage for each phase, resulting in wasted time staging data onto different servers. The ideal data hub for the AI training pipeline delivers performance similar to data stored locally on the server node while also having the simplicity and performance to enable all pipeline stages to operate concurrently.

Although the preceding paragraphs discuss deep learning applications, readers will appreciate that the storage systems described herein may also be part of a distributed deep learning ('DDL') platform to support the execution of DDL algorithms. The storage systems described above may also be paired with other technologies such as TensorFlow, an open-source software library for dataflow programming across a range of tasks that may be used for machine learning applications such as neural networks, to facilitate the development of such machine learning models, applications, and so on.

The storage systems described above may also be used in a neuromorphic computing environment. Neuromorphic computing is a form of computing that mimics brain cells. To support neuromorphic computing, an architecture of interconnected "neurons" replace traditional computing models with low-powered signals that go directly between neurons for more efficient computation. Neuromorphic computing may make use of very-large-scale integration (VLSI) systems containing electronic analog circuits to mimic neuro-biological architectures present in the nervous system, as well as analog, digital, mixed-mode analog/digital VLSI, and software systems that implement models of neural systems for perception, motor control, or multisensory integration.

Readers will appreciate that the storage systems described above may be configured to support the storage or use of (among other types of data) blockchains. In addition to supporting the storage and use of blockchain technologies, the storage systems described above may also support the storage and use of derivative items such as, for example, open source blockchains and related tools that are part of the IBM™ Hyperledger project, permissioned blockchains in which a certain number of trusted parties are allowed to access the block chain, blockchain products that enable developers to build their own distributed ledger projects, and others. Blockchains and the storage systems described herein may be leveraged to support on-chain storage of data as well as off-chain storage of data.

Off-chain storage of data can be implemented in a variety of ways and can occur when the data itself is not stored within the blockchain. For example, in one embodiment, a hash function may be utilized and the data itself may be fed into the hash function to generate a hash value. In such an example, the hashes of large pieces of data may be embedded within transactions, instead of the data itself. Readers will appreciate that, in other embodiments, alternatives to blockchains may be used to facilitate the decentralized storage of information. For example, one alternative to a blockchain that may be used is a blockweave. While conventional blockchains store every transaction to achieve validation, a blockweave permits secure decentralization without the usage of the entire chain, thereby enabling low cost on-chain storage of data. Such blockweaves may utilize a consensus mechanism that is based on proof of access (PoA) and proof of work (PoW).

The storage systems described above may, either alone or in combination with other computing devices, be used to support in-memory computing applications. In-memory computing involves the storage of information in RAM that is distributed across a cluster of computers. Readers will appreciate that the storage systems described above, especially those that are configurable with customizable amounts of processing resources, storage resources, and memory resources (e.g., those systems in which blades that contain configurable amounts of each type of resource), may be configured in a way so as to provide an infrastructure that can support in-memory computing. Likewise, the storage systems described above may include component parts (e.g., NVDIMMs, 3D crosspoint storage that provide fast random access memory that is persistent) that can actually provide for an improved in-memory computing environment as compared to in-memory computing environments that rely on RAM distributed across dedicated servers.

In some embodiments, the storage systems described above may be configured to operate as a hybrid in-memory computing environment that includes a universal interface to all storage media (e.g., RAM, flash storage, 3D crosspoint storage). In such embodiments, users may have no knowledge regarding the details of where their data is stored but they can still use the same full, unified API to address data. In such embodiments, the storage system may (in the background) move data to the fastest layer available—including intelligently placing the data in dependence upon various characteristics of the data or in dependence upon some other heuristic. In such an example, the storage systems may even make use of existing products such as Apache Ignite and GridGain to move data between the various storage layers, or the storage systems may make use of custom software to move data between the various storage layers. The storage systems described herein may implement various optimizations to improve the performance of in-memory computing such as, for example, having computations occur as close to the data as possible.

Readers will further appreciate that in some embodiments, the storage systems described above may be paired with other resources to support the applications described above. For example, one infrastructure could include primary compute in the form of servers and workstations which specialize in using General-purpose computing on graphics processing units ('GPGPU') to accelerate deep learning applications that are interconnected into a computation engine to train parameters for deep neural networks. Each system may have Ethernet external connectivity, InfiniBand external connectivity, some other form of external connectivity, or some combination thereof. In such an example, the GPUs can be grouped for a single large training or used independently to train multiple models. The infrastructure could also include a storage system such as those described above to provide, for example, a scale-out all-flash file or object store through which data can be accessed via high-performance protocols such as NFS, S3, and so on. The infrastructure can also include, for example, redundant top-of-rack Ethernet switches connected to storage and compute via ports in MLAG port channels for redundancy. The infrastructure could also include additional compute in the form of whitebox servers, optionally with GPUs, for data ingestion, pre-processing, and model debugging. Readers will appreciate that additional infrastructures are also be possible.

Readers will appreciate that the storage systems described above, either alone or in coordination with other computing machinery may be configured to support other AI related tools. For example, the storage systems may make use of tools like ONXX or other open neural network exchange formats that make it easier to transfer models written in different AI frameworks. Likewise, the storage systems may be configured to support tools like Amazon's Gluon that allow developers to prototype, build, and train deep learning models. In fact, the storage systems described above may be part of a larger platform, such as IBM™ Cloud Private for Data, that includes integrated data science, data engineering and application building services.

Readers will further appreciate that the storage systems described above may also be deployed as an edge solution. Such an edge solution may be in place to optimize cloud computing systems by performing data processing at the edge of the network, near the source of the data. Edge computing can push applications, data and computing power (i.e., services) away from centralized points to the logical extremes of a network. Through the use of edge solutions such as the storage systems described above, computational tasks may be performed using the compute resources provided by such storage systems, data may be storage using the storage resources of the storage system, and cloud-based services may be accessed through the use of various resources of the storage system (including networking resources). By performing computational tasks on the edge solution, storing data on the edge solution, and generally making use of the edge solution, the consumption of expensive cloud-based resources may be avoided and, in fact, performance improvements may be experienced relative to a heavier reliance on cloud-based resources.

While many tasks may benefit from the utilization of an edge solution, some particular uses may be especially suited for deployment in such an environment. For example, devices like drones, autonomous cars, robots, and others may require extremely rapid processing—so fast, in fact, that sending data up to a cloud environment and back to receive data processing support may simply be too slow. As an additional example, some IoT devices such as connected video cameras may not be well-suited for the utilization of cloud-based resources as it may be impractical (not only from a privacy perspective, security perspective, or a financial perspective) to send the data to the cloud simply because of the pure volume of data that is involved. As such, many tasks that really on data processing, storage, or communications may be better suited by platforms that include edge solutions such as the storage systems described above.

The storage systems described above may alone, or in combination with other computing resources, serves as a network edge platform that combines compute resources, storage resources, networking resources, cloud technologies and network virtualization technologies, and so on. As part of the network, the edge may take on characteristics similar to other network facilities, from the customer premise and backhaul aggregation facilities to Points of Presence (PoPs) and regional data centers. Readers will appreciate that network workloads, such as Virtual Network Functions (VNFs) and others, will reside on the network edge platform. Enabled by a combination of containers and virtual machines, the network edge platform may rely on controllers and schedulers that are no longer geographically co-located with the data processing resources. The functions, as microservices, may split into control planes, user and data planes, or even state machines, allowing for independent optimization and scaling techniques to be applied. Such user and data planes may be enabled through increased accelerators, both those residing in server platforms, such as FPGAs and Smart NICs, and through SDN-enabled merchant silicon and programmable ASICs.

The storage systems described above may also be optimized for use in big data analytics. Big data analytics may be generally described as the process of examining large and varied data sets to uncover hidden patterns, unknown correlations, market trends, customer preferences and other useful information that can help organizations make more-informed business decisions. As part of that process, semi-structured and unstructured data such as, for example, internet clickstream data, web server logs, social media content, text from customer emails and survey responses, mobile-phone call-detail records, IoT sensor data, and other data may be converted to a structured form.

The storage systems described above may also support (including implementing as a system interface) applications that perform tasks in response to human speech. For example, the storage systems may support the execution intelligent personal assistant applications such as, for example, Amazon's Alexa, Apple Siri, Google Voice, Samsung Bixby, Microsoft Cortana, and others. While the examples described in the previous sentence make use of voice as input, the storage systems described above may also support chatbots, talkbots, chatterbots, or artificial conversational entities or other applications that are configured to conduct a conversation via auditory or textual methods. Likewise, the storage system may actually execute such an application to enable a user such as a system administrator to interact with the storage system via speech. Such applications are generally capable of voice interaction, music playback, making to-do lists, setting alarms, streaming podcasts, playing audiobooks, and providing weather, traffic, and other real time information, such as news, although in embodiments in accordance with the present disclosure, such applications may be utilized as interfaces to various system management operations.

The storage systems described above may also implement AI platforms for delivering on the vision of self-driving storage. Such AI platforms may be configured to deliver global predictive intelligence by collecting and analyzing large amounts of storage system telemetry data points to enable effortless management, analytics and support. In fact, such storage systems may be capable of predicting both capacity and performance, as well as generating intelligent advice on workload deployment, interaction and optimization. Such AI platforms may be configured to scan all incoming storage system telemetry data against a library of issue fingerprints to predict and resolve incidents in real-time, before they impact customer environments, and captures hundreds of variables related to performance that are used to forecast performance load.

The storage systems described above may support the serialized or simultaneous execution of artificial intelligence applications, machine learning applications, data analytics applications, data transformations, and other tasks that collectively may form an AI ladder. Such an AI ladder may effectively be formed by combining such elements to form a complete data science pipeline, where exist dependencies between elements of the AI ladder. For example, AI may require that some form of machine learning has taken place, machine learning may require that some form of analytics has taken place, analytics may require that some form of data and information architecting has taken place, and so on. As such, each element may be viewed as a rung in an AI ladder that collectively can form a complete and sophisticated AI solution.

The storage systems described above may also, either alone or in combination with other computing environments, be used to deliver an AI everywhere experience where AI permeates wide and expansive aspects of business and life. For example, AI may play an important role in the delivery of deep learning solutions, deep reinforcement learning solutions, artificial general intelligence solutions, autonomous vehicles, cognitive computing solutions, commercial UAVs or drones, conversational user interfaces, enterprise taxonomies, ontology management solutions, machine learning solutions, smart dust, smart robots, smart workplaces, and many others.

The storage systems described above may also, either alone or in combination with other computing environments, be used to deliver a wide range of transparently immersive experiences (including those that use digital twins of various "things" such as people, places, processes, systems, and so on) where technology can introduce transparency between people, businesses, and things. Such transparently immersive experiences may be delivered as augmented reality technologies, connected homes, virtual reality technologies, brain-computer interfaces, human augmentation technologies, nanotube electronics, volumetric displays, 4D printing technologies, or others.

The storage systems described above may also, either alone or in combination with other computing environments, be used to support a wide variety of digital platforms. Such digital platforms can include, for example, 5G wireless systems and platforms, digital twin platforms, edge computing platforms, IoT platforms, quantum computing platforms, serverless PaaS, software-defined security, neuromorphic computing platforms, and so on.

The storage systems described above may also be part of a multi-cloud environment in which multiple cloud computing and storage services are deployed in a single heterogeneous architecture. In order to facilitate the operation of such a multi-cloud environment, DevOps tools may be deployed to enable orchestration across clouds. Likewise, continuous development and continuous integration tools may be deployed to standardize processes around continuous integration and delivery, new feature rollout and provisioning cloud workloads. By standardizing these processes, a multi-cloud strategy may be implemented that enables the utilization of the best provider for each workload.

The storage systems described above may be used as a part of a platform to enable the use of crypto-anchors that may be used to authenticate a product's origins and contents to ensure that it matches a blockchain record associated with the product. Similarly, as part of a suite of tools to secure data stored on the storage system, the storage systems described above may implement various encryption technologies and schemes, including lattice cryptography. Lattice cryptography can involve constructions of cryptographic primitives that involve lattices, either in the construction itself or in the security proof. Unlike public-key schemes such as the RSA, Diffie-Hellman or Elliptic-Curve cryptosystems, which are easily attacked by a quantum computer, some lattice-based constructions appear to be resistant to attack by both classical and quantum computers.

A quantum computer is a device that performs quantum computing. Quantum computing is computing using quantum-mechanical phenomena, such as superposition and entanglement. Quantum computers differ from traditional computers that are based on transistors, as such traditional computers require that data be encoded into binary digits (bits), each of which is always in one of two definite states (0 or 1). In contrast to traditional computers, quantum computers use quantum bits, which can be in superpositions of states. A quantum computer maintains a sequence of qubits, where a single qubit can represent a one, a zero, or any quantum superposition of those two qubit states. A pair of qubits can be in any quantum superposition of 4 states, and three qubits in any superposition of 8 states. A quantum computer with n qubits can generally be in an arbitrary superposition of up to 2^n different states simultaneously, whereas a traditional computer can only be in one of these states at any one time. A quantum Turing machine is a theoretical model of such a computer.

The storage systems described above may also be paired with FPGA-accelerated servers as part of a larger AI or ML infrastructure. Such FPGA-accelerated servers may reside near (e.g., in the same data center) the storage systems described above or even incorporated into an appliance that includes one or more storage systems, one or more FPGA-accelerated servers, networking infrastructure that supports communications between the one or more storage systems and the one or more FPGA-accelerated servers, as well as other hardware and software components. Alternatively, FPGA-accelerated servers may reside within a cloud computing environment that may be used to perform compute-related tasks for AI and ML jobs. Any of the embodiments described above may be used to collectively serve as a FPGA-based AI or ML platform. Readers will appreciate that, in some embodiments of the FPGA-based AI or ML platform, the FPGAs that are contained within the FPGA-accelerated servers may be reconfigured for different types of ML models (e.g., LSTMs, CNNs, GRUs). The ability to reconfigure the FPGAs that are contained within the FPGA-accelerated servers may enable the acceleration of a ML or AI application based on the most optimal numerical precision and memory model being used. Readers will appreciate that by treating the collection of FPGA-accelerated servers as a pool of FPGAs, any CPU in the data center may utilize the pool of FPGAs as a shared hardware microservice, rather than limiting a server to dedicated accelerators plugged into it.

The FPGA-accelerated servers and the GPU-accelerated servers described above may implement a model of computing where, rather than keeping a small amount of data in a CPU and running a long stream of instructions over it as occurred in more traditional computing models, the machine learning model and parameters are pinned into the high-bandwidth on-chip memory with lots of data streaming though the high-bandwidth on-chip memory. FPGAs may even be more efficient than GPUs for this computing model, as the FPGAs can be programmed with only the instructions needed to run this kind of computing model.

The storage systems described above may be configured to provide parallel storage, for example, through the use of a parallel file system such as BeeGFS. Such parallel files systems may include a distributed metadata architecture. For example, the parallel file system may include a plurality of metadata servers across which metadata is distributed, as well as components that include services for clients and storage servers.

The systems described above can support the execution of a wide array of software applications. Such software applications can be deployed in a variety of ways, including container-based deployment models. Containerized applications may be managed using a variety of tools. For example, containerized applications may be managed using Docker Swarm, Kubernetes, and others. Containerized applications may be used to facilitate a serverless, cloud native computing deployment and management model for software applications. In support of a serverless, cloud native computing deployment and management model for software applications, containers may be used as part of an event handling mechanisms (e.g., AWS Lambdas) such that various events cause a containerized application to be spun up to operate as an event handler.

The systems described above may be deployed in a variety of ways, including being deployed in ways that support fifth generation ('5G') networks. 5G networks may support substantially faster data communications than previous generations of mobile communications networks and, as a consequence may lead to the disaggregation of data and computing resources as modern massive data centers may become less prominent and may be replaced, for example, by more-local, micro data centers that are close to the mobile-network towers. The systems described above may be included in such local, micro data centers and may be part of or paired to multi-access edge computing ('MEC') systems. Such MEC systems may enable cloud computing capabilities and an IT service environment at the edge of the cellular network. By running applications and performing related processing tasks closer to the cellular customer, network congestion may be reduced and applications may perform better.

Figure 3D:
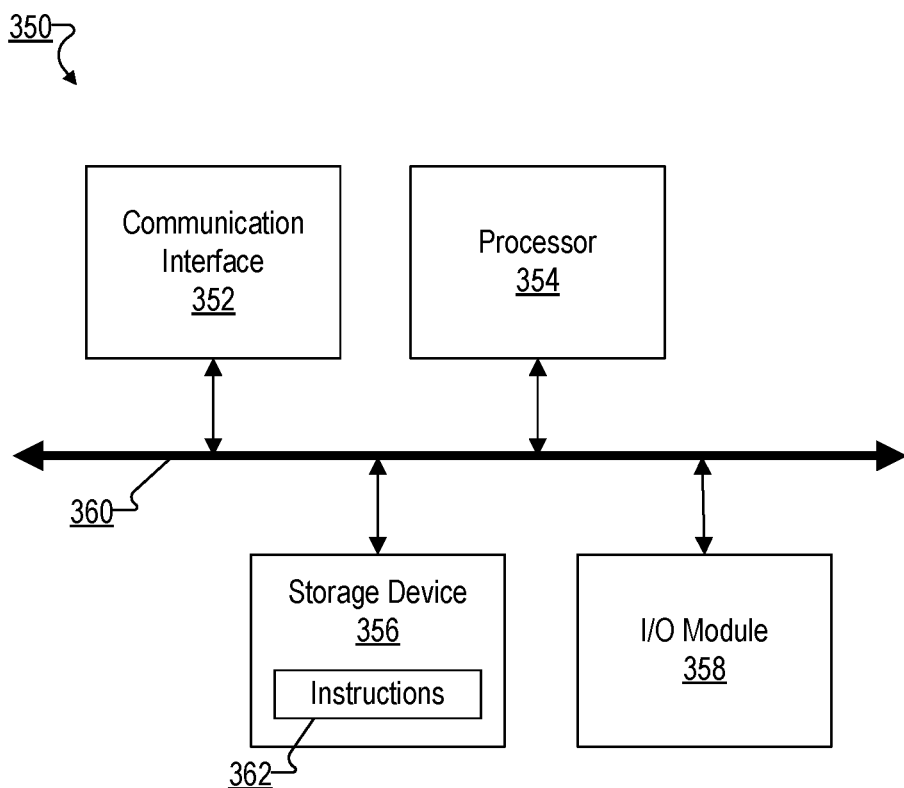
FIG. 3D illustrates an exemplary computing device that may be specifically configured to perform one or more of the processes described herein.

For further explanation, FIG. 3D illustrates an exemplary computing device 350 that may be specifically configured to perform one or more of the processes described herein. As shown in FIG. 3D, computing device 350 may include a communication interface 352, a processor 354, a storage device 356, and an input/output ("I/O") module 358 communicatively connected one to another via a communication infrastructure 360. While an exemplary computing device 350 is shown in FIG. 3D, the components illustrated in FIG. 3D are not intended to be limiting. Additional or alternative components may be used in other embodiments. Components of computing device 350 shown in FIG. 3D will now be described in additional detail.

Communication interface 352 may be configured to communicate with one or more computing devices. Examples of communication interface 352 include, without limitation, a wired network interface (such as a network interface card), a wireless network interface (such as a wireless network interface card), a modem, an audio/video connection, and any other suitable interface.

Processor 354 generally represents any type or form of processing unit capable of processing data and/or interpreting, executing, and/or directing execution of one or more of the instructions, processes, and/or operations described herein. Processor 354 may perform operations by executing computer-executable instructions 362 (e.g., an application, software, code, and/or other executable data instance) stored in storage device 356.

Storage device 356 may include one or more data storage media, devices, or configurations and may employ any type, form, and combination of data storage media and/or device. For example, storage device 356 may include, but is not limited to, any combination of the non-volatile media and/or volatile media described herein. Electronic data, including data described herein, may be temporarily and/or permanently stored in storage device 356. For example, data representative of computer-executable instructions 362 configured to direct processor 354 to perform any of the operations described herein may be stored within storage device 356. In some examples, data may be arranged in one or more databases residing within storage device 356.

I/O module 358 may include one or more I/O modules configured to receive user input and provide user output. I/O module 358 may include any hardware, firmware, software, or combination thereof supportive of input and output capabilities. For example, I/O module 358 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 358 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 358 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 350.

Advantages and features of the present disclosure can be further described by the following statements:

1. A method comprising: detecting, by a data protection system, one or more delete requests to delete one or more recovery datasets of a storage system; determining, by the data protection system, that the one or more delete requests are inconsistent with a recovery dataset deletion pattern associated with the storage system; and determining, by the data protection system and based on the determining that the one or more delete requests are inconsistent with the recovery dataset deletion pattern, that data stored by the storage system is possibly being targeted by a security threat.

2. The method of statement 1, wherein: the recovery dataset deletion pattern is associated with one or more time windows and one or more of a threshold number of retained recovery datasets for each time window or a recovery point distance between two consecutive recovery datasets being retained for each time window.

3. The method of any of the preceding statements, wherein: the recovery dataset deletion pattern is associated with a first time window and a second time window prior to the first time window; and the recovery dataset deletion pattern is associated with a first threshold number of retained recovery datasets for the first time window and a second threshold number of retained recovery datasets for the second time window, the first threshold number of retained recovery datasets being higher than the second threshold number of retained recovery datasets.

4. The method of any of the preceding statements, wherein: the recovery dataset deletion pattern is associated with a first time window and a second time window prior to the first time window; and the recovery dataset deletion pattern is associated with a first recovery point distance between two consecutive recovery datasets being retained for the first time window and a second recovery point distance between two consecutive recovery datasets being retained for the second time window, the first recovery point distance being shorter than the second recovery point distance.

5. The method of any of the preceding statements, wherein the determining that the one or more delete requests are inconsistent with the recovery dataset deletion pattern includes: determining that the one or more delete requests attempt to delete a first number of recovery datasets that are generated within a first time window; determining that the one or more delete requests attempt to delete a second number of recovery datasets that are generated within a second time window, the second time window being prior to the first time window; and determining that the first number of recovery datasets is higher than the second number of recovery datasets.

6. The method of any of the preceding statements, wherein the determining that the one or more delete requests are inconsistent with the recovery dataset deletion pattern includes: determining that the one or more delete requests attempt to delete a first number of recovery datasets that are generated within a time window; determining a second number of recovery datasets that will be retained for the time window when the first number of recovery datasets are deleted; and determining that the second number of recovery datasets that will be retained for the time window is lower than a threshold number of retained recovery datasets corresponding to the time window as specified by the recovery dataset deletion pattern.

7. The method of any of the preceding statements, wherein the determining that the one or more delete requests are inconsistent with the recovery dataset deletion pattern includes: identifying one or more recovery datasets being retained based on the recovery dataset deletion pattern; and determining that the one or more delete requests attempt to delete at least one of the one or more recovery datasets being retained.

8. The method of any of the preceding statements, further comprising: performing, by the data protection system in response to the determining that the data stored by the storage system is possibly being targeted by the security threat, a remedial action with respect to the storage system.

9. The method of any of the preceding statements, wherein the performing the remedial action with respect to the storage system includes: identifying one or more recovery datasets being retained based on the recovery dataset deletion pattern; and converting at least one of the one or more recovery datasets being retained into a provisional protection recovery dataset that has an increased protection level as compared to the one or more recovery datasets being retained.

10. The method of any of the preceding statements, further comprising: determining that one or more additional delete requests are inconsistent with the recovery dataset deletion pattern; and converting, in response to the determining that the one or more additional delete requests are inconsistent with the recovery dataset deletion pattern, the provisional protection recovery dataset into a full protection recovery dataset that has an additionally increased protection level as compared to the provisional protection recovery dataset.

11. The method of any of the preceding statements, further comprising: determining, by the data protection system, that one or more additional delete requests are inconsistent with the recovery dataset deletion pattern; and instructing, by the data protection system and in response to the determining that the one or more additional delete requests are inconsistent with the recovery dataset deletion pattern, the storage system to block one or more subsequent delete requests associated with the data stored by the storage system.

12. A system comprising: a memory storing instructions; and a processor communicatively coupled to the memory and configured to execute the instructions to: detect one or more delete requests to delete one or more recovery datasets of a storage system; determine that the one or more delete requests are inconsistent with a recovery dataset deletion pattern associated with the storage system; and determine, based on the determining that the one or more delete requests are inconsistent with the recovery dataset deletion pattern, that data stored by the storage system is possibly being targeted by a security threat.

13. The system of statement 12, wherein: the recovery dataset deletion pattern is associated with one or more time windows and one or more of a threshold number of retained recovery datasets for each time window or a recovery point distance between two consecutive recovery datasets being retained for each time window.

14. The system of any of statement 12-13, wherein: the recovery dataset deletion pattern is associated with a first time window and a second time window prior to the first time window; and the recovery dataset deletion pattern is associated with a first threshold number of retained recovery datasets for the first time window and a second threshold number of retained recovery datasets for the second time window, the first threshold number of retained recovery datasets being higher than the second threshold number of retained recovery datasets.

15. The system of any of statement 12-14, wherein: the recovery dataset deletion pattern is associated with a first time window and a second time window prior to the first time window; and the recovery dataset deletion pattern is associated with a first recovery point distance between two consecutive recovery datasets being retained for the first time window and a second recovery point distance between two consecutive recovery datasets being retained for the second time window, the first recovery point distance being shorter than the second recovery point distance.

16. The system of any of statement 12-15, wherein the determining that the one or more delete requests are inconsistent with the recovery dataset deletion pattern includes: determining that the one or more delete requests attempt to delete a first number of recovery datasets that are generated within a first time window; determining that the one or more delete requests attempt to delete a second number of recovery datasets that are generated within a second time window, the second time window being prior to the first time window; and determining that the first number of recovery datasets is higher than the second number of recovery datasets.

17. The system of any of statement 12-16, wherein the determining that the one or more delete requests are inconsistent with the recovery dataset deletion pattern includes: determining that the one or more delete requests attempt to delete a first number of recovery datasets that are generated within a time window; determining a second number of recovery datasets that will be retained for the time window when the first number of recovery datasets are deleted; and determining that the second number of recovery datasets that will be retained for the time window is lower than a threshold number of retained recovery datasets corresponding to the time window as specified by the recovery dataset deletion pattern.

18. The system of any of statement 12-17, wherein the determining that the one or more delete requests are inconsistent with the recovery dataset deletion pattern includes: identifying one or more recovery datasets being retained based on the recovery dataset deletion pattern; and determining that the one or more delete requests attempt to delete at least one of the one or more recovery datasets being retained.

19. The system of any of statement 12-18, wherein the processor is further configured to execute the instructions to: perform, in response to the determining that the data stored by the storage system is possibly being targeted by the security threat, a remedial action with respect to the storage system.

20. non-transitory computer-readable medium storing instructions that, when executed, direct a processor of a computing device to: detect one or more delete requests to delete one or more recovery datasets of a storage system; determine that the one or more delete requests are inconsistent with a recovery dataset deletion pattern associated with the storage system; and determine, based on the determining that the one or more delete requests are inconsistent with the recovery dataset deletion pattern, that data stored by the storage system is possibly being targeted by a security threat.

One or more embodiments may be described herein with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

While particular combinations of various functions and features of the one or more embodiments are expressly described herein, other combinations of these features and functions are likewise possible. The present disclosure is not limited by the particular examples disclosed herein and expressly incorporates these other combinations.

Malicious entities (e.g., hackers, malware, and/or other entities) may gain unauthorized access to a storage system, such as any of the storage systems described herein. With such access, the malicious entities may attempt to perform operations that affect a capacity of storage structures (e.g., snapshots, volumes, and/or other logical structures that within the storage system that include and/or reference data stored by the storage system).

The methods and systems described herein may mitigate (e.g., prevent, throttle, and/or otherwise address) malicious operations with respect to storage structures. For example, as described herein, a monitoring system may detect that a storage system receives a request to perform an operation that affects a capacity of a storage structure within the storage system. The monitoring system may identify an attribute of at least one of the request and the storage system. Based on the attribute, the monitoring system may determine that the request is indicative of a malicious action. In response to this determination, the monitoring system may perform a remedial action with respect to the requested operation, thereby ensuring that the request does not make data unrecoverable prior to an administrator having time to notice and take action. As used herein, a target storage structure is one that is the target of a request that may be malicious in nature.

Various advantages and benefits may be realized in accordance with the methods and systems described herein. For example, by preventing or otherwise mitigating malicious operations with respect to storage structures within a storage system, the methods and systems described herein may provide robust, secure, and efficient operation of the storage system. Moreover, by implementing a monitoring system at the storage level, the methods and systems described herein may provide a last line of defense against malicious attacks should other data security measures taken at levels above the storage level (e.g., at the client level) fail to identify and/or thwart the malicious. This may improve the operation of computing devices at both the storage level and at other levels above the storage level.

Figure 4:
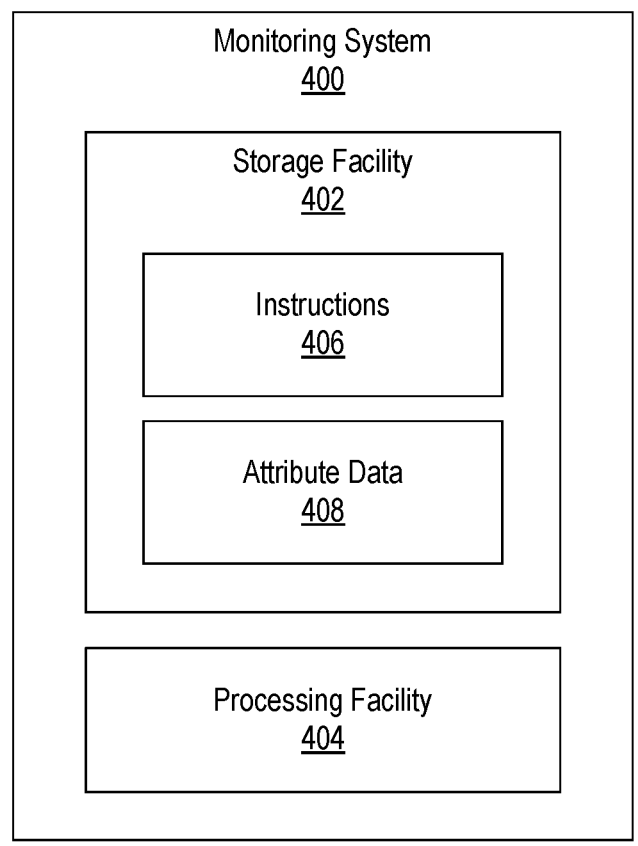
FIG. 4 illustrates an exemplary monitoring system in accordance with some embodiments of the present disclosure.

FIG. 4 illustrates an exemplary monitoring system 400 ("system 400"). As shown, system 400 may include, without limitation, a storage facility 402 and a processing facility 404 selectively and communicatively coupled to one another. Facilities 402 and 404 may each include or be implemented by hardware and/or software components (e.g., processors, memories, communication interfaces, instructions stored in memory for execution by the processors, etc.). In some examples, facilities 402 and 404 may be distributed between multiple devices and/or multiple locations as may serve a particular implementation.

Storage facility 402 may maintain (e.g., store) executable data used by processing facility 404 to perform any of the operations described herein. For example, storage facility 402 may store instructions 406 that may be executed by processing facility 404 to perform any of the operations described herein. Instructions 406 may be implemented by any suitable application, software, code, and/or other executable data instance.

Storage facility 402 may also maintain any data received, generated, managed, used, and/or transmitted by processing facility 404. For example, as shown, storage facility 402 may maintain attribute data 408. Attribute data 408 is representative of one or more attributes of a request and/or a storage system, as described herein. Storage facility 402 may additionally maintain any other suitable type of data as may serve a particular implementation.

Processing facility 404 may be configured to perform (e.g., execute instructions 406 stored in storage facility 402 to perform) various processing operations associated with mitigating malicious operations with respect to storage structures within a storage system. For example, processing facility 404 may detect that a storage system receives a request to perform an operation that affects a capacity of a storage structure within the storage system. Processing facility 404 may identify an attribute of at least one of the request and the storage system. Based on the attribute, processing facility 404 may determine that the request is indicative of a malicious action. In response to this determination, processing facility 404 may perform a remedial action with respect to the requested operation. These and other operations that may be performed by system 400 (e.g., processing facility 404) are described herein.

Figure 5:
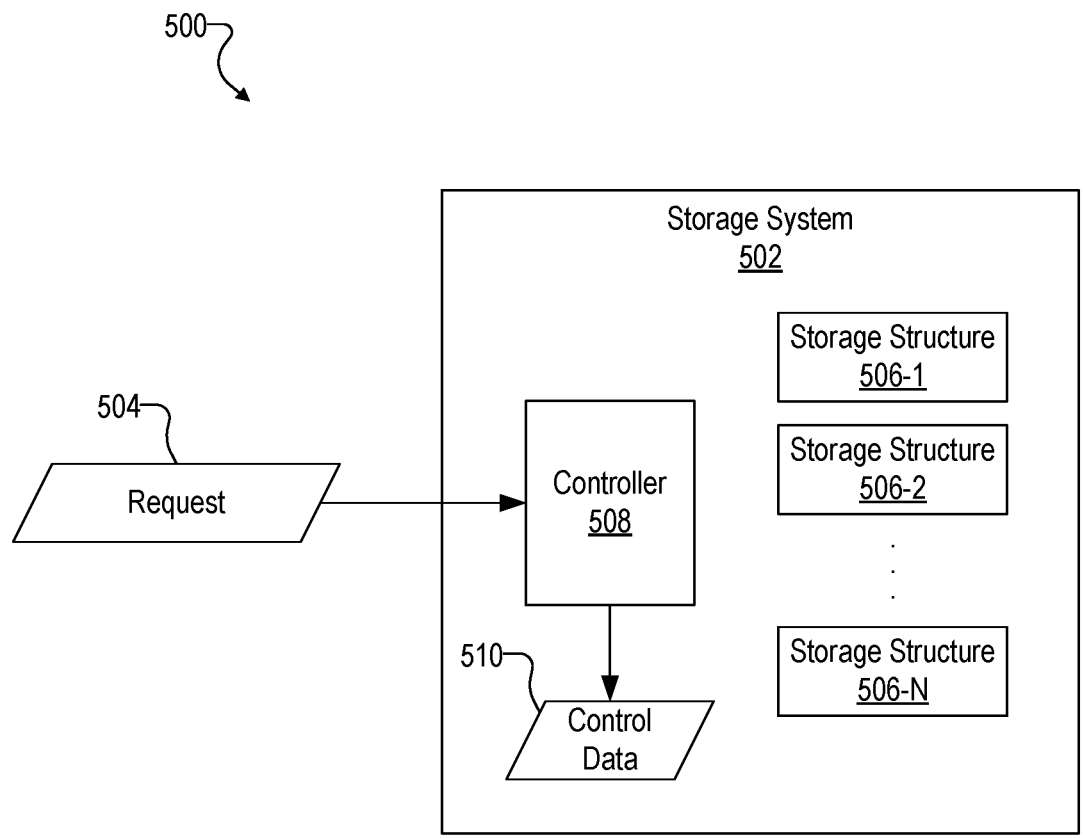
FIG. 5 illustrates an exemplary configuration in which a storage system may receive a request in accordance with some embodiments of the present disclosure.

FIG. 5 illustrates an exemplary configuration 500 in which a storage system 502 may receive a request 504 to perform an operation that affects a capacity of a storage structure within storage system 502. Storage system 502 may be implemented by any of the storage systems, devices, and/or components described herein. For example, storage system 502 may be implemented by a local storage system (e.g., a storage system located on-site at a customer's premises) and/or by a remote storage system (e.g., a storage system located in the cloud).

As shown, storage system 502 includes a plurality of storage structures 506 (e.g., storage structures 506-1 through 506-N) and a controller 508. Storage structures 506 may each include any logical structure within which data may be stored and/or organized. For example, storage structures 506 may include one or more snapshots, volumes, file systems, object stores, key value or relational or other databases, backup datasets, objects that manage a group of volumes, container objects, blocks, etc. In some examples, storage structures 506 are maintained in one or more storage elements (e.g., storage arrays, memories, etc.).

Controller 508 may be configured to control operations of elements included in storage system 502 and may be implemented by any suitable combination of processors, operating systems, and/or other components as described herein. In particular, controller 508 may be configured to produce control data 510 configured to control storage structures 506. For example, control data 510 may be representative of one or more instructions to create, modify, write to, read from, delete, eradicate, and/or otherwise interact with storage structures 506.

Request 504 may originate from a source (e.g., a host in communication with storage system 502) and may be provided by an entity, such as a person or software application. Request 504 may include instructions for controller 508 to perform one or more operations that affect a capacity of one or more storage structures 506. Such operations include eradication of a storage structure 506, deletion of the storage structure 506, replacement of data in the storage structure 506 with less compressible or incompressible data (a common, or a host system that can issue requests to storage system 502, a ransomware attack on the storage structure 506, and/or any other operation that destroys, modifies, renders unusable, or otherwise affects the storage structure 506 and/or original data within the storage structure 506.

In some cases, request 504 may originate from a legitimate source. For example, an administrator of storage system 506 may log in to the storage system and provide request 504 as part of a routine maintenance procedure with respect to storage system 502. In other cases, however, request 504 may originate from a malicious entity, such as a hacker who has gained unauthorized access to storage system 502 and/or malware that has infiltrated storage system 502. In these cases, request 504 may be indicative of a malicious action configured to damage or otherwise cause harm to one or more of storage structures 506 and/or data within storage structures 506.

Accordingly, as described herein, system 400 is configured to monitor for requests that are indicative of malicious actions. When a request is determined by system 400 to be indicative of a malicious action, system 400 may perform a remedial action with respect to the requested operation.

In some examples, system 400 is implemented by storage system 502. For example, system 400 may be implemented by controller 508. In this implementation, system 400 may detect that storage system 502 receives request 504 by receiving request 504 with an application executed by controller 508.

Additionally or alternatively, system 400 may be at least partially implemented by one or more computing devices or systems separate from and in communication with storage system 502.

Figure 6:
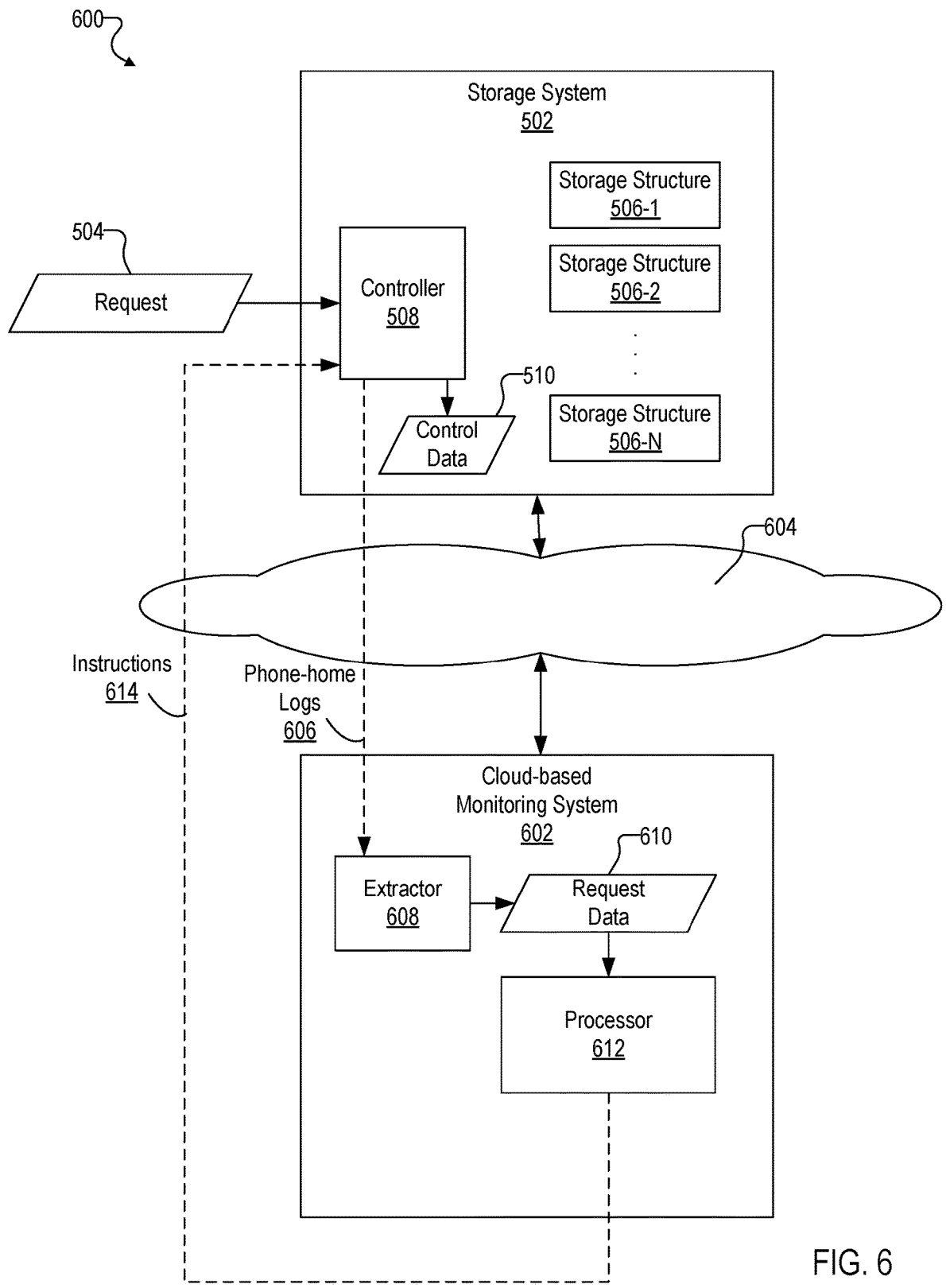
FIG. 6 shows an exemplary configuration in which a cloud-based monitoring system is communicatively coupled to storage system by way of a network in accordance with some embodiments of the present disclosure.

To illustrate, FIG. 6 shows an exemplary configuration 600 in which a cloud-based monitoring system 602 is communicatively coupled to storage system 502 by way of a network 604. Cloud-based monitoring system 602 may at least partially implement system 400.

Network 604 may include the Internet, a wide area network, a local area network, a provider-specific wired or wireless network (e.g., a cable or satellite carrier network or a mobile telephone network), a content delivery network, and/or any other suitable network. Data may flow between storage system 502 and cloud-based monitoring system 604 using any communication technologies, devices, media, and protocols as may serve a particular implementation.

Cloud-based monitoring system 602 may be implemented by one or more server-side computing devices configured to communicate with storage system 502 by way of network 604. For example, cloud-based monitoring system 602 may be implemented by one or more servers or other physical computing devices.

Cloud-based monitoring system 602 may be configured to perform one or more remote monitoring operations with respect to storage system 502. For example, cloud-based monitoring system 602 may be configured to remotely monitor for requests received by storage system 502 that are indicative of malicious actions. To this end, as shown, cloud-based monitoring system 602 may receive phone-home logs 606 from controller 508 of storage system 502 by way of network 604. Phone-home logs 606 may include various types of data that may be used by cloud-based monitoring system 602 to monitor various types of operations performed by storage system 502. In particular, phone-home logs 606 may include data representative of request 504.

As shown, cloud-based monitoring system 602 includes an extractor 608 configured to receive phone-home logs 606 and extract data representative of request 504 from phone-home logs 606. Extractor 608 may be implemented by any suitable combination of hardware and software as may serve a particular implementation.

As shown, extractor 608 may produce request data 610 representative of request 504. Request data 610 is processed by a processor 612 of cloud-based monitoring system 602, which may be configured to determine that request 504 is legitimate or indicative of a malicious action in any of the ways described herein.

Processor 612 may transmit instructions 614 back to controller 508 by way of network 604. Instructions 614 are configured to direct controller 508 how to handle request 504. For example, if processor 612 determines that request 504 is indicative of a malicious action, instructions 614 may be configured to direct controller 508 to abstain from performing the requested operation and/or otherwise preventing a target storage structure 506 from being adversely affected.

Once system 400 has detected that storage system 502 has received request 504, system 400 may identify one or more attributes of request 504 and/or storage system 502. Based on the identified one or more attributes, system 400 may determine whether request 504 is indicative of a malicious action. Various examples of system 400 identifying an attribute of request 504 and/or storage system 502 and determining, based on the attribute, that request 504 is indicative of a malicious action will now be described. Each of the identifying and determination operations described herein may be performed in isolation and/or in combination with one or more of the other identifying and determination operations described herein.

In some examples, system 400 may identify the attribute by determining that request 504 is included in a plurality of requests of a similar type (e.g., all eradication requests, all write requests, etc.) received by storage system 502 during a time period. In these examples, system 400 may determine that request 504 is indicative of a malicious action by determining that the plurality of requests received by storage system 502 during the time period exceeds a threshold.

The threshold may be determined, set, and/or modified in any suitable manner. For example, the threshold may be set by an administrator of storage system 502 by providing user input to system 400 representative of the threshold. In other examples, the threshold may be automatically determined by system 400 based on one or more characteristics of storage system 502. For example, the threshold may be set to be a percentage of a total number of storage structures 506 within storage system 502. Likewise, the time period during which the total number of requests is counted and compared to the threshold may be determined (e.g., set) in any suitable manner. For example, an exemplary time period may be a few minutes.

By way of example, the threshold number of requests may be set to N, where N is an integer greater than zero. During a predetermined time period, system 400 may detect that storage system 502 receives N+1 requests, all of which are eradication requests. In response, system 400 may determine that at least the N+1th request is indicative of a malicious action (and, in some examples, that all of the N+1 requests received during the predetermined time period are indicative of malicious actions). In response, system 400 may perform any of the remedial actions described herein. For example, system 400 may provide a notification to a user associated with storage system 502 (e.g., by transmitting a message to an administrator and/or provider of storage system 502), delay an eradication of the target storage structure(s) 506 for a predetermined amount of time to allow an administrator to determine whether the requests are valid, and/or perform any other suitable action as may serve a particular implementation.

Additionally or alternatively, system 400 may identify the attribute by determining that request 504 is included in a plurality of requests received by storage system 502 during a time period, the requests being for a plurality of storage structures 506 within storage system 502. In these examples, system 400 may determine that request 504 is indicative of a malicious action by determining that the number of storage structures 506 compared to a total number of storage structures 506 within the storage system exceeds a predetermined ratio. The predetermined ratio and time period in this example may be determined (e.g., set) in any suitable manner.

To illustrate, system 400 may determine that storage system 502 receives requests for M storage structures 506 during a predetermined time period, where M is an integer greater than zero. System 400 may also determine that there are a total of N storage structures 506 within storage system 502 at some point during the predetermined time period. If a ratio of M to N is greater than a predetermined ratio, system 400 may determine that at least some of the requests are indicative of malicious actions. In response, system 400 may perform any of the remedial actions described herein.

Additionally or alternatively, system 400 may identify the attribute by determining a source of request 504. In these examples, system 400 may determine that request 504 is indicative of a malicious action by determining that the source is a malicious source.

System 400 may determine the source of request 504 in any suitable manner. For example, system 400 may identify an IP address, login credentials, and/or any other characteristic associated with request 504.

System 400 may determine that the source is a malicious source in any suitable manner. For example, system 400 may determine that the IP address used to provide request 504 is in an abnormal and/or otherwise blacklisted geographic location (e.g., in a different country). As another example, system 400 may determine that the request 504 originates from a user using login credentials that are not typically used to perform a particular type of request and/or that are not used at a particular time of day that the request 504 is made. In response to any of these types of determinations, system 400 may perform any of the remedial actions described herein.

Additionally or alternatively, system 400 may identify the attribute by determining that the request includes a write request (e.g., a request to write data to a particular storage structure 506). In these examples, system 400 may determine that request 504 is indicative of a malicious action by determining that the write request includes an attempt to overwrite compressible data in the storage structure 506 with incompressible data.

To illustrate, request 504 may be configured to modify storage structure 506 by replacing good data, which is typically compressible, within storage structure 506 with bad data, which is typically incompressible. Hence, by determining that request 504 includes instructions to replace some or all of compressible data in a storage structure 506 with incompressible data, system 400 may determine that request 504 is indicative of a malicious action. In response, system 400 may perform any of the remedial actions described herein.

Additionally or alternatively, system 400 may identify the attribute by determining that storage system 502 receives a request to change an operation time delay associated with storage structures 506 within storage system 502. In these examples, system 400 may determine that request 504 is indicative of a malicious action by determining that the request to change the operation time delay is received by storage system 502 within a predetermined amount of time of request 504. The predetermined amount of time may be determined (e.g., set) in any suitable manner. As used herein, an operation time delay refers to an amount of time that the storage system is configured to wait until actually performing a requested operation.

To illustrate, storage system 502 may maintain data representative of an operation time delay that determines when a storage structure 506 is to be operated upon after receiving a corresponding request. For example, the operation time delay may be set to be 24 hours or any other suitable amount of time. This means that in response to receiving a request for a particular storage structure 506, storage system 502 is configured to wait 24 hours before actually performing the requested operation. In some examples, the operation time delay may be different for different days. For example, the operation time delay may be set to be 24 hours for days (e.g., Sunday through Thursday) that are followed by a workday (e.g., Monday through Friday). However, the operation time delay may be set to be 48 or 72 hours for days (e.g., Friday and Saturday) that are followed by a non-workday (e.g., Saturday and Sunday).

In some instances, storage system 502 may immediately indicate, in response to receiving the request and to the source of the request, that the operation has been performed, but not actually perform the operation until completion of the operation time delay.

The operation time delay may be configured to allow an administrator or other user to determine whether a particular requested operation should actually be performed. Hence, a malicious entity may attempt to change the operation time delay by setting the operation time delay to be zero or any other relatively low amount of time. In this manner, the malicious entity may attempt to prevent the administrator or other user from having time to review and/or otherwise prevent a request from being carried out.

Accordingly, by determining that a request to change the operation time delay is received by storage system 502 within a predetermined amount of time of request 504 (e.g., within a few minutes prior to request 504 being received by storage system 502), system 400 may determine that the request 504 is indicative of a malicious action. In response, system 400 may perform any of the remedial actions described herein.

In some examples, different storage structures 506 within storage system 502 may have different operation time delays associated therewith. For example, storage structure 506-1 may have an associated operation time delay of 24 hours while storage structure 506-2 may have an associated operation time delay of 48 hours. In some examples, an operation time delay may be associated with (i.e., fixed to) a storage structure 506 at a time that the storage structure 506 is created. For example, if a system-wide operation time delay setting specifies an operation time delay of 24 hours when storage structure 506 is created, this operation time delay of 24 hours may be associated with the storage structure 506 regardless of future changes to the operation time delay setting. In these cases, even if a malicious entity changes the operation time delay setting to be less time (e.g., zero minutes), the operation time delay for the storage structure 506 may not be changed. A particular operation time delay may be associated with a storage structure 506 in any other suitable manner.

Additionally or alternatively, system 400 may identify the attribute by detecting an abnormal pattern of interaction with storage system 502 during a time period. In these examples, system 400 may determine that request 504 is indicative of a malicious action by determining that the request is received by the storage system during the time period. The time period may be determined (e.g., set) in any suitable manner.

System 400 may detect an abnormal pattern of interaction with storage system 502 in any suitable manner. For example, system 400 may detect abnormal pattern of interaction with storage system 502 by determining that operations performed with respect to storage system 502 during the time period differ by more than a threshold amount from historical operations performed with respect to storage system 502. Such a determination may be made in any suitable manner, such as by comparing metrics associated with the operations to thresholds, using machine learning heuristics, etc.

To illustrate, system 400 may detect a sudden increase in incompressible and/or non-deduplicable data writes to storage structures 506 within storage system 502 within a relatively short amount of time. This sudden increase may differ from historical averages for such types of data writes by more than a threshold amount. In response, system 400 may perform any of the remedial actions described herein.

Additionally or alternatively, system 400 may identify the attribute by determining an age of other storage structures 506 within storage system 502 (i.e., storage structures 506 other than a particular storage structure 506 that is the target of the request 504). In these examples, system 400 may determine that request 504 is indicative of a malicious action by determining that the age is older than a predetermined age.

To illustrate, system 400 may determine that the request 504 is with respect to a target snapshot that is relatively young (e.g., recently created), while all other snapshots of the same data are relatively old (e.g., created a relatively long time before the target snapshot). In this case, performance of an operation that affects a capacity of the target snapshot may result in at least some data being unrecoverable. Accordingly, system 400 may determine that the request 504 is indicative of a malicious action and perform any of the remedial actions described herein.

Additionally or alternatively, system 400 may identify the attribute by determining an amount of undisturbed capacity of storage system 502, where the undisturbed capacity is not affected by a plurality of requests that includes the request 504. In these examples, system 400 may determine that request 504 is indicative of a malicious action by determining that the undisturbed capacity is less than a threshold. The threshold may be determined (e.g., set) in any suitable manner.

To illustrate, system 400 may determine that a plurality of requests 504 affects a relatively large number of storage structures 506 compared to a remaining capacity of storage system 502. This may be indicative of an attempt by the malicious entity to overwhelm storage system 502 and/or force storage system 506 to begin, for example, actually modifying (e.g., eradicating) storage structures (instead of waiting for an operation time delay to being modifying the storage structures). Accordingly, system 400 may determine that the request 504 is indicative of a malicious action and perform any of the remedial actions described herein.

Additionally or alternatively, system 400 may identify the attribute by determining that the target storage structure 506 is flagged as being a ransomware recovery structure. In these examples, system 400 may determine that request 504 is indicative of a malicious action by determining that the request 504 is for a particular storage structure 506 that is flagged as being the ransomware recovery structure.

To illustrate, storage system 502 may be configured to periodically (e.g., once a day, once a week, or at any other suitable time interval) create ransomware recovery structures (e.g., ransomware recovery snapshots). These ransomware recovery structures may have one or more attributes that indicate to a legitimate user that such storage structures should not be deleted, eradicated, or modified. Accordingly, if system 400 detects an attempt to delete, eradicate, or modify such a storage structure, system 400 may use the one or more attributes to determine that the attempt is malicious.

In some examples, storage system 502 may require a certain sequence of operations to be performed to delete, eradicate, or modify a storage structure flagged as being a ransomware recovery structure. For example, storage system 502 may require data from multiple sources for the storage structure to be deleted, eradicated, or modified. Such data may include, but is not limited to, one or more decryption keys from the multiple sources. Accordingly, if system 400 detects a request for such a storage structure that does not include the required data from multiple sources, system 400 may determine that the request is indicative of a malicious action. In response, system 400 may perform any of the remedial actions described herein.

In some examples, a storage structure designated as being a ransomware recovery structure may be read only such that an attempt to delete, eradicate, or otherwise modify the storage structure may not be possible. One or more read-only ransomware recovery structures may be created together with one or more associated metadata catalogs and then used to recover data directly.

Various remedial actions that may be performed by system 400 in response to determining that a request is indicative of a malicious action will now be described. System 400 may perform one or more of the remedial actions described herein in any suitable combination.

In some examples, system 400 may perform the remedial action by providing a notification indicating that the request is indicative of the malicious action. The notification may be in any suitable format. For example, the notification may include a message (e.g., a text message and/or an email), a notification within a user interface used by a user (e.g., an administrator) to manage storage system 502, a phone call, and/or any other suitable type of notification as may serve a particular implementation.

Additionally or alternatively, system 400 may perform the remedial action by directing storage system 502 to abstain from actually performing the requested operation for a predetermined time subsequent to storage system 502 receiving the request. As described herein, this predetermined time may be specified by an operation time delay setting and/or any other suitable type of setting as may serve a particular implementation.

In some examples, for security reasons, system 400 may encrypt data included in a target storage structure 506 that has been targeted for deletion, eradication, or modification but that is waiting to be deleted, eradicated, or modified until the completion of an operation time delay. Such encryption may ensure that sensitive data in the target storage structure 506 may not be readily accessed during the operation time delay. In some examples, the encrypted data may require a plurality of keys from different sources to be decrypted. Such sources may include, but are not limited to cloud-based monitoring system 602 and/or one or more other independent servers and/or systems as may serve a particular implementation.

Additionally or alternatively, system 400 may perform the remedial action by directing storage system 502 to abstain from actually performing the requested operation (e.g., eradicating a target storage structure 506) until a garbage collection process is ready to be performed with respect to storage structure 506. In this manner, the target storage structure 506 may be recoverable by a system administrator between the time of the request and when the garbage collection process is to be performed.

Additionally or alternatively, system 400 may perform the remedial action by blocking the request, throttling (e.g., slowing down) a performance of the requested operation in response to the request, and/or disabling the storage system 502 (e.g., by taking storage system 502 off-line).

Figure 7:
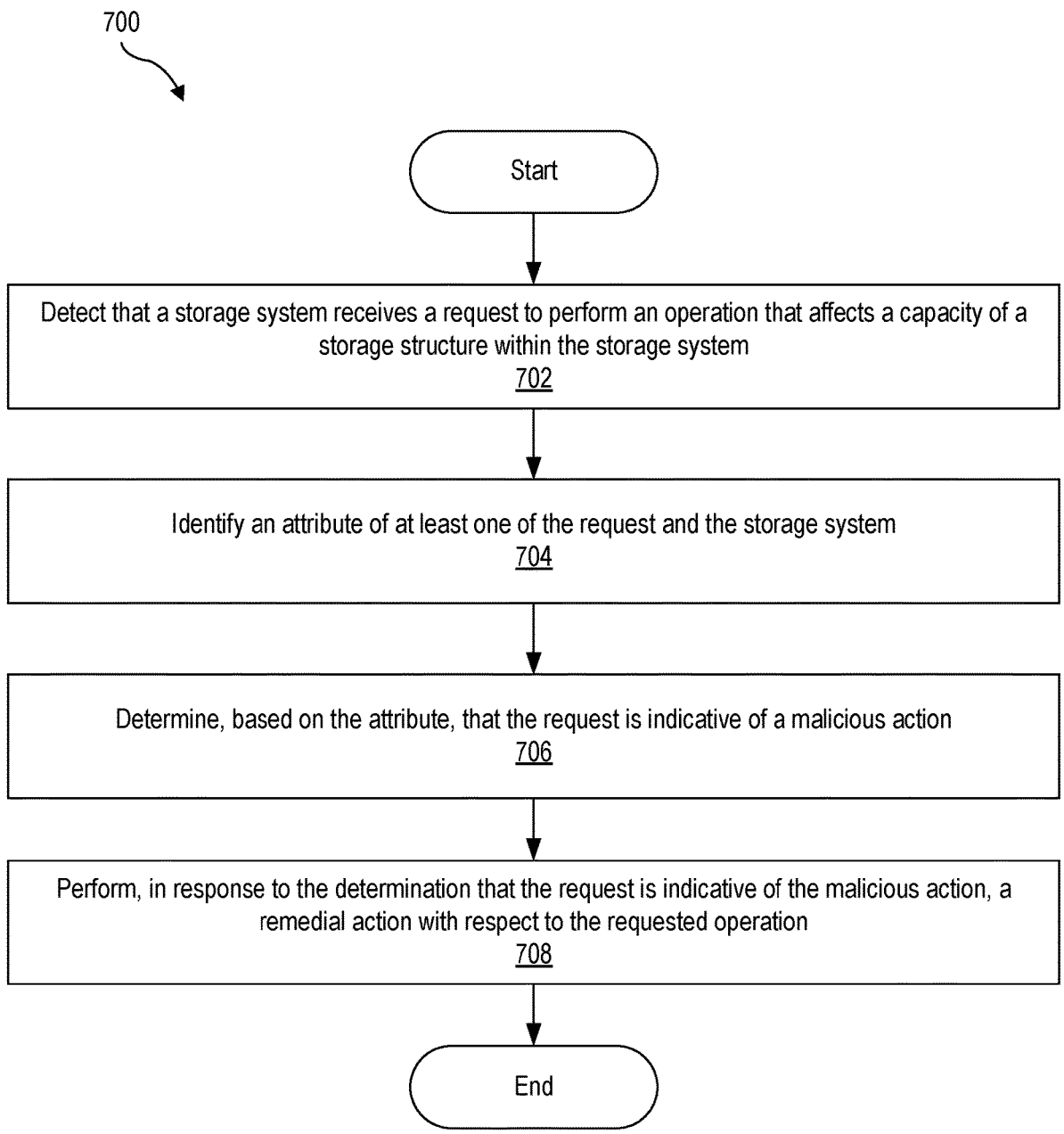
FIGS. 7-18 illustrate exemplary methods in accordance with some embodiments of the present disclosure.

FIG. 7 illustrates an exemplary method 700. While FIG. 7 illustrates exemplary operations according to one embodiment, other embodiments may omit, add to, reorder, and/or modify any of the operations shown in FIG. 7. One or more of the operations shown in FIG. 7 may be performed by system 400, any components included therein, and/or any implementation thereof.

In operation 702, a monitoring system detects that a storage system receives a request to perform an operation that affects a capacity of a storage structure within the storage system. Operation 702 may be performed in any of the ways described herein.

In operation 704, the monitoring system identifies an attribute of at least one of the request and the storage system. Operation 704 may be performed in any of the ways described herein.

In operation 706, the monitoring system determines, based on the attribute, that the request is indicative of a malicious action. Operation 706 may be performed in any of the ways described herein.

In operation 708, the monitoring system performs, in response to the determination that the request is indicative of the malicious action, a remedial action with respect to the requested operation. Operation 708 may be performed in any of the ways described herein.

Figure 8:
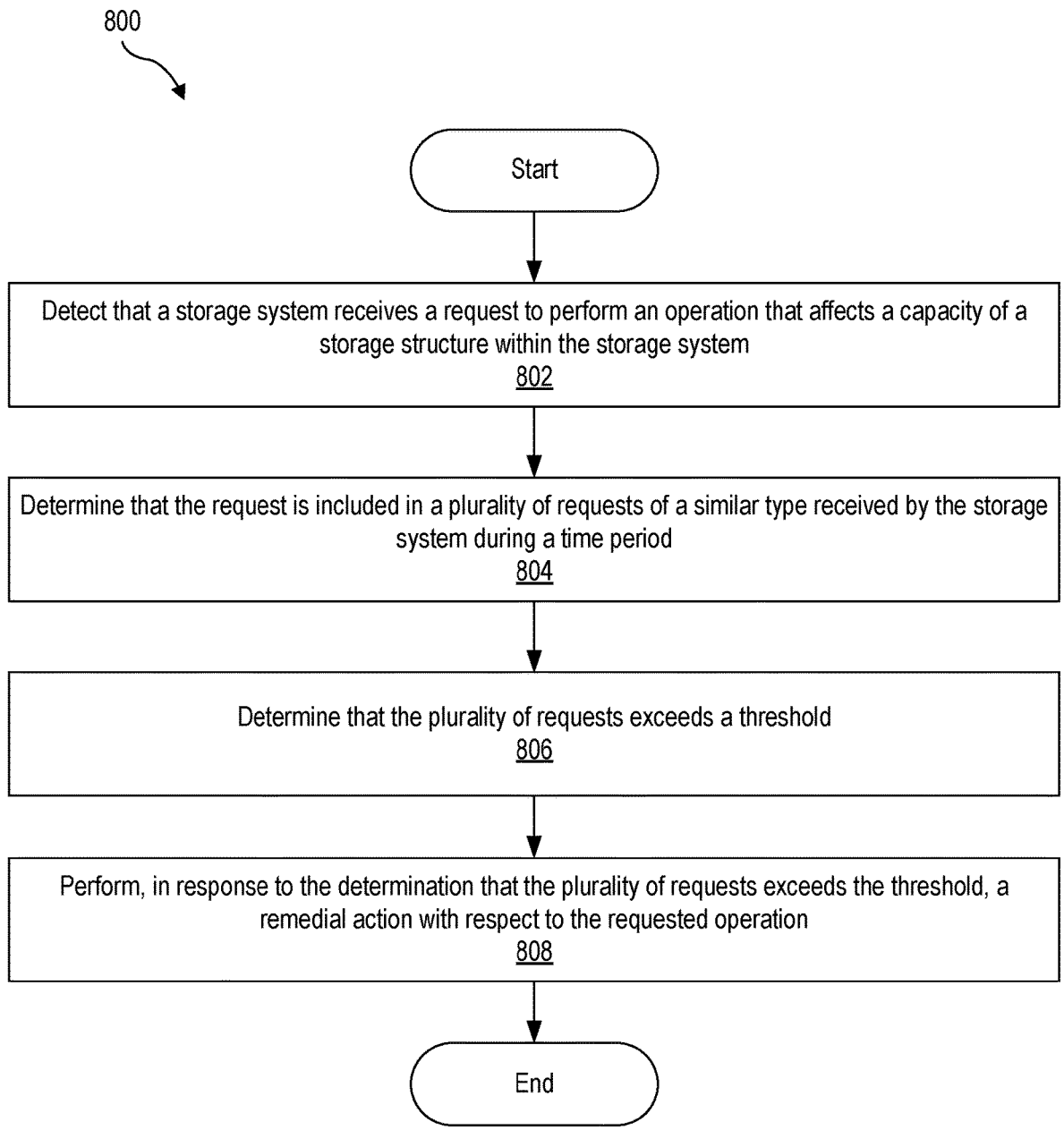

FIG. 8 illustrates a particular exemplary method 800 that includes operations that may be performed monitoring system 400, any components included therein, and/or any implementation thereof.

In operation 802, a monitoring system detects that a storage system receives a request to perform an operation that affects a capacity of a storage structure within the storage system. Operation 802 may be performed in any of the ways described herein.

In operation 804, the monitoring system determines that the request is included in a plurality of requests of a similar type received by the storage system during a time period. Operation 804 may be performed in any of the ways described herein.

In operation 806, the monitoring system determines that the plurality of requests exceeds a threshold. Operation 806 may be performed in any of the ways described herein.

In operation 808, the monitoring system performs, in response to the determination that the plurality of requests exceeds the threshold, a remedial action with respect to the requested operation. Operation 808 may be performed in any of the ways described herein.

Figure 9:
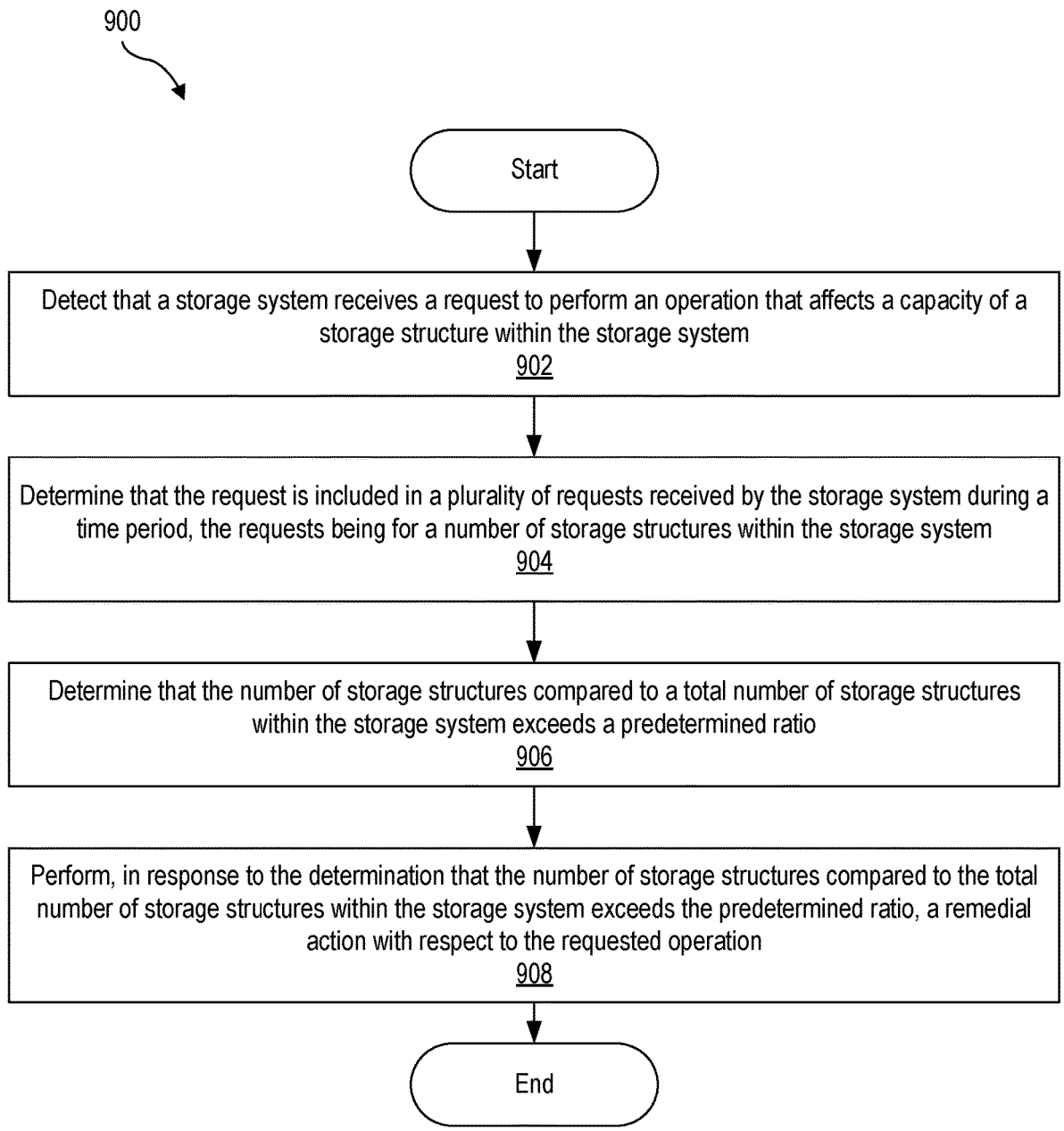

FIG. 9 illustrates another particular method 900 that includes operations that may be performed monitoring system 400, any components included therein, and/or any implementation thereof.

In operation 902, a monitoring system detects that a storage system receives a request to perform an operation that affects a capacity of a storage structure within the storage system. Operation 902 may be performed in any of the ways described herein.

In operation 904, the monitoring system determines that the request is included in a plurality of requests received by the storage system during a time period, the requests being for a number of storage structures within the storage system. Operation 904 may be performed in any of the ways described herein.

In operation 906, the monitoring system determines that the number of storage structures compared to a total number of storage structures within the storage system exceeds a predetermined ratio. Operation 906 may be performed in any of the ways described herein.

In operation 908, the monitoring system performs, in response to the determination that the number of storage structures compared to the total number of storage structures within the storage system exceeds the predetermined ratio, a remedial action with respect to the requested operation. Operation 908 may be performed in any of the ways described herein.

Figure 10:
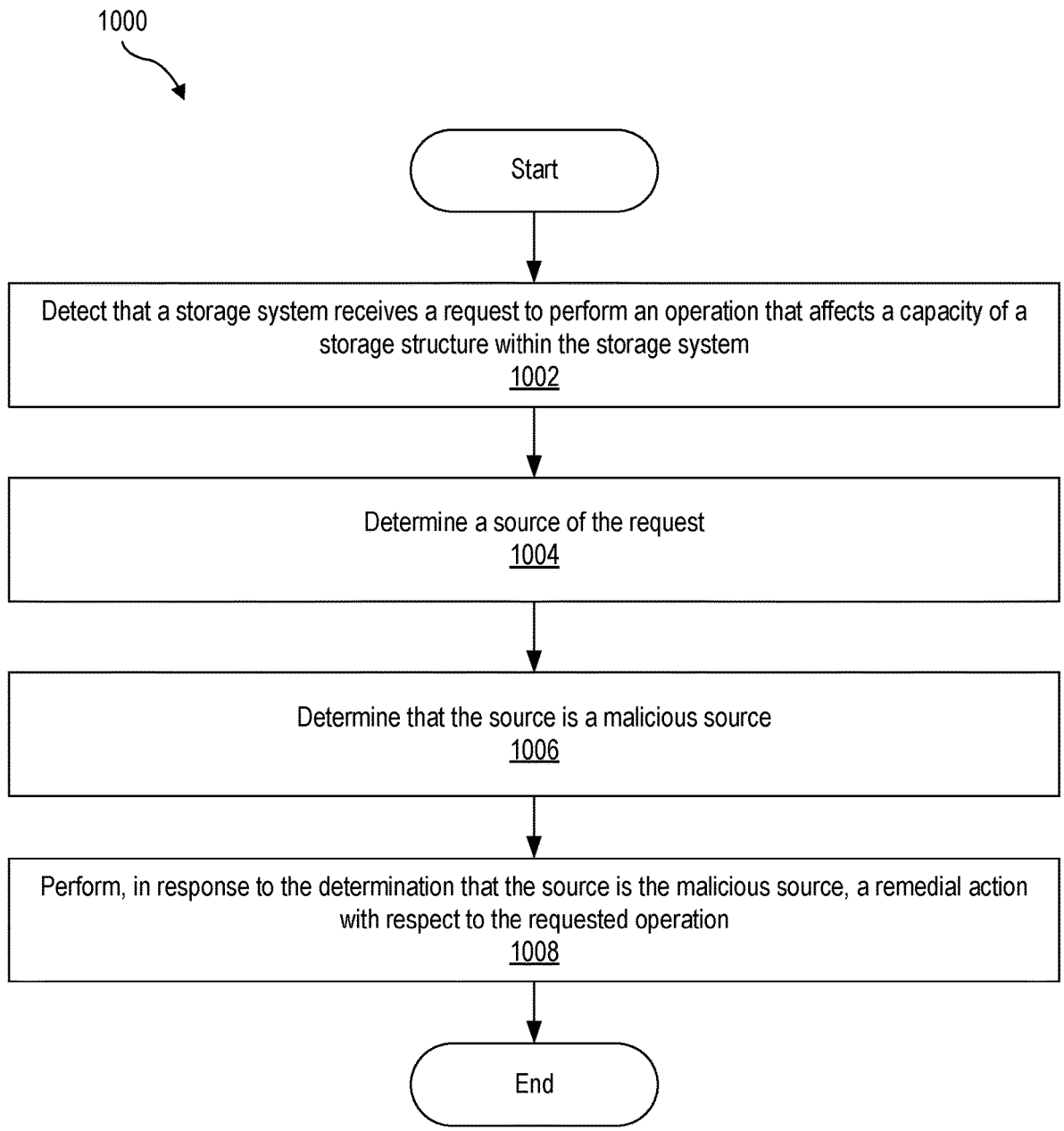

FIG. 10 illustrates another particular method 1000 that includes operations that may be performed monitoring system 400, any components included therein, and/or any implementation thereof.

In operation 1002, a monitoring system detects that a storage system receives a request to perform an operation that affects a capacity of a storage structure within the storage system. Operation 1002 may be performed in any of the ways described herein.

In operation 1004, the monitoring system determines a source of the request. Operation 1004 may be performed in any of the ways described herein.

In operation 1006, the monitoring system determines that the source is a malicious source. Operation 1006 may be performed in any of the ways described herein.

In operation 1008, the monitoring system performs, in response to the determination that the source is the malicious source, a remedial action with respect to the requested operation. Operation 1008 may be performed in any of the ways described herein.

Figure 11:
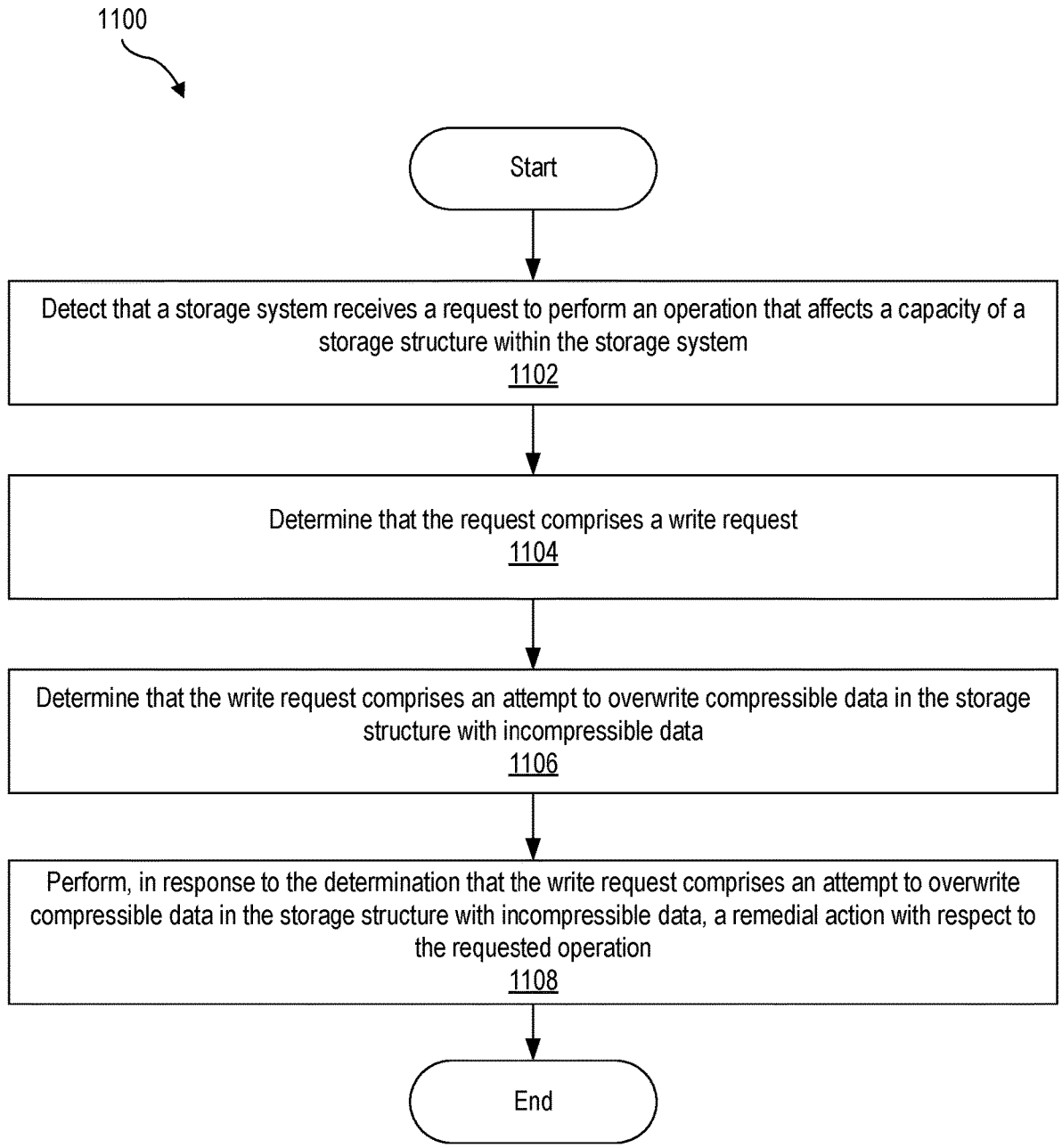

FIG. 11 illustrates another particular method 1100 that includes operations that may be performed monitoring system 400, any components included therein, and/or any implementation thereof.

In operation 1102, a monitoring system detects that a storage system receives a request to perform an operation that affects a capacity of a storage structure within the storage system. Operation 1102 may be performed in any of the ways described herein.

In operation 1104, the monitoring system determines that the request comprises a write request. Operation 1104 may be performed in any of the ways described herein.

In operation 1106, the monitoring system determines that the write request comprises an attempt to overwrite compressible data in the storage structure with incompressible data. Operation 1106 may be performed in any of the ways described herein.

In operation 1108, the monitoring system performs, in response to the determination that the write request comprises an attempt to overwrite compressible data in the storage structure with incompressible data, a remedial action with respect to the requested operation. Operation 1108 may be performed in any of the ways described herein.

Figure 12:
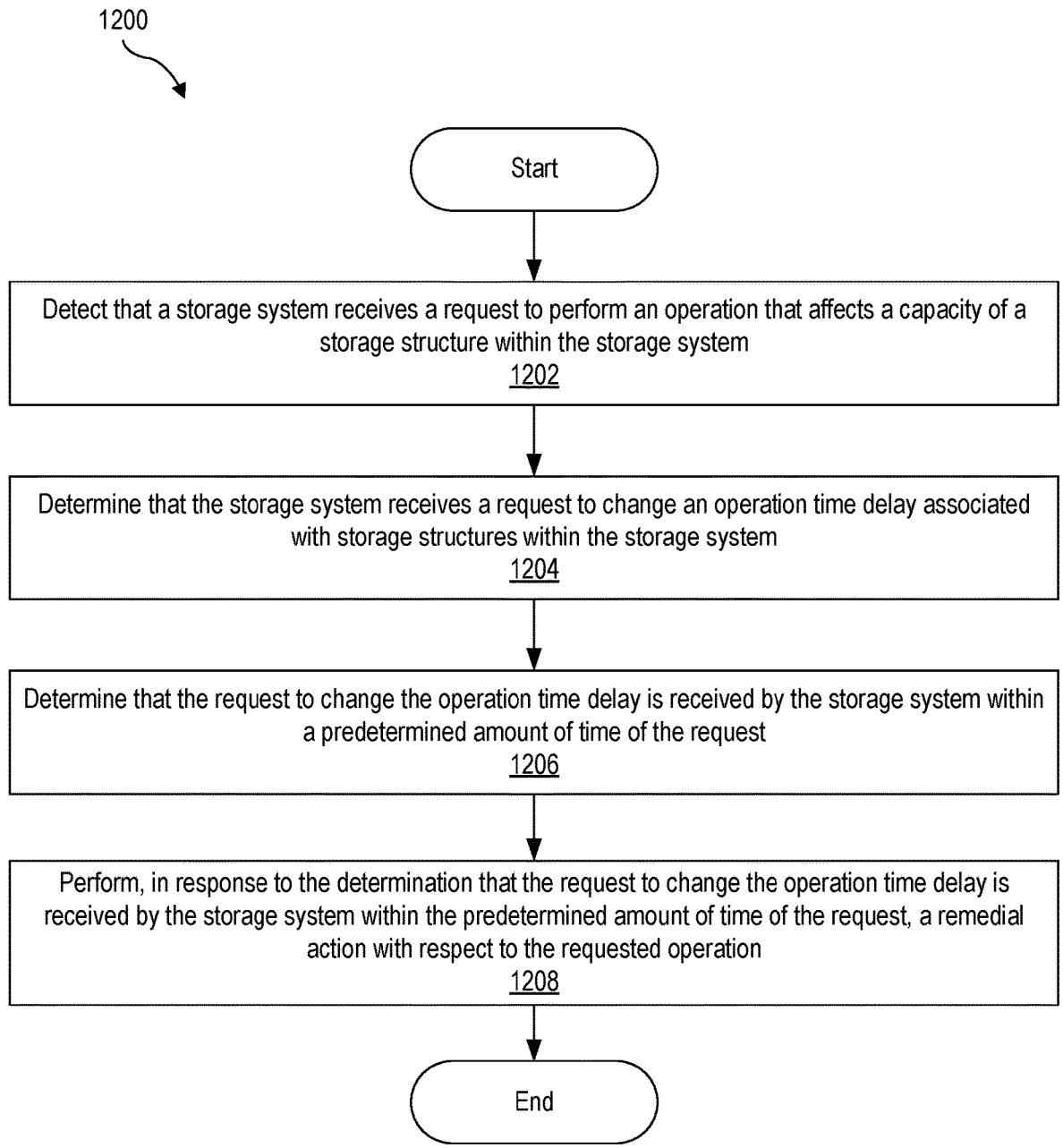

FIG. 12 illustrates another particular method 1200 that includes operations that may be performed monitoring system 400, any components included therein, and/or any implementation thereof.

In operation 1202, a monitoring system detects that a storage system receives a request to perform an operation that affects a capacity of a storage structure within the storage system. Operation 1202 may be performed in any of the ways described herein.

In operation 1204, the monitoring system determines that the storage system receives a request to change an operation time delay associated with storage structures within the storage system. Operation 1204 may be performed in any of the ways described herein.

In operation 1206, the monitoring system determines that the request to change the operation time delay is received by the storage system within a predetermined amount of time of the request. Operation 1206 may be performed in any of the ways described herein.

In operation 1208, the monitoring system performs, in response to the determination that the request to change the operation time delay is received by the storage system within the predetermined amount of time of the request, a remedial action with respect to the requested operation. Operation 1208 may be performed in any of the ways described herein.

Figure 13:
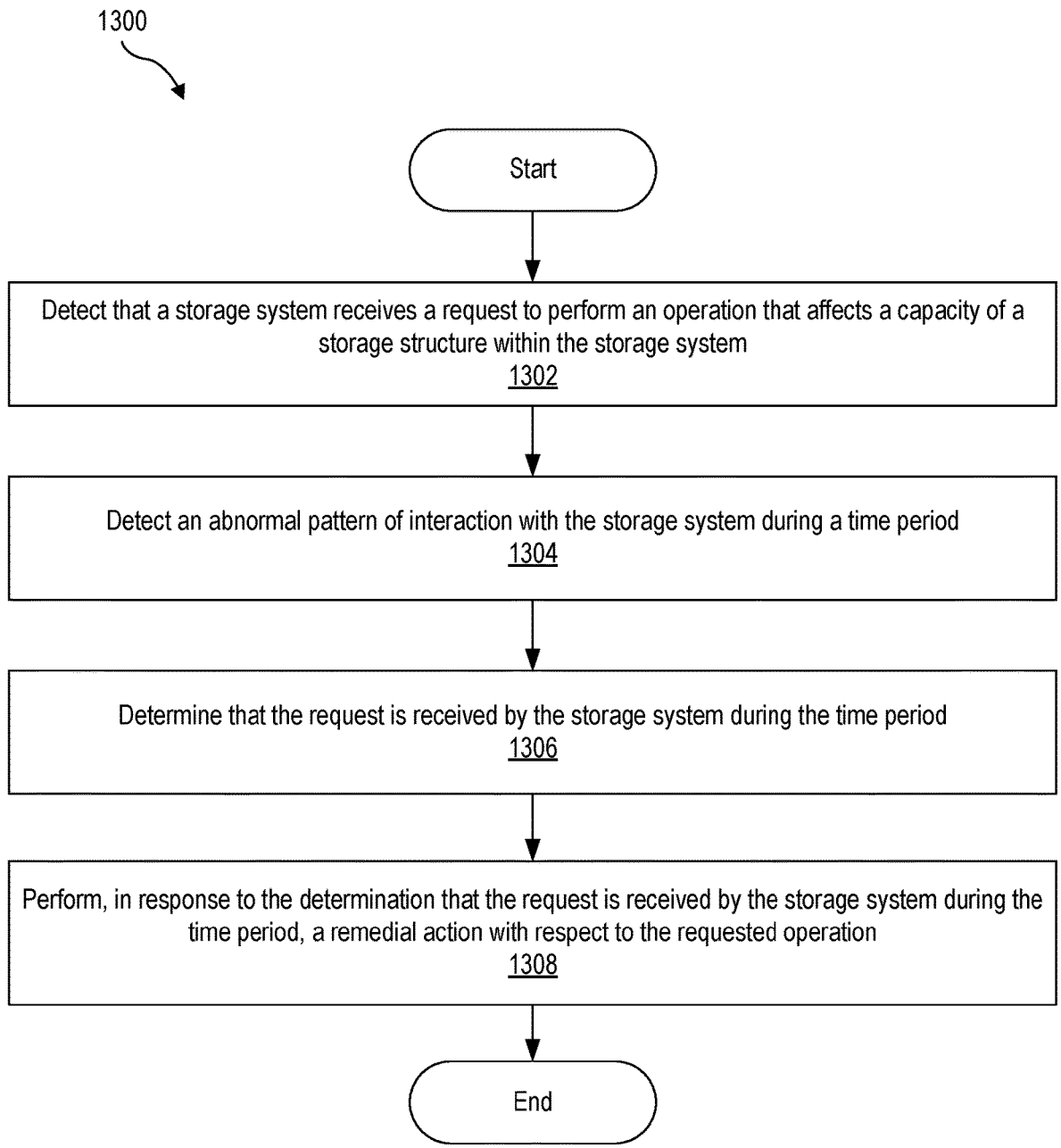

FIG. 13 illustrates another particular method 1300 that includes operations that may be performed monitoring system 400, any components included therein, and/or any implementation thereof.

In operation 1302, a monitoring system detects that a storage system receives a request to perform an operation that affects a capacity of a storage structure within the storage system. Operation 1302 may be performed in any of the ways described herein.

In operation 1304, the monitoring system detects an abnormal pattern of interaction with the storage system during a time period. Operation 1304 may be performed in any of the ways described herein.

In operation 1306, the monitoring system determines that the request is received by the storage system during the time period. Operation 1306 may be performed in any of the ways described herein.

In operation 1308, the monitoring system performs, in response to the determination that the request is received by the storage system during the time period, a remedial action with respect to the requested operation. Operation 1308 may be performed in any of the ways described herein.

Figure 14:
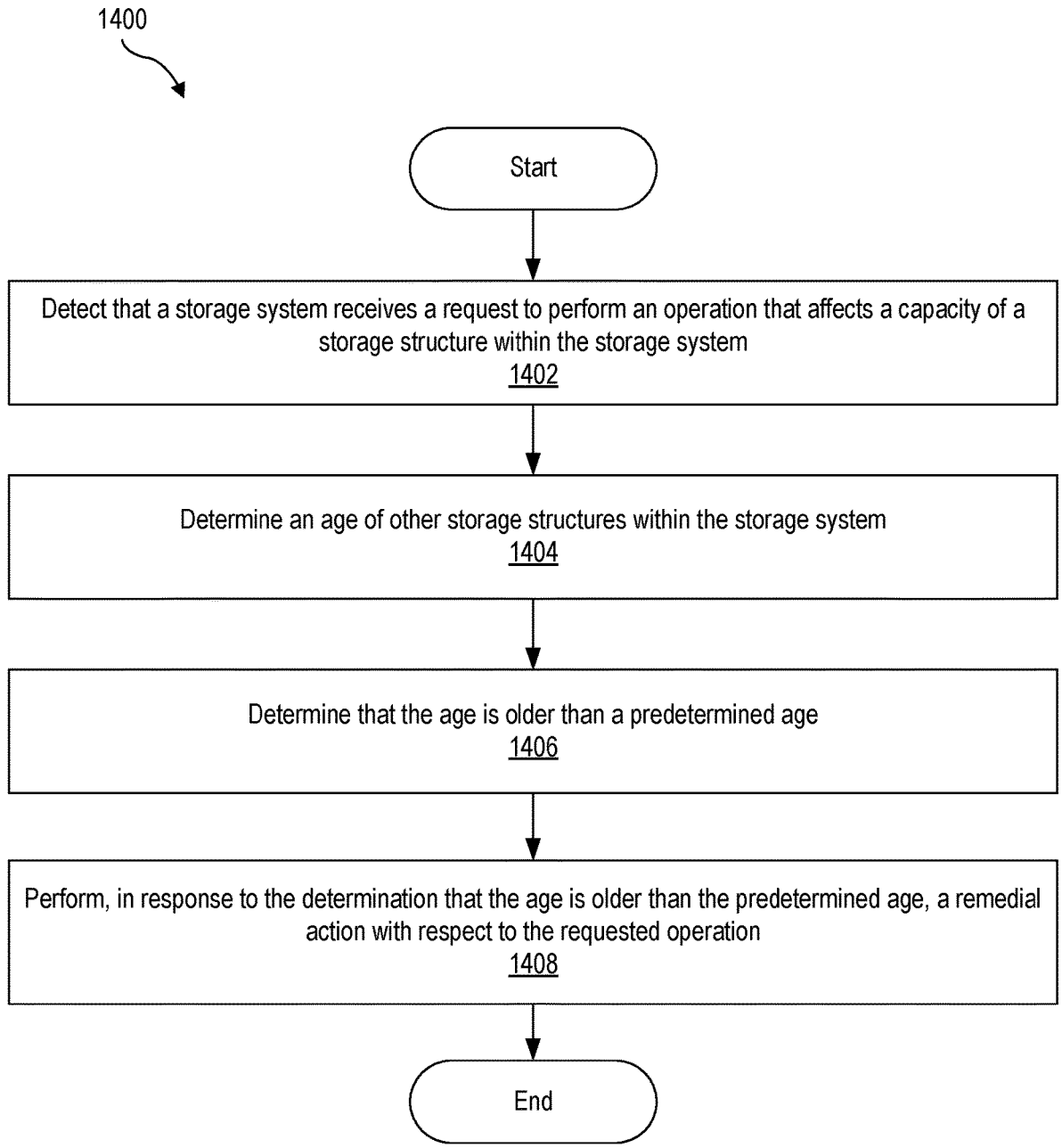

FIG. 14 illustrates another particular method 1400 that includes operations that may be performed monitoring system 400, any components included therein, and/or any implementation thereof.

In operation 1402, a monitoring system detects that a storage system receives a request to perform an operation that affects a capacity of a storage structure within the storage system. Operation 1402 may be performed in any of the ways described herein.

In operation 1404, the monitoring system determines an age of other storage structures within the storage system. Operation 1404 may be performed in any of the ways described herein.

In operation 1406, the monitoring system determines that the age is older than a predetermined age. Operation 1406 may be performed in any of the ways described herein.

In operation 1408, the monitoring system performs, in response to the determination that the age is older than the predetermined age, a remedial action with respect to the requested operation. Operation 1408 may be performed in any of the ways described herein.

Figure 15:
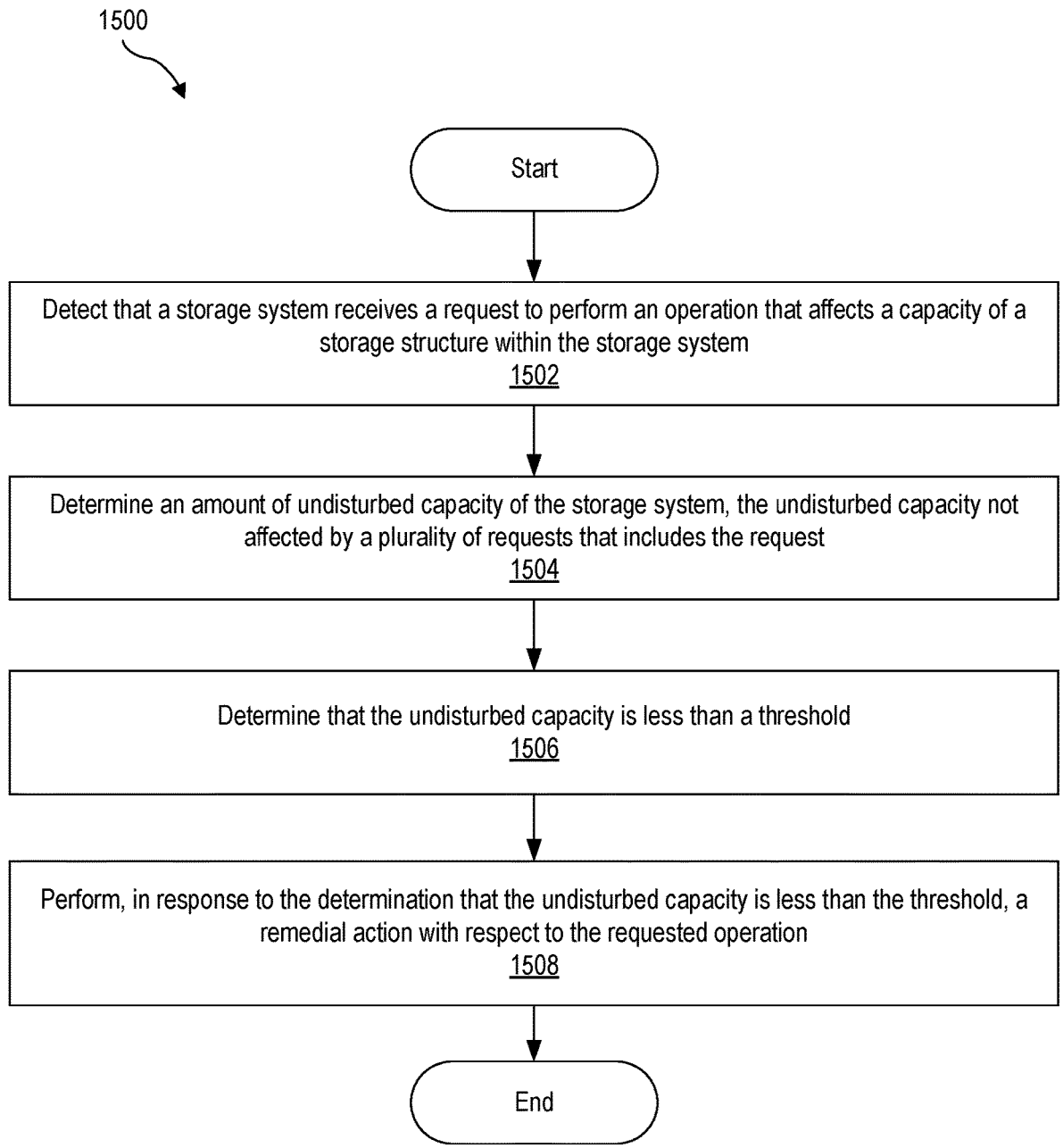

FIG. 15 illustrates another particular method 1500 that includes operations that may be performed monitoring system 400, any components included therein, and/or any implementation thereof.

In operation 1502, a monitoring system detects that a storage system receives a request to perform an operation that affects a capacity of a storage structure within the storage system. Operation 1502 may be performed in any of the ways described herein.

In operation 1504, the monitoring system determines an amount of undisturbed capacity of the storage system, the undisturbed capacity not affected by a plurality of requests that includes the request. Operation 1504 may be performed in any of the ways described herein.

In operation 1506, the monitoring system determines that the undisturbed capacity is less than a threshold. Operation 1506 may be performed in any of the ways described herein.

In operation 1508, the monitoring system performs, in response to the determination that the undisturbed capacity is less than the threshold, a remedial action with respect to the requested operation. Operation 1508 may be performed in any of the ways described herein.

Figure 16:
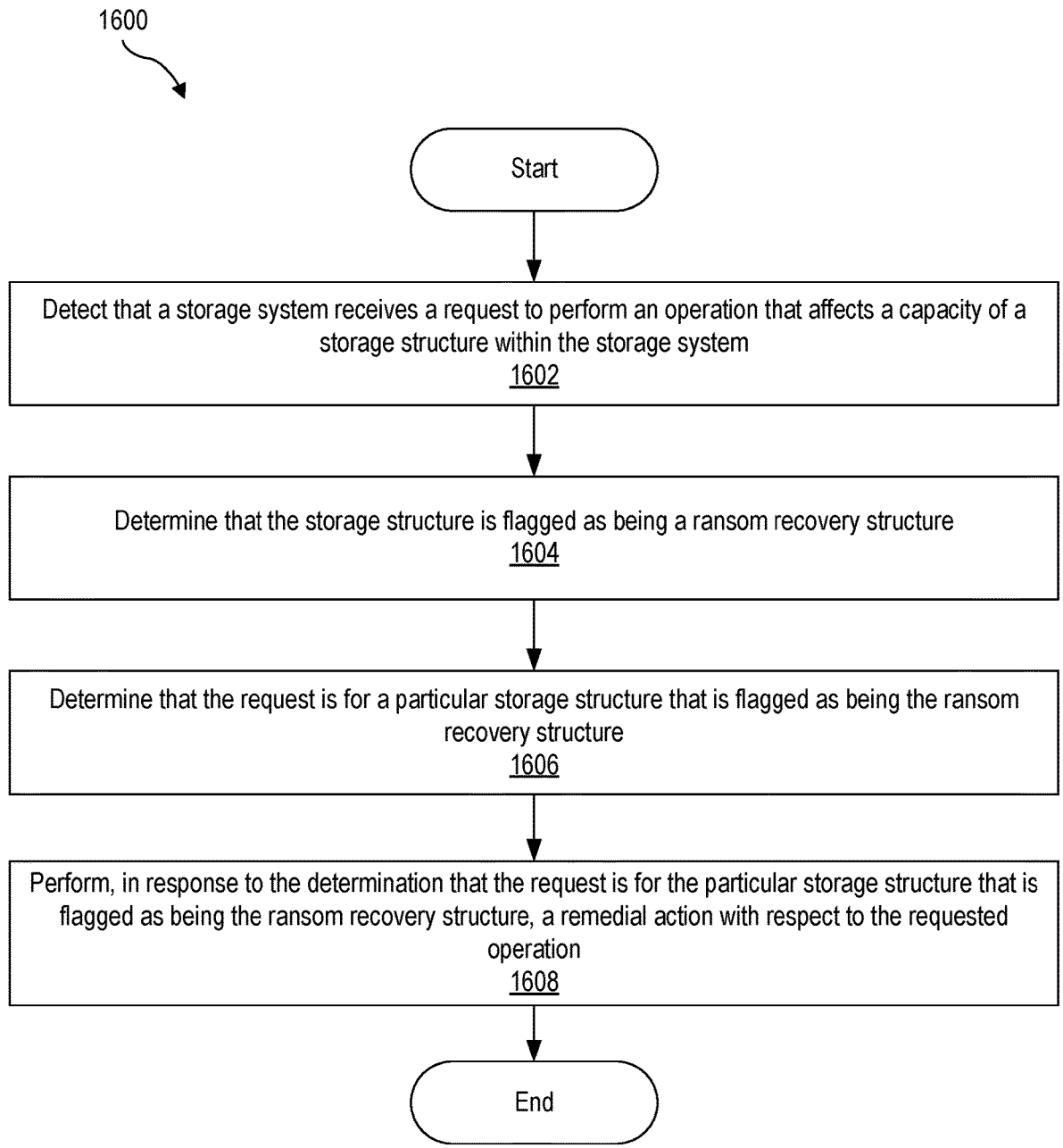

FIG. 16 illustrates another particular method 1600 that includes operations that may be performed monitoring system 400, any components included therein, and/or any implementation thereof.

In operation 1602, a monitoring system detects that a storage system receives a request to perform an operation that affects a capacity of a storage structure within the storage system. Operation 1602 may be performed in any of the ways described herein.

In operation 1604, the monitoring system determines that the storage structure is flagged as being a ransomware recovery structure. Operation 1604 may be performed in any of the ways described herein.

In operation 1606, the monitoring system determines that the request is for a particular storage structure that is flagged as being the ransomware recovery structure. Operation 1606 may be performed in any of the ways described herein.

In operation 1608, the monitoring system performs, in response to the determination that the request is for the particular storage structure that is flagged as being the ransomware recovery structure, a remedial action with respect to the requested operation. Operation 1608 may be performed in any of the ways described herein.

Figure 17:
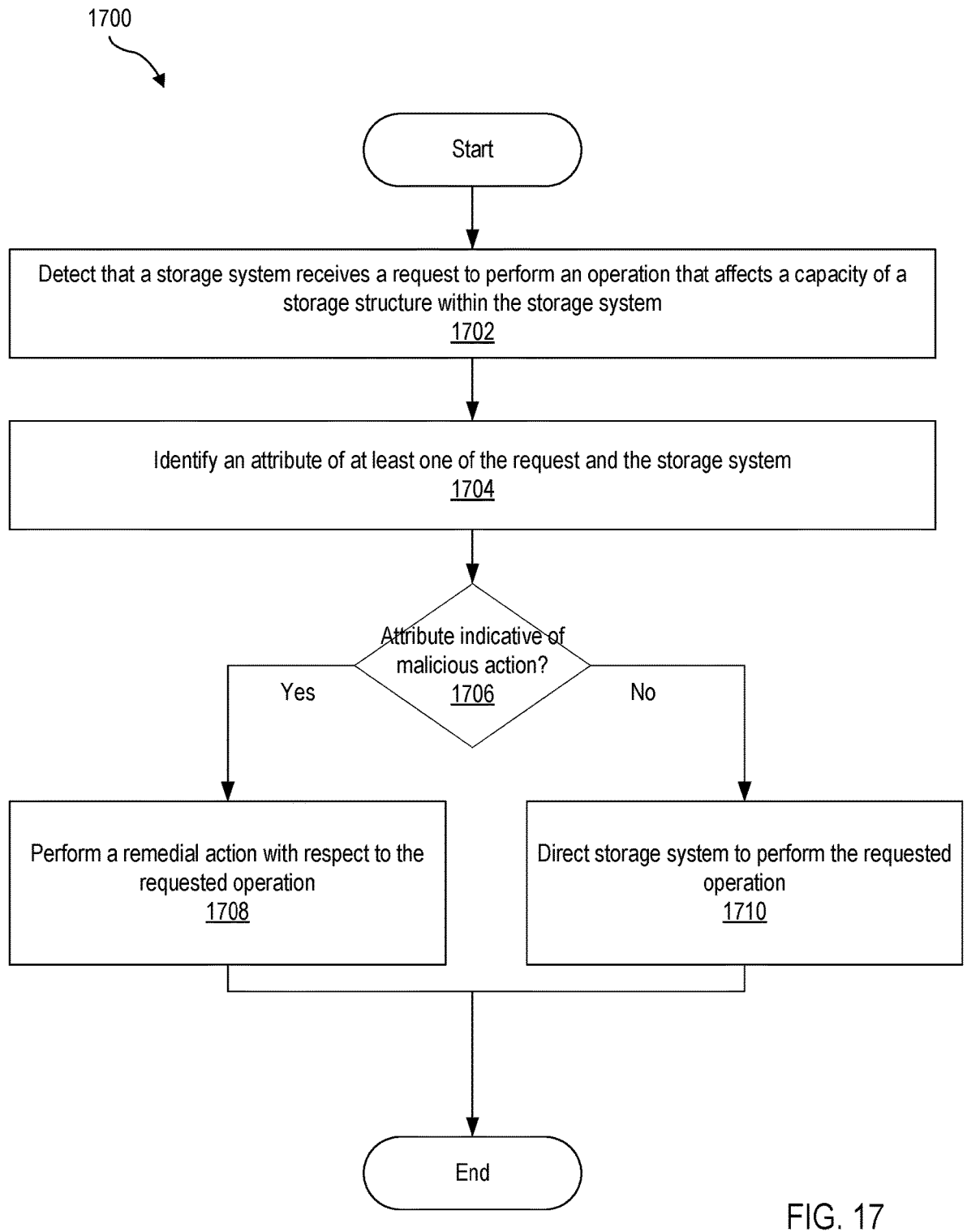

FIG. 17 illustrates another particular method 1700 that includes operations that may be performed monitoring system 400, any components included therein, and/or any implementation thereof.

In operation 1702, a monitoring system detects that a storage system receives a request to perform an operation that affects a capacity of a storage structure within the storage system. Operation 1702 may be performed in any of the ways described herein.

In operation 1704, the monitoring system identifies an attribute of at least one of the request and the storage system. Operation 1704 may be performed in any of the ways described herein.

In decision 1706, the monitoring system determines whether the attribute is indicative of a malicious action. Decision 1706 may be performed in any of the ways described herein.

If decision 1706 is "yes", the monitoring system performs a remedial action with respect to the requested operation (operation 1708). Operation 1708 may be performed in any of the ways described herein.

If decision 1706 is "no", the monitoring system directs the storage system perform the requested operation (operation 1710).

Figure 18:
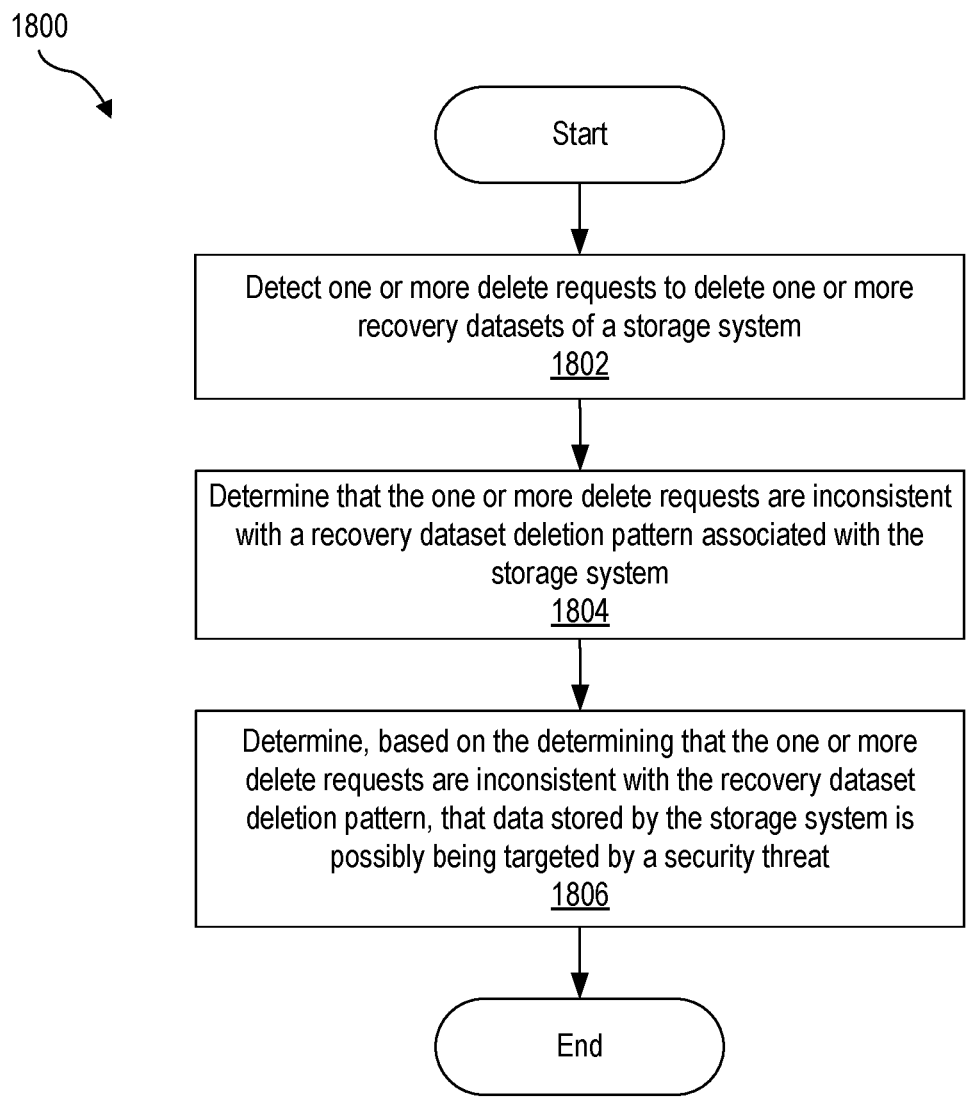

FIG. 18 shows an exemplary recovery dataset deletion-based security threat detection method 1800 that may be performed by system 400 and/or any implementation thereof. In some embodiments, system 400 may perform one or more operations of method 1800 and/or instruct storage system 502 to perform one or more operations of method 1800. Method 1800 may be used alone or in combination with any of the other security threat detection methods described herein.

At operation 1802, system 400 may detect one or more delete requests to delete one or more recovery datasets of storage system 502. For example, storage system 502 may receive the one or more delete requests from the same source or from multiple sources and the one or more delete requests may request that one or more recovery datasets for data stored in storage system 502 be deleted.

In some embodiments, a recovery dataset may include a snapshot, a backup copy, a backup image, an ordered log of metadata describing an ordered application of updates to the data maintained by storage system 502, and/or other data structure that may be used to restore the data of storage system 502 to an uncorrupted state at a particular point in time such as a recovery point in time at which the recovery dataset is generated. In some embodiments, storage system 502 and/or system 400 may generate a recovery dataset for data stored in storage system 502 at a predefined backup interval. For example, storage system 502 and/or system 400 may generate a recovery dataset for the data stored in storage system 502 every 1 hour. Thus, for each hour, a recovery dataset representing a version of the data for that hour may be generated. The recovery dataset may be generated for all data stored by storage system 502, data stored on a particular storage structure (e.g., a volume, a directory) of storage system 502, data stored within storage system 502 that is associated with a particular host, and/or any other subset of data stored in storage system 502.

At operation 1804, system 400 may determine that the one or more delete requests to delete one or more recovery datasets of storage system 502 are inconsistent with a recovery dataset deletion pattern associated with storage system 502.

In some embodiments, the recovery dataset deletion pattern may indicate a pattern in which one or more recovery datasets among multiple recovery datasets of storage system 502 are deleted to reduce a number of recovery datasets maintained for storage system 502 without causing a security threat, data corruption, or other negative impact on storage system 502. Due to the deletions of one or more recovery datasets, storage system 502 may avoid storing a massive number of recovery datasets unnecessarily, thereby reducing the storage space occupied by the recovery datasets of storage system 502. In some embodiments, the deletions of one or more recovery datasets of storage system 502 to reduce the number of recovery datasets maintained for storage system 502 without causing a security threat, data corruption, or other negative impact on storage system 502 may be referred to as a prune operation. In some embodiments, the prune operation may be performed at a predefined pruning interval (e.g., every 24 hours) for storage system 502.

In some embodiments, the recovery dataset deletion pattern may be established and implemented on storage system 502 and system 400 may obtain the recovery dataset deletion pattern from storage system 502. Additionally or alternatively, system 400 may monitor various operations (e.g., creation operation, delete operation, copy operation, etc.) associated with one or more recovery datasets of storage system 502, and determine the recovery dataset deletion pattern based on the operations. In some embodiments, the recovery dataset deletion pattern may be associated with one or more past time windows (also referred to herein as time windows) that are prior to a current time. According to the recovery dataset deletion pattern, each time window may be associated with a threshold number of retained recovery datasets for the time window and/or a recovery point distance between two consecutive recovery datasets being retained for the time window. In some embodiments, there may be various recovery dataset deletion patterns in which the recovery datasets are deleted to perform prune operations for storage system 502.

In some embodiments, system 400 may determine that the one or more delete requests to delete one or more recovery datasets of storage system 502 are inconsistent with the recovery dataset deletion pattern as described herein. For example, the recovery dataset deletion pattern may specify a first threshold number of retained recovery datasets for a first time window and a second threshold number of retained recovery datasets for a second time window prior to the first time window. The first threshold number of retained recovery datasets corresponding to the first time window may be higher than the second threshold number of retained recovery datasets corresponding to the second time window. Thus, according to the recovery dataset deletion pattern, storage system 502 may retain a higher number of recovery datasets for the first time window than for the second time window because the first time window is more recent to the current time than the second time window.

However, in contrast to the recovery dataset deletion pattern, system 400 may determine that the one or more delete requests attempt to delete a first number of recovery datasets that are generated within the first time window and a second number of recovery datasets that are generated within a second time window, in which the first number of recovery datasets is higher than the second number of recovery datasets. Thus, instead of retaining a higher number of recovery datasets for the first time window that is more recent to the current time than the second time window, the one or more delete requests may attempt to delete a higher number of recovery datasets corresponding to the first time window as compared to the second time window. Therefore, system 400 may determine that the one or more delete requests are inconsistent with the recovery dataset deletion pattern associated with storage system 502. Other scenarios in which the one or more delete requests are inconsistent with the recovery dataset deletion pattern associated with storage system 502 are also possible and contemplated.

At operation 1806, based on the determining that the one or more delete requests are inconsistent with the recovery dataset deletion pattern, system 400 may determine that the data stored by storage system 502 is possibly being targeted by a security threat. This may be performed in any of the ways described herein.

In response to determining that the data stored by storage system 502 is possibly being targeted by a security threat, system 400 may perform a remedial action with respect to storage system 502. Additionally or alternatively, system 400 may instruct storage system 502 to perform the remedial action. The remedial action may include any of the remedial actions described herein.

As an example of performing a remedial action, system 400 may identify one or more recovery datasets being retained based on the recovery dataset deletion pattern, and instruct storage system 502 to convert at least one of these recovery datasets into a provisional protection recovery dataset that has an increased protection level as compared to the recovery datasets being retained for storage system 502. In some embodiments, the provisional protection recovery dataset may require additional authorization from one or more authenticated entities (e.g., authenticated administrator, third-party AI engine, etc.) to delete or modify as compared to regular recovery datasets (e.g., the one or more recovery datasets being retained for storage system 502 according to the recovery dataset deletion pattern). Other types of remedial action are also possible and contemplated.

Thus, system 400 may detect a potential security threat against the data stored by storage system 502 based on the inconsistency between the delete requests that attempt to delete one or more recovery datasets of storage system 502 and the recovery dataset deletion pattern to which the deletions of the recovery datasets are expected to conform to reduce the number of recovery datasets being stored for storage system 502 in an appropriate manner. In some embodiments, the recovery dataset deletion pattern may be associated with one or more past time windows that are prior to the current time. Each past time window (also referred to herein as time window) may be in the past and may extend from a start time to an end time in which the end time of the time window may match or precede the current time.

Figure 19A:
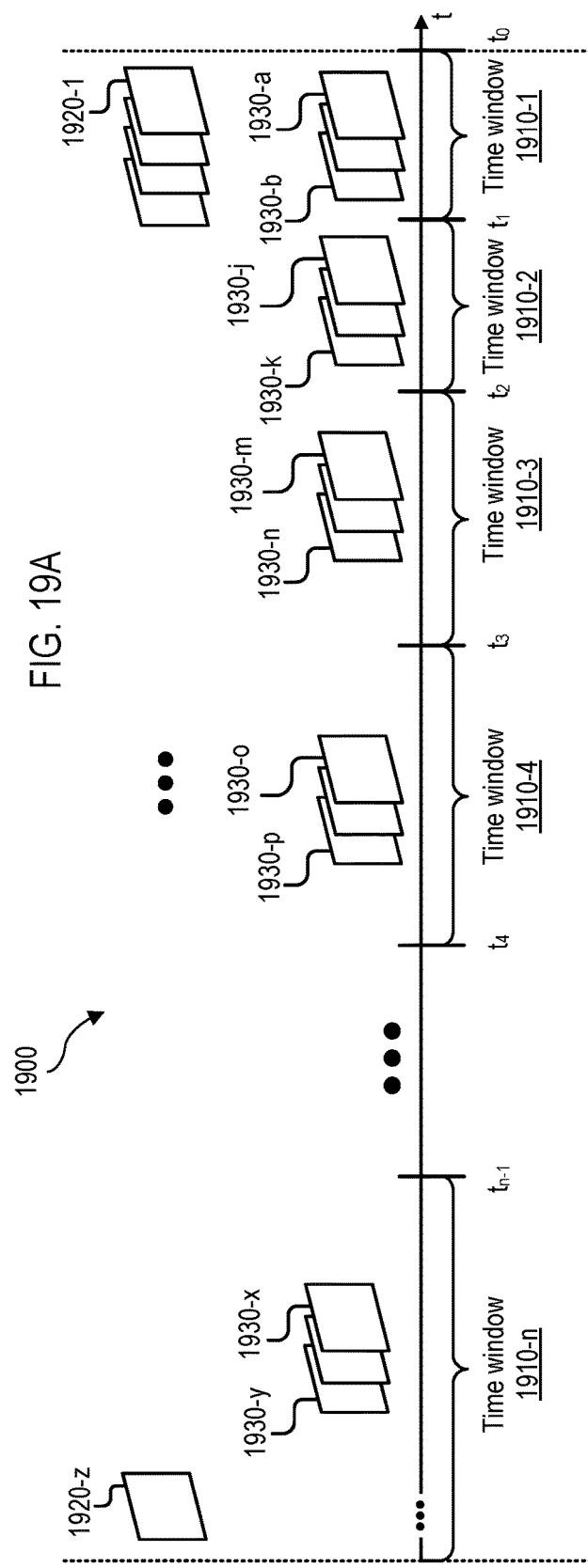
FIG. 19A shows an example diagram of a sequence of time windows in accordance with some embodiments of the present disclosure.
Figure 19B:
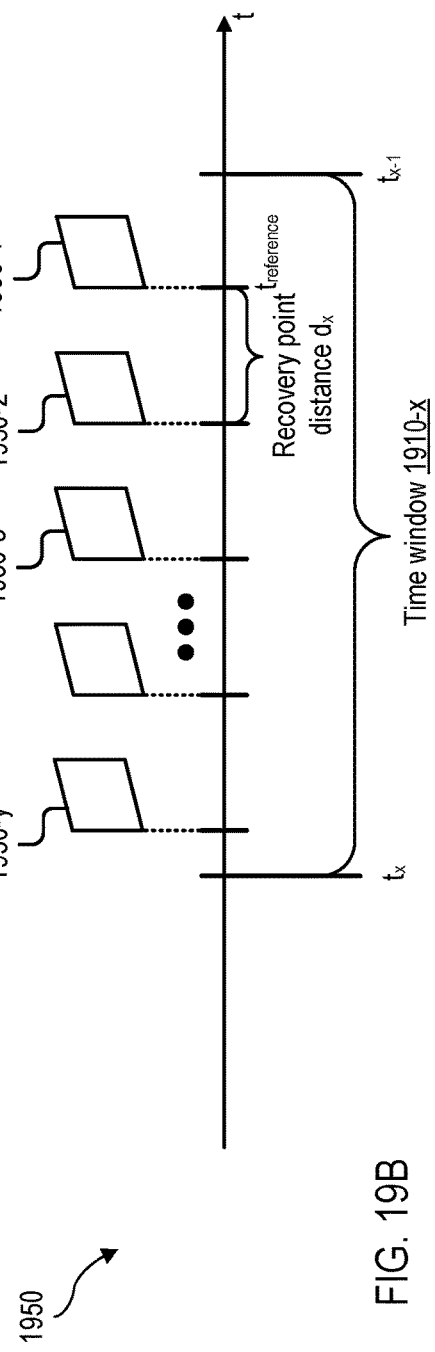
FIG. 19B shows an example diagram of a time window in accordance with some embodiments of the present disclosure.

FIG. 19A shows a diagram 1900 illustrating example time windows associated with the recovery dataset deletion pattern. As depicted in FIG. 19A, the recovery dataset deletion pattern may specify a sequence of time windows 1910-1 . . . 1910-n (collectively referred to as time windows 1910) that are prior to a particular time to. The particular time to may be a current time, a prune time at which a prune operation is performed to delete one or more recovery datasets from the recovery datasets generated for storage system 502, etc. Other types of the particular time to are also possible and contemplated.

In some embodiments, the sequence of time windows may include a plurality of time windows 1910 that are organized in chronological order. Each pair of consecutive time windows 1910 (e.g., time windows 1910-2 and 1910-1) in the sequence of time windows may include a previous time window 1910 and a subsequent time window 1910 that sequentially follows the previous time window 1910 with no other time windows in between. In some embodiments, the end time of the previous time window 1910 may match the start time of the subsequent time window 1910. Alternatively, there may be an insignificant time gap (e.g., no more than 1 s) between the end time of the previous time window 1910 and the start time of the subsequent time window 1910. For example, the previous time window 1910 may extend from a start time of 12:00:00 to an end time of 14:00:00 on a particular date and the subsequent time window 1910 may extend from a start time of 14:00:01 to an end time of 15:30:00 on the particular date. Thus, the subsequent time window 1910 may start when the previous time window 1910 ends, and the subsequent time window 1910 and the previous time window 1910 may not overlap. In some embodiments, the previous time window 1910 may be considered consecutively preceding or consecutively prior to the subsequent time window 1910 in the sequence of time windows, and the subsequent time window 1910 may be considered consecutively following or consecutively subsequent to the previous time window 1910 in the sequence of time windows.

In some embodiments, a first time window 1910 in the sequence of time windows may have a start time subsequent to an end time of a second time window 1910 in the sequence of time windows (the first time window 1910 and the second time window 1910 may or may not be consecutive time windows). Thus, the second time window 1910 may be prior to the first time window 1910 and the first time window 1910 may be subsequent to the second time window 1910. Accordingly, the first time window 1910 may be more recent to the particular time to (e.g., the current time, the prune time) than the second time window 1910. For example, as depicted in FIG. 19A, time window 1910-2 may be more recent to the particular time to than time windows 1910-n and 1910-3. Similarly, time window 1910-1 may be more recent to the particular time to than time windows 1910-n, 1910-3, and 1910-2. The recency of time window 1910 to the particular time to (e.g., the current time, the prune time) may be referred to as the recency of time window 1910.

In some embodiments, the recency of time window 1910 relative to the recency of other time windows 1910 may be indicated by a recency value of time window 1910. For example, the most recent time window 1910 to the particular time to (e.g., time window 1910-1) may have the highest recency value, the least recent time window 1910 to the particular time to (e.g., time window 1910-n) may have the lowest recency value, and the first time window 1910 that is more recent to the particular time to than the second time window 1910 may have a higher recency value than the second time window 1910.

In some embodiments, each time window 1910 in the sequence of time windows may have a time duration indicating an amount of time between a start time and an end time of time window 1910. In some embodiments, various time windows 1910 in the sequence of time windows may have the same time duration or different time durations. In some embodiments, the time duration of a time window 1910 may depend on the recency of time window 1910. For example, the most recent time window 1910 to the particular time to (e.g., time window 1910-1) may have the shortest time duration, the least recent time window 1910 to the particular time to (time window 1910-n) may have the longest time duration, and the first time window 1910 that is more recent to the particular time to than the second time window 1910 may have a shorter time duration than the second time window 1910.

For example, as depicted in FIG. 19A, a time window 1910-1 may extend from a start time at a timestamp $t_1$ to an end time at the particular time $t_0$. Time window 1910-1 may have a time duration of 12 hours between the timestamp $t_1$ and the particular time $t_0$. Accordingly, the timestamp $t_1$ may equal to (the particular time $t_0$-12 hours).

As depicted in FIG. 19A, a time window 1910-2 consecutively preceding time window 1910-1 may extend from a start time at a timestamp $t_2$ to an end time at the timestamp $t_1$. Time window 1910-2 may have a time duration of 12 hours between the timestamp $t_2$ and the timestamp $t_1$. Accordingly, the timestamp $t_2$ may equal to (the timestamp $t_1$-12 hours), and therefore equal to (the particular time $t_0$-24 hours).

As depicted in FIG. 19A, a time window 1910-3 consecutively preceding time window 1910-2 may extend from a start time at a timestamp $t_3$ to an end time at the timestamp $t_2$. Time window 1910-3 may have a time duration of 2 days (e.g., 48 hours) between the timestamp $t_3$ and the timestamp $t_2$. Accordingly, the timestamp $t_3$ may equal to (the timestamp $t_2$-48 hours), and therefore equal to (the particular time $t_0$-72 hours) or (the particular time $t_0$-3 days).

As depicted in FIG. 19A, a time window 1910-4 consecutively preceding time window 1910-3 may extend from a start time at a timestamp $t_4$ to an end time at the timestamp $t_3$. Time window 1910-4 may have a time duration of 4 days (e.g., 96 hours) between the timestamp $t_4$ and the timestamp $t_3$. Accordingly, the timestamp $t_4$ may equal to (the timestamp $t_3$-96 hours), and therefore equal to (the particular time $t_0$-168 hours) or (the particular time $t_0$-7 days).

In this example, the sequence of time windows may include 5 time windows 1910 and the least recent time window 1910 (e.g., time window 1910-n) may extend from a start time at an origin timestamp (e.g., the origin timestamp may be an initial point of the timeline associated with storage system 502) to an end time at the timestamp $t_4$. Accordingly, time window 1910-n may extend over an entire time period prior to the timestamp $t_4$ while a time period of 7 days between the timestamp $t_4$ and the particular time $t_0$ may be collectively covered by time windows 1910-1, 1910-2, 1910-3, and 1910-4.

Thus, in this example, time windows 1910-1 and 1910-2 may have the same time duration of 12 hours while time window 1910-3 may have the time duration of 2 days, time window 1910-4 may have the time duration of 4 days, and time window 1910-n may have a significantly long time duration. Accordingly, the time durations of time windows 1910 may increase as the recency values of time windows 1910 decrease.

In some embodiments, each time window 1910 in the sequence of time windows may correspond to one or more recovery datasets of storage system 502. As depicted in FIG. 19A, storage system 502 and/or system 400 may generate one or more recovery datasets 1920-1 . . . 1920-z (collectively referred to as recovery datasets 1920) for the data stored in storage system 502. As described herein, recovery datasets 1920 may be generated at the predefined backup interval (e.g., every 1 hour). Each recovery dataset 1920 may correspond to a recovery timestamp (also referred to herein as a "recovery time" or a "recovery point-in-time") at which recovery dataset 1920 is generated and may be used to restore the data of storage system 502 to a state of the data at the recovery timestamp. In some embodiments, one or more recovery datasets 1920 may be organized in chronological order of their recovery timestamps. For example, a first recovery dataset 1920 may correspond to a first recovery timestamp and a second recovery dataset 1920 may correspond to a second recovery timestamp subsequent to the first recovery timestamp. In this case, the second recovery dataset 1920 may be considered more recent or newer than the first recovery dataset 1920, and the first recovery dataset 1920 may be considered less recent or older than the second recovery dataset 1920. Thus, the recovery timestamps of recovery datasets 1920 may represent relative ages of recovery datasets 1920.

In some embodiments, one or more recovery datasets 1920 may be generated at one or more recovery timestamps that are within a particular time window 1910, and therefore the one or more recovery datasets 1920 may be considered corresponding to the particular time window 1910. Thus, recovery datasets 1920 corresponding to the particular time window 1910 may include recovery datasets 1920 that are generated at recovery points-in-time within the particular time window 1910.

In some embodiments, each time window 1910 may be associated with a threshold number of retained recovery datasets and a recovery point distance according to the recovery dataset deletion pattern. For example, the recovery dataset deletion pattern may specify a threshold number of retained recovery datasets and a recovery point distance for each time window 1910.

In some embodiments, the threshold number of retained recovery datasets associated with time window 1910 may indicate a number of recovery datasets 1920 being retained for time window 1910 according to the recovery dataset deletion pattern. To conform with the recovery dataset deletion pattern, the deletions of one or more recovery datasets 1920 corresponding to time window 1910 may not result in a number of recovery datasets 1920 that remain for time window 1910 after the deletions being lower than the threshold number of retained recovery datasets associated with time window 1910.

In some embodiments, the threshold number of retained recovery datasets associated with time window 1910 may depend on the recency of time window 1910. For example, the threshold number of retained recovery datasets associated with time window 1910 may be proportional (e.g., directly proportional) to the recency value of time window 1910. Accordingly, for a first time window 1910 and a second time window 1910 that is prior to the first time window 1910 and therefore has a lower recency value than the first time window 1910, a first threshold number of retained recovery datasets specified for the first time window 1910 by the recovery dataset deletion pattern may be higher than a second threshold number of retained recovery datasets specified for the second time window 1910 by the recovery dataset deletion pattern. Thus, to conform with the recovery dataset deletion pattern, a higher number of recovery datasets 1920 may be retained for the first time window 1910 than for the second time window 1910, and a higher number of recovery datasets 1920 corresponding to the second time window 1910 may be deleted as compared to the first time window 1910.

In some embodiments, because the time duration of time windows 1910 may vary, instead of or in addition to the threshold number of retained recovery datasets associated with time window 1910, the recovery dataset deletion pattern may specify a ratio between the threshold number of retained recovery datasets associated with time window 1910 and the time duration of time window 1910. As described herein, a time window 1910 that is more recent to the particular time to may be associated with a higher threshold number of retained recovery datasets and may have a shorter time duration. For example, for the first time window 1910 and the second time window 1910 prior to the first time window, the first threshold number of retained recovery datasets associated with the first time window 1910 may be higher than the second threshold number of retained recovery datasets associated with the second time window 1910 as described herein. In addition, the first time duration of the first time window 1910 may be shorter than the second time duration of the second time window 1910 as described herein. Accordingly, a first ratio between the first threshold number of retained recovery datasets and the first time duration specified for the first time window 1910 by the recovery dataset deletion pattern may be higher than a second ratio between the second threshold number of retained recovery datasets and the second time duration specified for the second time window 1910 by the recovery dataset deletion pattern.

In some embodiments, the recovery point distance associated with a time window 1910 may indicate a time distance between two recovery points-in-time corresponding to two consecutive recovery datasets 1920 being retained for time window 1910 according to the recovery dataset deletion pattern. Thus, the recovery point distance may represent a difference in ages between two consecutive recovery datasets 1920 being retained for time window 1910 according to the recovery dataset deletion pattern. In some embodiments, two consecutive recovery datasets 1920 being retained for time window 1910 may include a first recovery dataset 1920 and a second recovery dataset 1920 that are retained for time window 1910 with no other recovery datasets being retained for time window 1910 in between. To conform with the recovery dataset deletion pattern, a time distance between a recovery timestamp of the first recovery dataset 1920 and a recovery timestamp of the second recovery dataset 1920 may be equal to the recovery point distance specified by the recovery dataset deletion pattern for time window 1910. In some embodiments, the recovery point distance associated with time window 1910 may be computed by dividing the time duration of time window 1910 by the threshold number of retained recovery datasets associated with time window 1910 that is specified by the recovery dataset deletion pattern.

As example, a first recovery dataset 1920 and a second recovery dataset 1920 may be two consecutive recovery datasets 1920 being retained for a particular time window 1910 with no other recovery datasets being retained for the particular time window 1910 in between. The first recovery dataset 1920 may be generated at a first recovery timestamp and the second recovery dataset 1920 may be generated at a second recovery timestamp, with the difference between the first and second recovery timestamps being 2 days and 7 hours. In this example, the recovery point distance specified by the recovery dataset deletion pattern for the particular time window 1910 may be 2 days. Thus, the time distance between two consecutive recovery datasets 1920 being retained for the particular time window 1910 may be longer than the recovery point distance specified by the recovery dataset deletion pattern. Accordingly, system 400 may determine that the recovery dataset deletion pattern is not conformed, and thus determine that the data stored by storage system 502 is possibly targeted by a security threat.

In some embodiments, the recovery point distance associated with time window 1910 may depend on the recency of time window 1910. For example, the recovery point distance associated with time window 1910 may be proportional (e.g., inversely proportional) to the recency value of time window 1910. Accordingly, for the first time window 1910 and the second time window 1910 that is prior to the first time window 1910 and therefore has the lower recency value than the first time window 1910, a first recovery point distance specified for the first time window 1910 by the recovery dataset deletion pattern may be shorter than a second recovery point distance specified for the second time window 1910 by the recovery dataset deletion pattern. In this case, depending on the difference in recovery point distance relative to the difference in time duration between the first time window 1910 and the second time window 1910, a higher number of recovery datasets 1920 may be retained for the first time window 1910 than for the second time window 1910 or vice versa.

For example, in the example described above with reference to FIG. 19A, recovery datasets 1920 may be generated at the predefined backup interval of 1 hour. Accordingly, time windows 1910-1 and 1910-2 that have the time duration of 12 hours may each correspond to 12 recovery datasets 1920 of storage system 502. Time window 1910-3 that has the time duration of 2 days (e.g., 48 hours) may correspond to 48 recovery datasets 1920 of storage system 502. Time window 1910-4 that has the time duration of 4 days (e.g., 96 hours) may correspond to 96 recovery datasets 1920 of storage system 502. Time window 1910-*n* may correspond to a large number of recovery datasets 1920 of storage system 502 due to its significantly long time duration.

In this example, the recovery dataset deletion pattern may specify a recovery point distance of 1 hour for time window 1910-1 that has the time duration of 12 hours. Accordingly, to conform with the recovery dataset deletion pattern, one recovery dataset 1920 may be retained for each hour of time window 1910-1. Thus, among 12 recovery datasets 1920 corresponding to time window 1910-1, 12 recovery datasets 1920 may be retained and no recovery dataset 1920 may be deleted.

The recovery dataset deletion pattern may also specify a recovery point distance of 4 hours for time window 1910-2 that has the time duration of 12 hours. Accordingly, to conform with the recovery dataset deletion pattern, one recovery dataset 1920 may be retained for every 4 hours of time window 1910-2. Thus, among 12 recovery datasets 1920 corresponding to time window 1910-2, 3 recovery datasets 1920 may be retained and 9 recovery datasets 1920 may be deleted. In this example, the recovery point distance (e.g., 4 hours) specified for time window 1910-2 may be 4 times longer than the recovery point distance (e.g., 1 hours) specified for time window 1910-1 that is consecutively subsequent to time window 1910-2.

The recovery dataset deletion pattern may also specify a recovery point distance of 8 hours for time window 1910-3 that has the time duration of 48 hours. Accordingly, to conform with the recovery dataset deletion pattern, one recovery dataset 1920 may be retained for every 8 hours of time window 1910-3. Thus, among 48 recovery datasets 1920 corresponding to time window 1910-3, 6 recovery datasets 1920 may be retained and 42 recovery datasets 1920 may be deleted. In this example, the recovery point distance (e.g., 8 hours) specified for time window 1910-3 may be 2 times longer than the recovery point distance (e.g., 4 hours) specified for time window 1910-2 that is consecutively subsequent to time window 1910-3.

The recovery dataset deletion pattern may also specify a recovery point distance of 1 day (e.g., 24 hours) for time window 1910-4 that has the time duration of 4 days (e.g., 96 hours). Accordingly, to conform with the recovery dataset deletion pattern, one recovery dataset 1920 may be retained for each day of time window 1910-4. Thus, among 96 recovery datasets 1920 corresponding to time window 1910-4, 4 recovery datasets 1920 may be retained and 92 recovery datasets 1920 may be deleted. In this example, the recovery point distance (e.g., 1 day or 24 hours) specified for time window 1910-4 may be 3 times longer than the recovery point distance (e.g., 8 hours) specified for time window 1910-3 that is consecutively subsequent to time window 1910-4.

The recovery dataset deletion pattern may also specify a recovery point distance of 1 week (e.g., 7 days or 168 hours) for time window 1910-*n* that extends over the entire time period prior to the timestamp $t_4$. Accordingly, to conform with the recovery dataset deletion pattern, one recovery dataset 1920 may be retained for each week of time window 1910-*n*. Thus, among a large number of recovery datasets 1920 corresponding to time window 1910-*n*, only few recovery datasets 1920 may be retained and a vast majority of recovery datasets 1920 may be deleted. In this example, the recovery point distance (e.g., 1 week) specified for time window 1910-*n* may be 7 times longer than the recovery point distance (e.g., 1 day) specified for time window 1910-4 that is consecutively subsequent to time window 1910-*n*.

Accordingly, to conform with the recovery dataset deletion pattern, a majority of recovery datasets 1920 or all of recovery datasets 1920 that correspond to the most recent time window 1910 (e.g., time window 1910-1) may be retained as illustrated with this example. For time windows 1910 that have lower recency values such as time windows 1910-2 and 1910-3, the number of recovery datasets 1920 being retained for time window 1910 may be considerably lower than the number of recovery datasets 1920 being deleted from one or more recovery datasets 1920 corresponding to time window 1910. As the recency values of time windows 1910 decrease, the number of recovery datasets 1920 corresponding to time window 1910 that are deleted may significantly increase. Thus, for time windows 1910 that have low recency values such as time windows 1910-4 and 1910-*n*, a vast majority of recovery datasets 1920 corresponding to time window 1910 may be deleted, and therefore the recovery datasets 1920 that are likely obsolete may be deleted before they become very old.

As depicted in FIG. 9A, each time window 1910 may be associated with one or more recovery datasets 1930. Each recovery dataset 1930 may be a recovery dataset 1920 that is retained for time window 1910 if the recovery dataset deletion pattern is conformed. In some embodiments, system 400 and/or storage system 502 may identify one or more recovery datasets 1930 for time window 1910 among one or more recovery datasets 1920 corresponding to time window 1910. The identification of recovery datasets 1930 for time window 1910 may be performed using the recovery point distance specified for time window 1910 by the recovery dataset deletion pattern.

For example, FIG. 9B shows a diagram 1950 illustrating a time window 1910-x. As depicted in FIG. 9B, time window 1910-x may extend from a start time at a timestamp $t_{x-1}$ to an end time at a timestamp $t_x$ and may be associated with a recovery point distance $d_x$ specified for time window 1910-x by the recovery dataset deletion pattern. In some embodiments, to identify one or more recovery datasets 1930 for time window 1910-x, system 400 may select a reference timestamp (e.g., $t_{reference}$) within time window 1910-x. The reference timestamp may be the start time $t_{x-1}$ of time window 1910-x, the end time $t_x$ of time window 1910-x, the recovery timestamp of a recovery dataset 1920 generated within time window 1910-x, etc. Other types of the reference timestamp are also possible and contemplated.

In some embodiments, system 400 may identify, from recovery datasets 1920 corresponding to time window 1910-x, one or more recovery datasets 1920 that have a time distance between their recovery timestamp and the reference timestamp equal to one or more times of the recovery point distance $d_x$ specified for time window 1910-x by the recovery dataset deletion pattern. System 400 may then identify the one or more recovery datasets 1920 to be the recovery datasets 1930 that are retained for time window 1910-x according to the recovery dataset deletion pattern. Thus, to conform with the recovery dataset deletion pattern, the recovery datasets 1930 may be retained for time window 1910-x and other recovery datasets 1920 corresponding to time window 1910-x may be deleted. Other implementations to identify the recovery datasets 1930 being retained for time window 1910-x according to the recovery dataset deletion pattern are also possible and contemplated.

In some embodiments, storage system 502 may store temporary data that is used during a limited time period. For example, storage system 502 may store data (e.g., transient data) being used to generate a stage report for a particular stage of a research project including multiple stages. As described herein, system 400 and/or storage system 502 may generate one or more recovery datasets 1920 for the data at the predefined backup interval (e.g., every 1 hour). In some embodiments, to perform prune operation for recovery datasets 1920 of the data when the particular stage is not yet completed, system 400 may temporarily retain one or more recovery datasets 1920 of the data according to the recovery dataset deletion pattern and delete other recovery datasets 1920 of the data as described herein. The retained recovery datasets 1920 may be used to restore the data for re-generating the stage report of the particular stage if needed. When the particular stage is completed and the research project proceeds to a following stage, system 400 may delete all recovery datasets 1920 of the data that were previously retained. Alternatively, system 400 may continue retaining one or more recovery datasets 1920 of the data that are generated at one or more specific timestamps (e.g., a timestamp at which the particular stage starts, a timestamp at which the particular stage ends, a quarter-end timestamp, etc.) and other recovery datasets 1920 of the data that were previously retained may be deleted.

Accordingly, recovery datasets 1920 may be deleted in conformity with the recovery dataset deletion pattern to reduce the number of recovery datasets 1920 being retained for storage system 502 in an appropriate manner. In some embodiments, if one or more delete requests that attempt to delete one or more recovery datasets 1920 of storage system 502 are inconsistent with the recovery dataset deletion pattern, system 400 may determine that the data stored by storage system 502 is possibly targeted by a security threat.

In some embodiments, to determine that the one or more delete requests are inconsistent with the recovery dataset deletion pattern, system 400 may determine that the one or more delete requests attempt to delete a first number of recovery datasets 1920 that are generated within a first time window 1910. System 400 may also determine that the one or more delete requests attempt to delete a second number of recovery datasets 1920 that are generated within a second time window 1910 in which the second time window 1910 is prior to the first time window 1910. In some embodiments, system 400 may determine that the first number of recovery datasets 1920 is higher than the second number of recovery datasets 1920, and therefore determine that the one or more delete requests attempt to delete a higher number of recovery datasets 1920 corresponding to the more recent time window 1910.

In contrast, the deletions of recovery datasets 1920 that conform with the recovery dataset deletion pattern may cause a higher number of recovery datasets 1920 corresponding to the more recent time window 1910 be retained and a higher number of recovery datasets 1920 corresponding to the less recent time window 1910 be deleted. As a result, system 400 may determine that the one or more delete requests are inconsistent with the recovery dataset deletion pattern, and therefore determine that the one or more delete requests attempt to delete recovery datasets 1920 of storage system 502 improperly. Accordingly, system 400 may determine that the data stored by storage system 502 is possibly targeted by a security threat.

In some embodiments, to determine that the one or more delete requests are inconsistent with the recovery dataset deletion pattern, system 400 may determine that the one or more delete requests attempt to delete a first number of recovery datasets 1920 that are generated within a time window 1910. System 400 may then determine a second number of recovery datasets 1920 that will be retained for time window 1910 when the first number of recovery datasets 1920 are deleted upon performance of the one or more delete requests. To compute the second number of recovery datasets 1920, system 400 may subtract the first number of recovery datasets 1920 that the one or more delete requests attempt to delete from a number of recovery datasets 1920 that are generated within time window 1910.

In some embodiments, system 400 may determine that the second number of recovery datasets 192 that will be retained for time window 1910 if the one or more delete requests are performed is lower than a threshold number of retained recovery datasets specified for time window 1910 by the recovery dataset deletion pattern. Accordingly, system 400 may determine that the one or more delete requests attempt to delete too many recovery datasets 1920 corresponding to time window 1910 and may cause an insufficient number of recovery datasets 1920 being retained for time window 1910 to conform with the recovery dataset deletion pattern. As a result, system 400 may determine that the one or more delete requests are inconsistent with the recovery dataset deletion pattern, and therefore determine that the one or more delete requests attempt to delete recovery datasets 1920 of storage system 502 improperly. Accordingly, system 400 may determine that the data stored by storage system 502 is possibly targeted by a security threat.

In some embodiments, to determine that the one or more delete requests are inconsistent with the recovery dataset deletion pattern, system 400 may identify one or more recovery datasets 1920 being retained based on the recovery dataset deletion pattern. These recovery datasets 1920 may be retained for one or more time windows 1910 if the recovery dataset deletion pattern is conformed. In some embodiments, the recovery datasets 1920 being retained for a particular time window 1910 according to the recovery dataset deletion pattern may be identified using the recovery point distance that is specified for the particular time window 1910 by the recovery dataset deletion pattern as described herein.

In some embodiments, system 400 may determine that the one or more delete requests attempt to delete at least one of the one or more recovery datasets 1920 being retained according to the recovery dataset deletion pattern. Accordingly, system 400 may determine that the one or more delete requests attempt to delete at least one recovery dataset 1920 that is to be retained if the recovery dataset deletion pattern is conformed. As a result, system 400 may determine that the one or more delete requests are inconsistent with the recovery dataset deletion pattern, and therefore determine that the one or more delete requests attempt to delete recovery datasets 1920 of storage system 502 improperly. Accordingly, system 400 may determine that the data stored by storage system 502 is possibly targeted by a security threat.

In some embodiments, system 400 may determine that the one or more delete requests attempt to delete a majority or all of recovery datasets 1920 corresponding to one or more recent time windows 1910.

Additionally or alternatively, system 400 may determine that the one or more delete requests attempt to delete a plurality of recovery datasets 1920 in an indiscriminate manner (e.g., regardless of their relative ages).

Additionally or alternatively, system 400 may determine that the one or more delete requests attempt to delete a plurality of recovery datasets 1920 in a sequential order of their recovery timestamps (e.g., forward or backward in time) with no recovery datasets 1920 being retained for a particular time window 1910 before proceeding to the next time window 1910 with recovery datasets deletion. The next time window 1910 may be consecutively prior to or consecutively subsequent to the particular time window 1910.

Additionally or alternatively, system 400 may determine that the one or more delete requests attempt to delete a plurality of recovery datasets 1920 in which a time distance between recovery points in time corresponding to recovery datasets 1920 retained for a recent time window 1910 is longer than a time distance between recovery points in time corresponding to recovery datasets 1920 retained for a less recent time window 1910. In other words, recovery datasets 1920 being retained that are more recent or newer may have the time distance between their recovery timestamps longer than the time distance between the recovery timestamps of recovery datasets 1920 being retained that are less recent or older.

In these situations, system 400 may determine that the one or more delete requests are inconsistent with the recovery dataset deletion pattern, and therefore determine that the one or more delete requests attempt to delete recovery datasets 1920 of storage system 502 improperly. Accordingly, system 400 may determine that the data stored by storage system 502 is possibly targeted by a security threat.

In some embodiments, in response to the determining that storage system 502 is possibly targeted by a security threat, system 400 may perform a remedial action with respect to storage system 502. Additionally or alternatively, system 400 may instruct storage system 502 to perform the remedial action.

In some embodiments, to perform the remedial action for storage system 502, system 400 may identify one or more recovery datasets 1920 being retained based on the recovery dataset deletion pattern. As described herein, these recovery datasets 1920 may be retained if the recovery dataset deletion pattern is conformed and may be identified using the recovery point distances specified for the corresponding time windows 1910 by the recovery dataset deletion pattern. In some embodiments, system 400 may convert at least one of the recovery datasets 1920 being retained according to the recovery dataset deletion pattern into a provisional protection recovery dataset of storage system 502. The provisional protection recovery dataset may have an increased protection level as compared to the recovery dataset 1920 being retained according to the recovery dataset deletion pattern. For example, the provisional protection recovery dataset may require additional authorization from additional authorizing entities (e.g., system administrators, third-party authorization application such as an AI engine, etc.) to delete and/or modify as compared to the recovery dataset 1920 being retained according to the recovery dataset deletion pattern.

In some embodiments, system 400 may continue monitoring the delete requests that attempt to delete one or more recovery datasets 1920 of storage system 502 and determine that one or more additional delete requests are also inconsistent with the recovery dataset deletion pattern. For example, system 400 may identify the additional delete requests subsequently received by storage system 502 that are inconsistent with the recovery dataset deletion pattern in the manner described herein, and determine that the number of additional delete requests exceeds a predefined threshold number. In this case, system 400 may verify that the recovery dataset deletion pattern is violated and the data stored by storage system 502 is possibly targeted by a security threat. Additionally or alternatively, system 400 may verify that the data stored by storage system 502 is possibly targeted by a security threat using any security threat detection method described herein.

In some embodiments, in response to the determining that one or more additional delete requests are inconsistent with the recovery dataset deletion pattern and therefore verifying that the recovery dataset deletion pattern is violated, system 400 may convert the provisional protection recovery dataset of storage system 502 into a full protection recovery dataset of storage system 502. The full protection recovery dataset may have an additionally increased protection level as compared to the provisional protection recovery dataset. For example, the full protection recovery dataset may require additional authorization from additional authorizing entities (e.g., a predefined set of system managers, one or more CxO-level authenticated users, etc.) to delete and/or modify as compared to the provisional protection recovery dataset. Additionally or alternatively, the full protection recovery dataset may be prevented from deletion and/or modification for a predefined time period since its creation.

In some embodiments, in response to the determining that one or more additional delete requests are inconsistent with the recovery dataset deletion pattern and therefore verifying that the recovery dataset deletion pattern is violated, system 400 may instruct storage system 502 to block one or more subsequent delete requests associated with the data stored by storage system 502. For example, system 400 may instruct storage system 502 to block any future delete request that storage system 502 receives after the determination that one or more additional delete requests are also inconsistent with the recovery dataset deletion pattern. In some embodiments, system 400 may instruct storage system 502 to block the delete requests attempting to delete one or more data items from storage system 502 for a predefined time period (e.g., 24 hours) or until the security threat against storage system 502 is investigated and/or addressed by one or more authorizing entities.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    detecting, by a data protection system, one or more delete requests to delete one or more recovery datasets of a storage system;
    determining, by the data protection system, that the one or more delete requests are inconsistent with a recovery dataset deletion pattern associated with the storage system;
    determining, by the data protection system and based on the determining that the one or more delete requests are inconsistent with the recovery dataset deletion pattern, that data stored by the storage system is possibly being targeted by a security threat;
    performing, by the data protection system in response to the determining that the data stored by the storage system is possibly being targeted by the security threat, a remedial action with respect to the storage system, the performing the remedial action comprising:
        identifying one or more recovery datasets being retained based on the recovery dataset deletion pattern, and
        converting at least one of the one or more recovery datasets being retained into a provisional protection recovery dataset that has an increased protection level as compared to the one or more recovery datasets being retained;
    determining, by the data protection system, that one or more additional delete requests are inconsistent with the recovery dataset deletion pattern; and
    converting, by the data protection system in response to the determining that the one or more additional delete requests are inconsistent with the recovery dataset deletion pattern, the provisional protection recovery dataset into a full protection recovery dataset that has an additionally increased protection level as compared to the provisional protection recovery dataset.

2. The method of claim 1, wherein:
    the recovery dataset deletion pattern is associated with one or more time windows and one or more of a threshold number of retained recovery datasets for each time window or a recovery point distance between two consecutive recovery datasets being retained for each time window.

3. The method of claim 1, wherein:
    the recovery dataset deletion pattern is associated with a first time window and a second time window prior to the first time window; and
    the recovery dataset deletion pattern is associated with a first threshold number of retained recovery datasets for the first time window and a second threshold number of retained recovery datasets for the second time window, the first threshold number of retained recovery datasets being higher than the second threshold number of retained recovery datasets.

4. The method of claim 1, wherein:
    the recovery dataset deletion pattern is associated with a first time window and a second time window prior to the first time window; and
    the recovery dataset deletion pattern is associated with a first recovery point distance between two consecutive recovery datasets being retained for the first time window and a second recovery point distance between two consecutive recovery datasets being retained for the second time window, the first recovery point distance being shorter than the second recovery point distance.

5. The method of claim 1, wherein the determining that the one or more delete requests are inconsistent with the recovery dataset deletion pattern includes:
    determining that the one or more delete requests attempt to delete a first number of recovery datasets that are generated within a first time window;
    determining that the one or more delete requests attempt to delete a second number of recovery datasets that are generated within a second time window, the second time window being prior to the first time window; and
    determining that the first number of recovery datasets is higher than the second number of recovery datasets.

6. The method of claim 1, wherein the determining that the one or more delete requests are inconsistent with the recovery dataset deletion pattern includes:
    determining that the one or more delete requests attempt to delete a first number of recovery datasets that are generated within a time window;
    determining a second number of recovery datasets that will be retained for the time window when the first number of recovery datasets are deleted; and
    determining that the second number of recovery datasets that will be retained for the time window is lower than a threshold number of retained recovery datasets corresponding to the time window as specified by the recovery dataset deletion pattern.

7. The method of claim 1, wherein the determining that the one or more delete requests are inconsistent with the recovery dataset deletion pattern includes:
    identifying one or more recovery datasets being retained based on the recovery dataset deletion pattern; and
    determining that the one or more delete requests attempt to delete at least one of the one or more recovery datasets being retained.

8. The method of claim 1, further comprising:
    determining, by the data protection system, that another one or more additional delete requests are inconsistent with the recovery dataset deletion pattern; and
    instructing, by the data protection system and in response to the determining that the another one or more additional delete requests are inconsistent with the recovery dataset deletion pattern, the storage system to block one or more subsequent delete requests associated with the data stored by the storage system.

9. A system comprising:
    a memory storing instructions; and
    a processor communicatively coupled to the memory and configured to execute the instructions to:
        detect one or more delete requests to delete one or more recovery datasets of a storage system;

determine that the one or more delete requests are inconsistent with a recovery dataset deletion pattern associated with the storage system; and determine, based on the determining that the one or more delete requests are inconsistent with the recovery dataset deletion pattern, that data stored by the storage system is possibly being targeted by a security threat;

perform, in response to the determining that the data stored by the storage system is possibly being targeted by the security threat, a remedial action with respect to the storage system, the performing the remedial action comprising:

identifying one or more recovery datasets being retained based on the recovery dataset deletion pattern, and converting at least one of the one or more recovery datasets being retained into a provisional protection recovery dataset that has an increased protection level as compared to the one or more recovery datasets being retained;

determine that one or more additional delete requests are inconsistent with the recovery dataset deletion pattern; and convert, in response to the determining that the one or more additional delete requests are inconsistent with the recovery dataset deletion pattern, the provisional protection recovery dataset into a full protection recovery dataset that has an additionally increased protection level as compared to the provisional protection recovery dataset.

10. The system of claim 9, wherein:
the recovery dataset deletion pattern is associated with one or more time windows and one or more of a threshold number of retained recovery datasets for each time window or a recovery point distance between two consecutive recovery datasets being retained for each time window.

11. The system of claim 9, wherein:
the recovery dataset deletion pattern is associated with a first time window and a second time window prior to the first time window; and
the recovery dataset deletion pattern is associated with a first threshold number of retained recovery datasets for the first time window and a second threshold number of retained recovery datasets for the second time window, the first threshold number of retained recovery datasets being higher than the second threshold number of retained recovery datasets.

12. The system of claim 9, wherein:
the recovery dataset deletion pattern is associated with a first time window and a second time window prior to the first time window; and
the recovery dataset deletion pattern is associated with a first recovery point distance between two consecutive recovery datasets being retained for the first time window and a second recovery point distance between two consecutive recovery datasets being retained for the second time window, the first recovery point distance being shorter than the second recovery point distance.

13. The system of claim 9, wherein the determining that the one or more delete requests are inconsistent with the recovery dataset deletion pattern includes:

determining that the one or more delete requests attempt to delete a first number of recovery datasets that are generated within a first time window;

determining that the one or more delete requests attempt to delete a second number of recovery datasets that are generated within a second time window, the second time window being prior to the first time window; and determining that the first number of recovery datasets is higher than the second number of recovery datasets.

14. The system of claim 9, wherein the determining that the one or more delete requests are inconsistent with the recovery dataset deletion pattern includes:

determining that the one or more delete requests attempt to delete a first number of recovery datasets that are generated within a time window;

determining a second number of recovery datasets that will be retained for the time window when the first number of recovery datasets are deleted; and determining that the second number of recovery datasets that will be retained for the time window is lower than a threshold number of retained recovery datasets corresponding to the time window as specified by the recovery dataset deletion pattern.

15. The system of claim 9, wherein the determining that the one or more delete requests are inconsistent with the recovery dataset deletion pattern includes:

identifying one or more recovery datasets being retained based on the recovery dataset deletion pattern; and determining that the one or more delete requests attempt to delete at least one of the one or more recovery datasets being retained.

16. A non-transitory computer-readable medium storing instructions that, when executed, direct a processor of a computing device to:

detect one or more delete requests to delete one or more recovery datasets of a storage system;

determine that the one or more delete requests are inconsistent with a recovery dataset deletion pattern associated with the storage system; and determine, based on the determining that the one or more delete requests are inconsistent with the recovery dataset deletion pattern, that data stored by the storage system is possibly being targeted by a security threat;

perform, in response to the determining that the data stored by the storage system is possibly being targeted by the security threat, a remedial action with respect to the storage system, the performing the remedial action comprising:

identifying one or more recovery datasets being retained based on the recovery dataset deletion pattern, and converting at least one of the one or more recovery datasets being retained into a provisional protection recovery dataset that has an increased protection level as compared to the one or more recovery datasets being retained;

determine that one or more additional delete requests are inconsistent with the recovery dataset deletion pattern; and convert, in response to the determining that the one or more additional delete requests are inconsistent with the recovery dataset deletion pattern, the provisional protection recovery dataset into a full protection recovery dataset that has an additionally increased protection level as compared to the provisional protection recovery dataset.

* * * * *